(12) United States Patent
Kamiwada et al.

(10) Patent No.: US 8,712,213 B2
(45) Date of Patent: Apr. 29, 2014

(54) VIDEO-RECORDING RESERVATION MANAGEMENT APPARATUS, METHOD, PROGRAM, AND SYSTEM

(75) Inventors: Toru Kamiwada, Kawasaki (JP); Noboru Iwamatsu, Kawasaki (JP); Yousuke Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 199 days.

(21) Appl. No.: 13/473,472

(22) Filed: May 16, 2012

(65) Prior Publication Data

US 2012/0281972 A1 Nov. 8, 2012

Related U.S. Application Data

(62) Division of application No. 11/904,281, filed on Sep. 26, 2007, now Pat. No. 8,229,282.

(30) Foreign Application Priority Data

Nov. 16, 2006 (JP) ................................ 2006-310073

(51) Int. Cl.
*H04N 9/80* (2006.01)
*H04N 5/76* (2006.01)
*H04N 7/20* (2006.01)
*H04N 7/18* (2006.01)
*H04N 7/173* (2011.01)

(52) U.S. Cl.
USPC ........... 386/239; 386/248; 386/291; 386/292; 386/293; 386/294; 386/297; 725/68; 725/73; 725/74; 725/86; 725/87; 725/88; 725/89

(58) Field of Classification Search
USPC ......... 386/239, 248, 291, 292, 293, 294, 297; 725/68, 73, 74, 86, 87, 88, 89
See application file for complete search history.

(56) References Cited

U.S. PATENT DOCUMENTS

2006/0034587 A1* 2/2006 Yokota et al. ................... 386/83
2007/0092203 A1* 4/2007 Iwata et al. ..................... 386/83

FOREIGN PATENT DOCUMENTS

| JP | 2001-333337 | 11/2001 |
| JP | 2005-252402 | 9/2005 |
| JP | 2006-273823 | 10/2006 |

OTHER PUBLICATIONS

Notification of Reasons for Refusal issued by the Japanese Patent Office in corresponding Japanese App. No. 2006-310073, dated Apr. 26, 2011.

*Primary Examiner* — Daquan Zhao
(74) *Attorney, Agent, or Firm* — Greer Burns & Crain Ltd.

(57) ABSTRACT

A first video-recording reservation management apparatus which communicates with a second apparatus and can receive the same channels. The first apparatus includes a video-recording reservation processing unit which registers video-recording reservation information of the first apparatus in a storage unit and notifies the second apparatus of such registration via a network when a video-recording reservation is made with respect to the video-recording function of the first apparatus, and a substitutional video-recording reservation processing unit which acquires registered video-recording reservation information from the second apparatus and registers the information in the storage unit when such a registration notification is received from the network, and executes a substitutional video-recording reservation by using the video-recording function of the first apparatus when the video-recording reservation of the second apparatus corresponding to the substitutional video-recording reservation information is not executed when video-recording cannot be performed due to power outage or failure.

12 Claims, 48 Drawing Sheets

FIG. 4A 22-1

| ID | CHANNEL | START TIME | END TIME | IMAGE QUALITY | COMPRESSION RATIO |
|---|---|---|---|---|---|
| 52-1 → 0101 | 01 | 0610202000 | 0610202130 | normal | 1/3 |
| 52-2 → 0102 | 04 | 0610211200 | 0610211500 | normal | 1/2 |

FIG. 4B 24-1

| ID | CHANNEL | START TIME | END TIME | SUBSTITUTE DEVICE | IMAGE QUALITY | COMPRESSION RATIO |
|---|---|---|---|---|---|---|
| 54-1 → 0201A | 06 | 0610200300 | 0610200530 | 10-2 | normal | 1/3 |
| 54-2 → 0202A | 10 | 0610210800 | 0610210900 | 10-2 | normal | 1/3 |
| 54-3 → 0301A | 08 | 0610211700 | 0610212000 | 10-3 | normal | 1/3 |
| 54-4 → 0302B | 12 | 0610222100 | 0610221050 | 10-3 | fine | 1/1 |

FIG. 5A 10-1

| 22-1 | | 24-1 |
|---|---|---|
| 0101 | VIDEO-RECORDING RESERVATION | 52-1 |
| 0102 | VIDEO-RECORDING RESERVATION | 52-2 |
| 0201A | SUBSTITUTIONAL VIDEO-RECORDING RESERVATION | 54-11 |
| 0202A | SUBSTITUTIONAL VIDEO-RECORDING RESERVATION | 54-12 |
| 0301A | SUBSTITUTIONAL VIDEO-RECORDING RESERVATION | 56-11 |
| 0302A | SUBSTITUTIONAL VIDEO-RECORDING RESERVATION | 56-12 |

10-2

| 22-2 | | 24-2 |
|---|---|---|
| 0201 | VIDEO-RECORDING RESERVATION | 54-1 |
| 0202 | VIDEO-RECORDING RESERVATION | 54-2 |
| 0101B | SUBSTITUTIONAL VIDEO-RECORDING RESERVATION | 52-21 |
| 0102B | SUBSTITUTIONAL VIDEO-RECORDING RESERVATION | 52-22 |
| 0301B | SUBSTITUTIONAL VIDEO-RECORDING RESERVATION | 56-21 |
| 0302B | SUBSTITUTIONAL VIDEO-RECORDING RESERVATION | 56-22 |

FIG. 6A

Table 10-1 (52-3):

| 22-1 | | |
|---|---|---|
| 0101 | VIDEO-RECORDING RESERVATION | |
| 0102 | VIDEO-RECORDING RESERVATION | |
| 0103 | VIDEO-RECORDING RESERVATION | |
| 0201A | SUBSTITUTIONAL VIDEO-RECORDING RESERVATION | |
| 0202A | SUBSTITUTIONAL VIDEO-RECORDING RESERVATION | |
| 0301A | SUBSTITUTIONAL VIDEO-RECORDING RESERVATION | |
| 0302A | SUBSTITUTIONAL VIDEO-RECORDING RESERVATION | |

24-1

Table 10-2 (52-23):

| 22-2 | | |
|---|---|---|
| 0201 | VIDEO-RECORDING RESERVATION | |
| 0202 | VIDEO-RECORDING RESERVATION | |
| 0101B | SUBSTITUTIONAL VIDEO-RECORDING RESERVATION | |
| 0102B | SUBSTITUTIONAL VIDEO-RECORDING RESERVATION | |
| 0103A | SUBSTITUTIONAL VIDEO-RECORDING RESERVATION | |
| 0301B | SUBSTITUTIONAL VIDEO-RECORDING RESERVATION | |
| 0302B | SUBSTITUTIONAL VIDEO-RECORDING RESERVATION | |

24-2

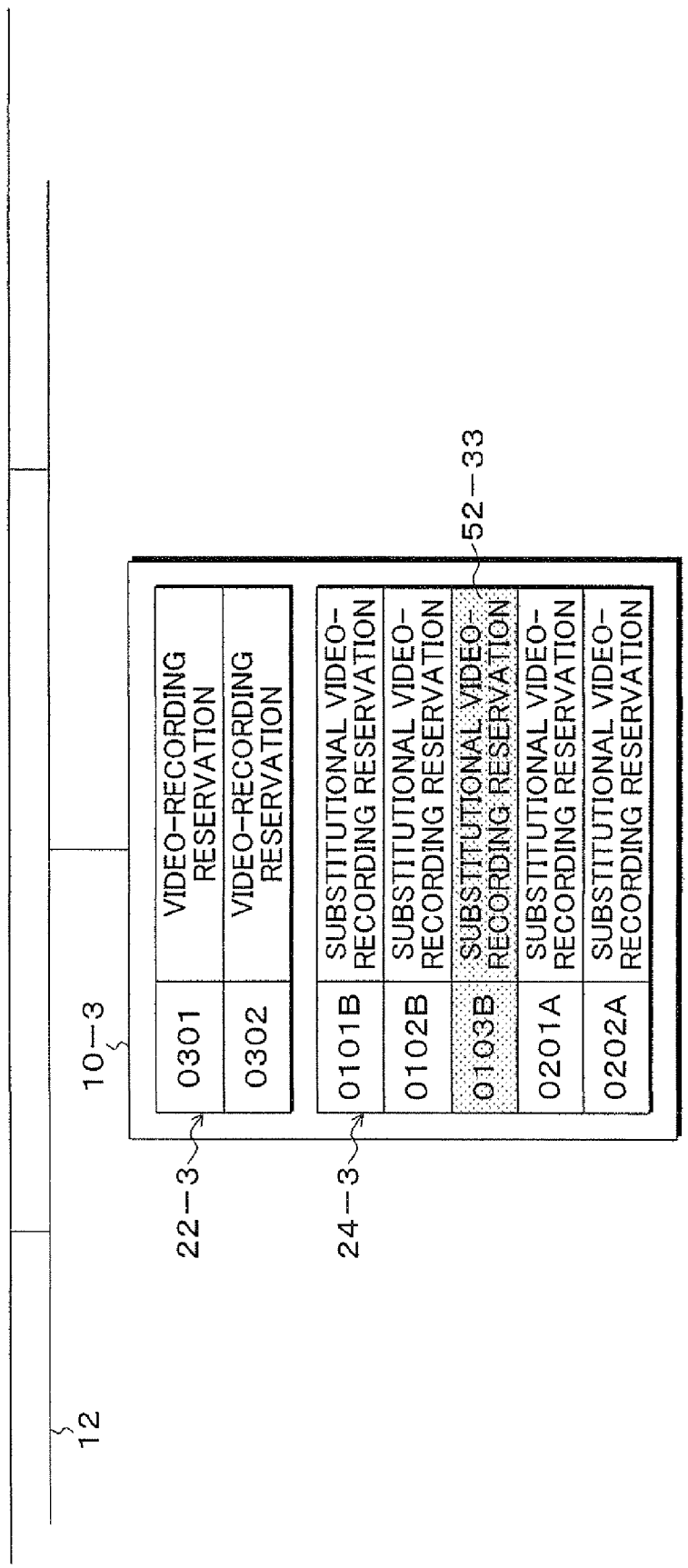

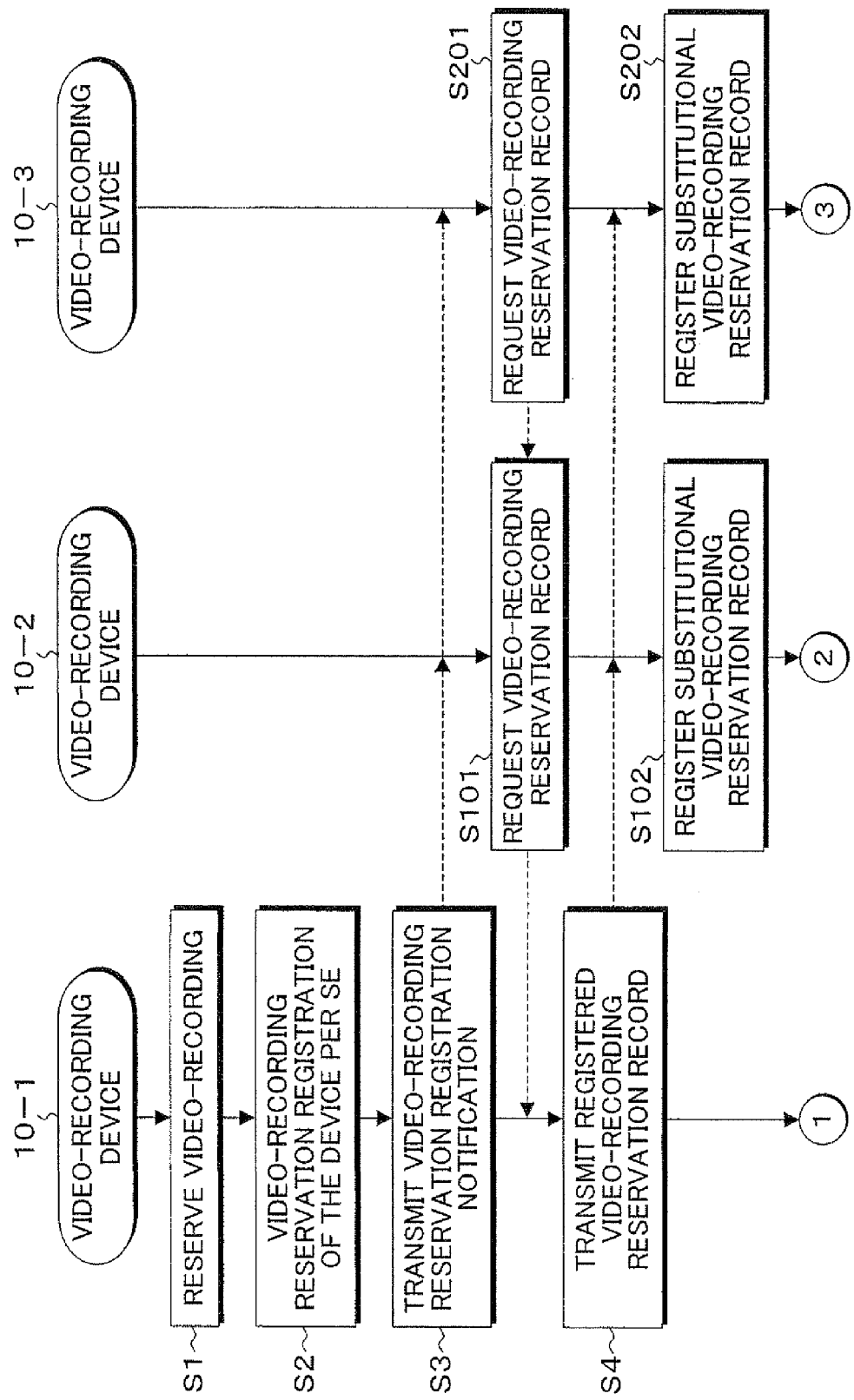

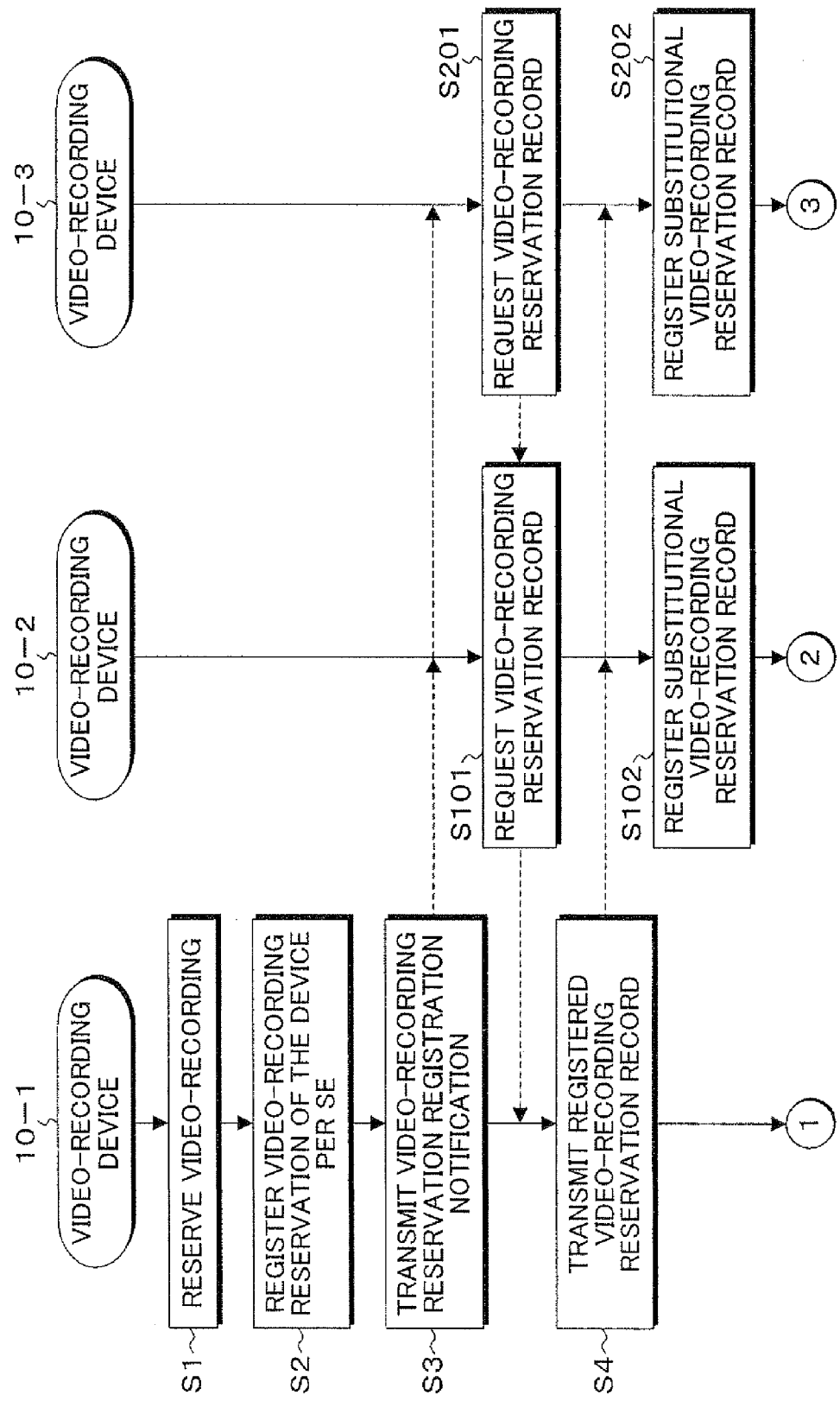

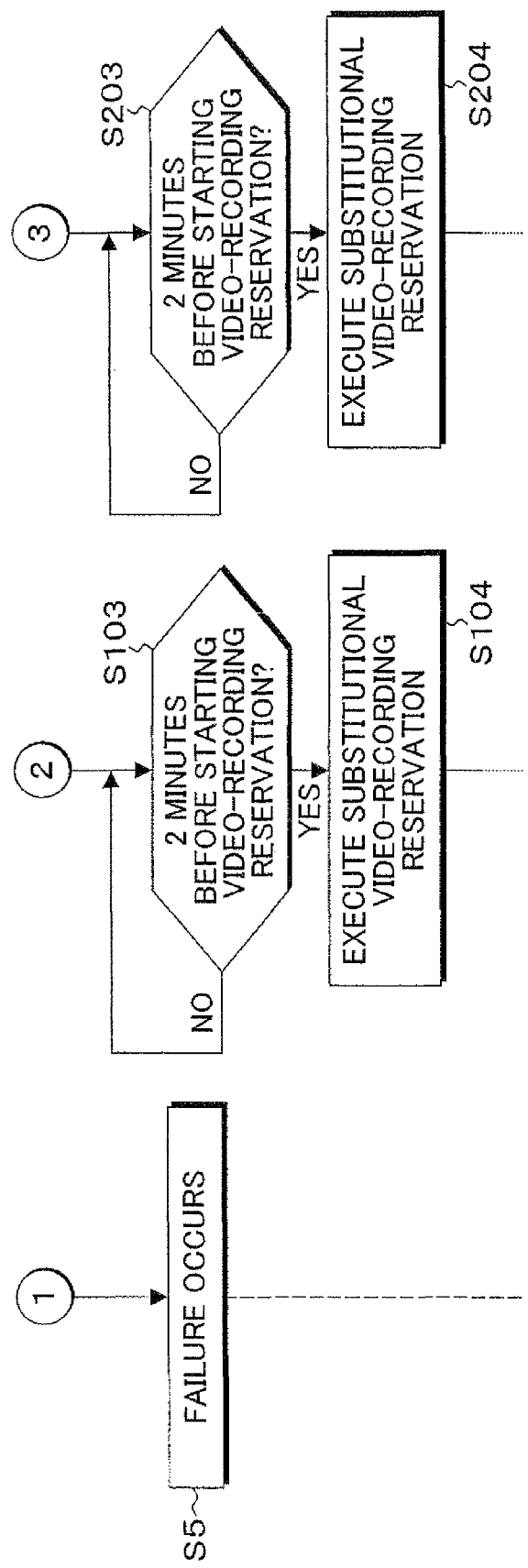

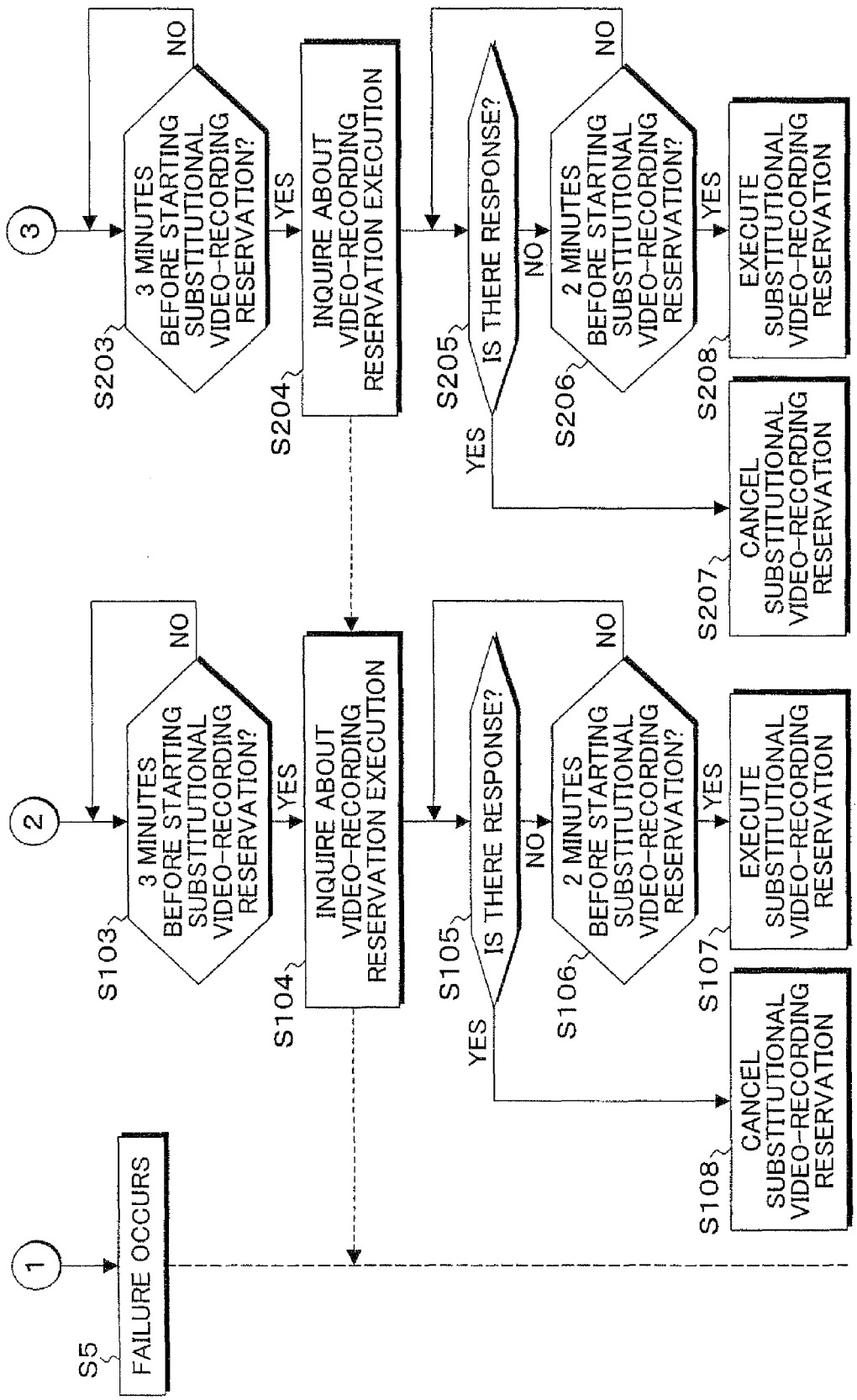

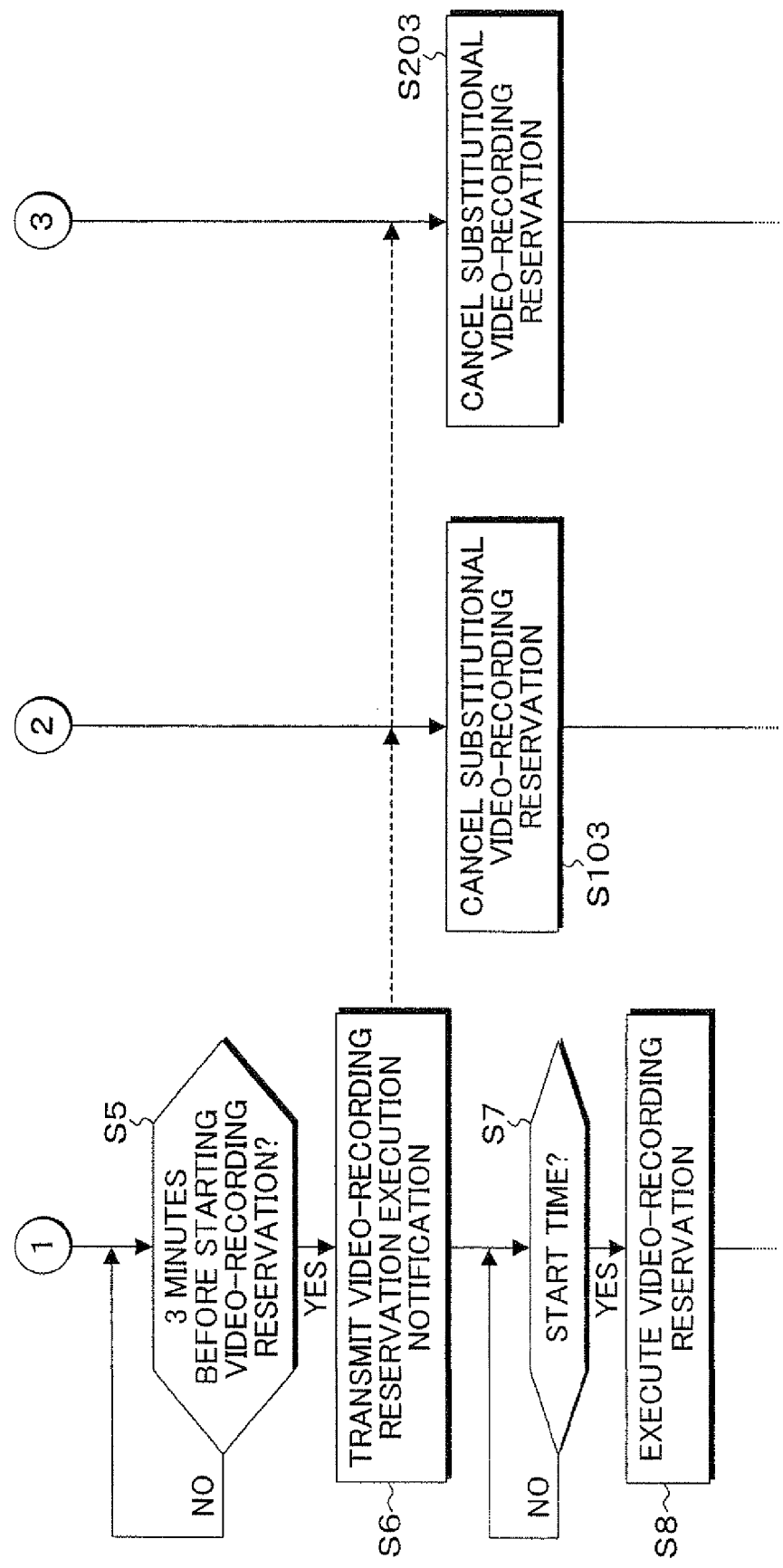

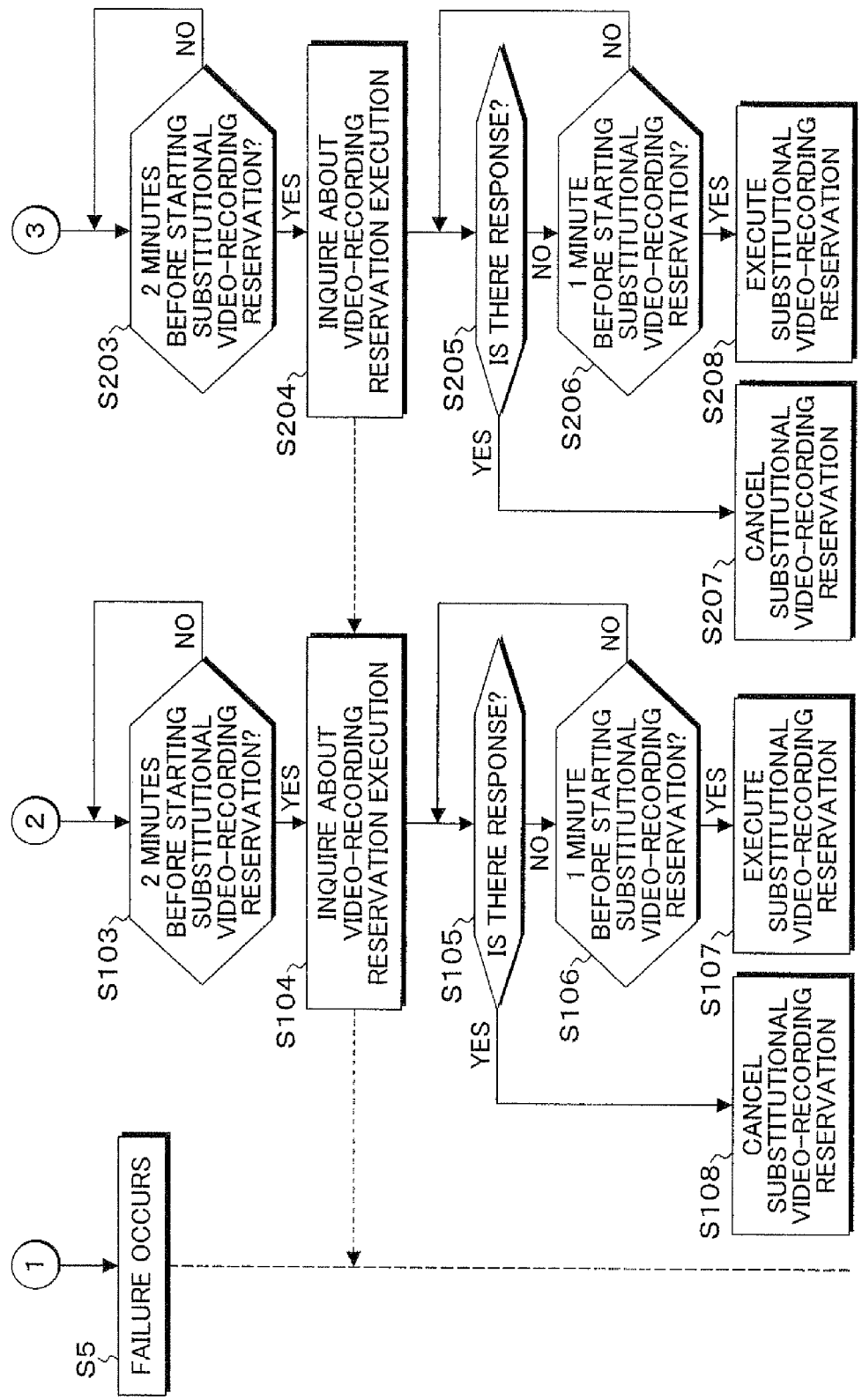

FIG. 20A 22-1

| ID | CHANNEL | START TIME | END TIME | IMAGE QUALITY | COMPRESSION RATIO |
|---|---|---|---|---|---|
| 0101 | 01 | 0610202000 | 0610202130 | normal | 1/3 |
| 0102 | 04 | 0610211200 | 0610211500 | normal | 1/2 |

FIG. 20B 24-1

| ID | CHANNEL | START TIME | END TIME | SUBSTITUTE DEVICE | IMAGE QUALITY | COMPRESSION RATIO | PRIORITY |
|---|---|---|---|---|---|---|---|
| 0201A | 06 | 0610200300 | 0610200530 | 10-2 | normal | 1/3 | 1 |
| 0202A | 10 | 0610210800 | 0610210900 | 10-2 | normal | 1/3 | 2 |
| 0301A | 08 | 0610211700 | 0610212000 | 10-3 | normal | 1/3 | 2 |
| 0302B | 12 | 0610222100 | 0610221050 | 10-3 | fine | 1/1 | 1 |

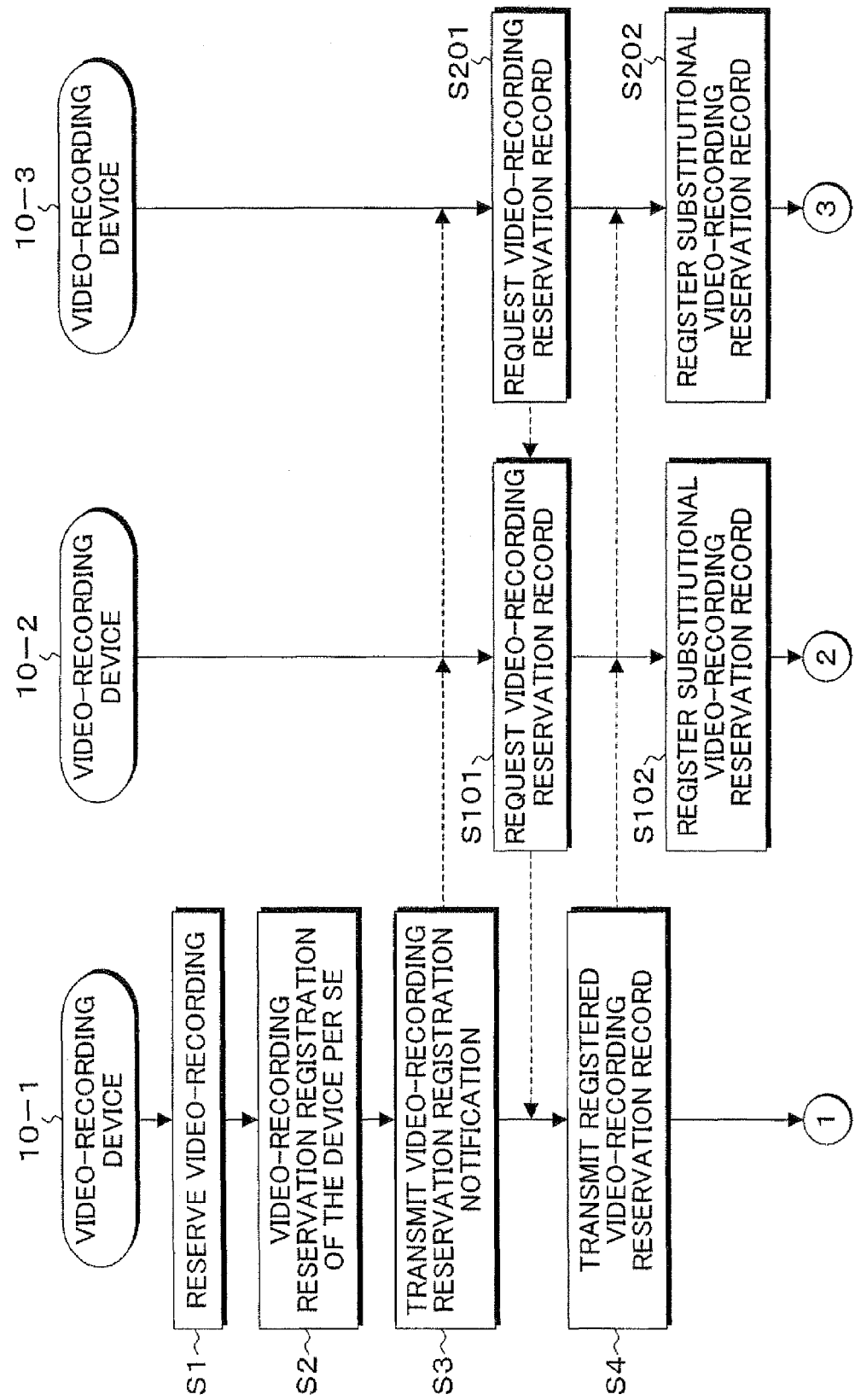

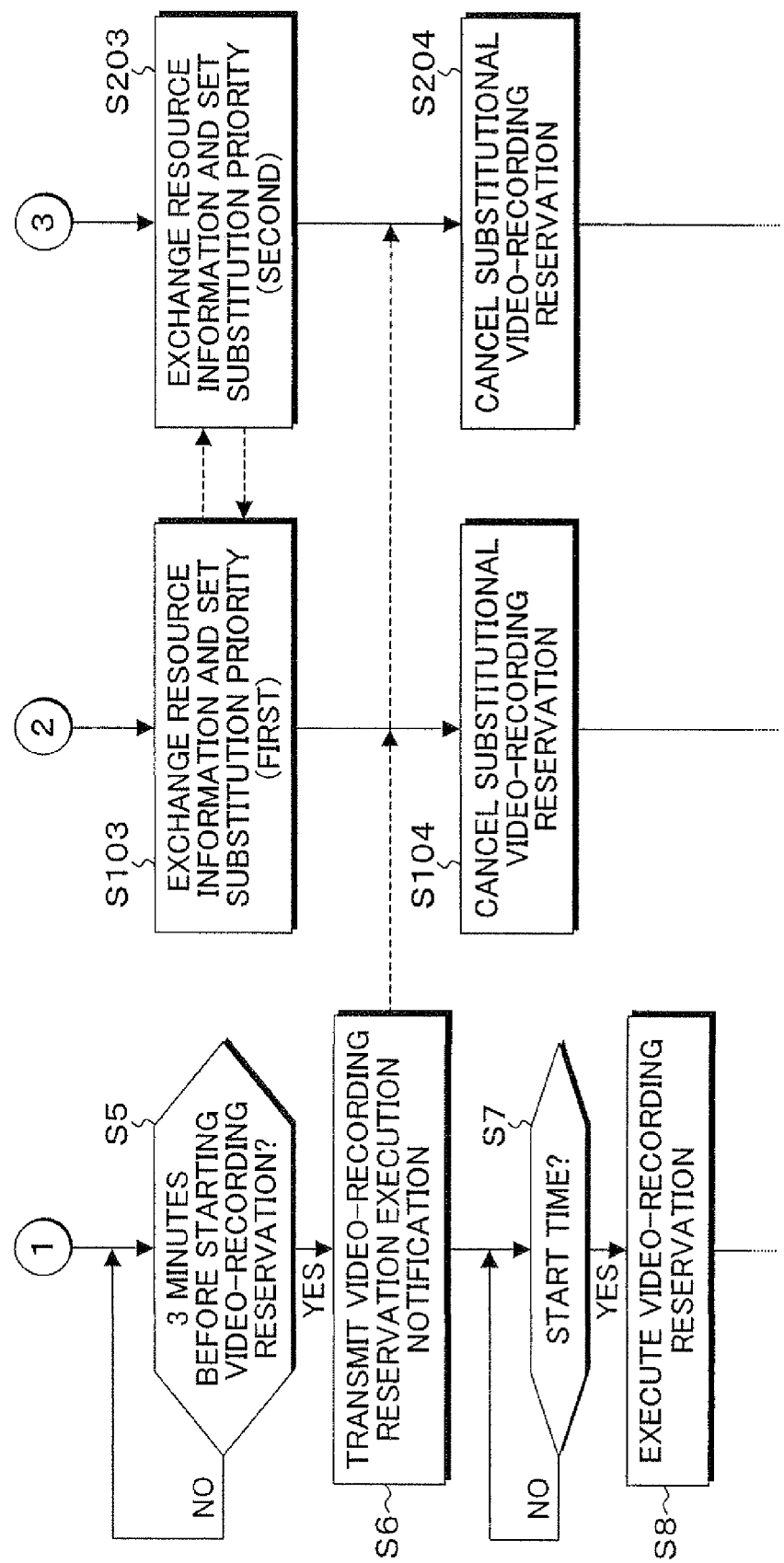

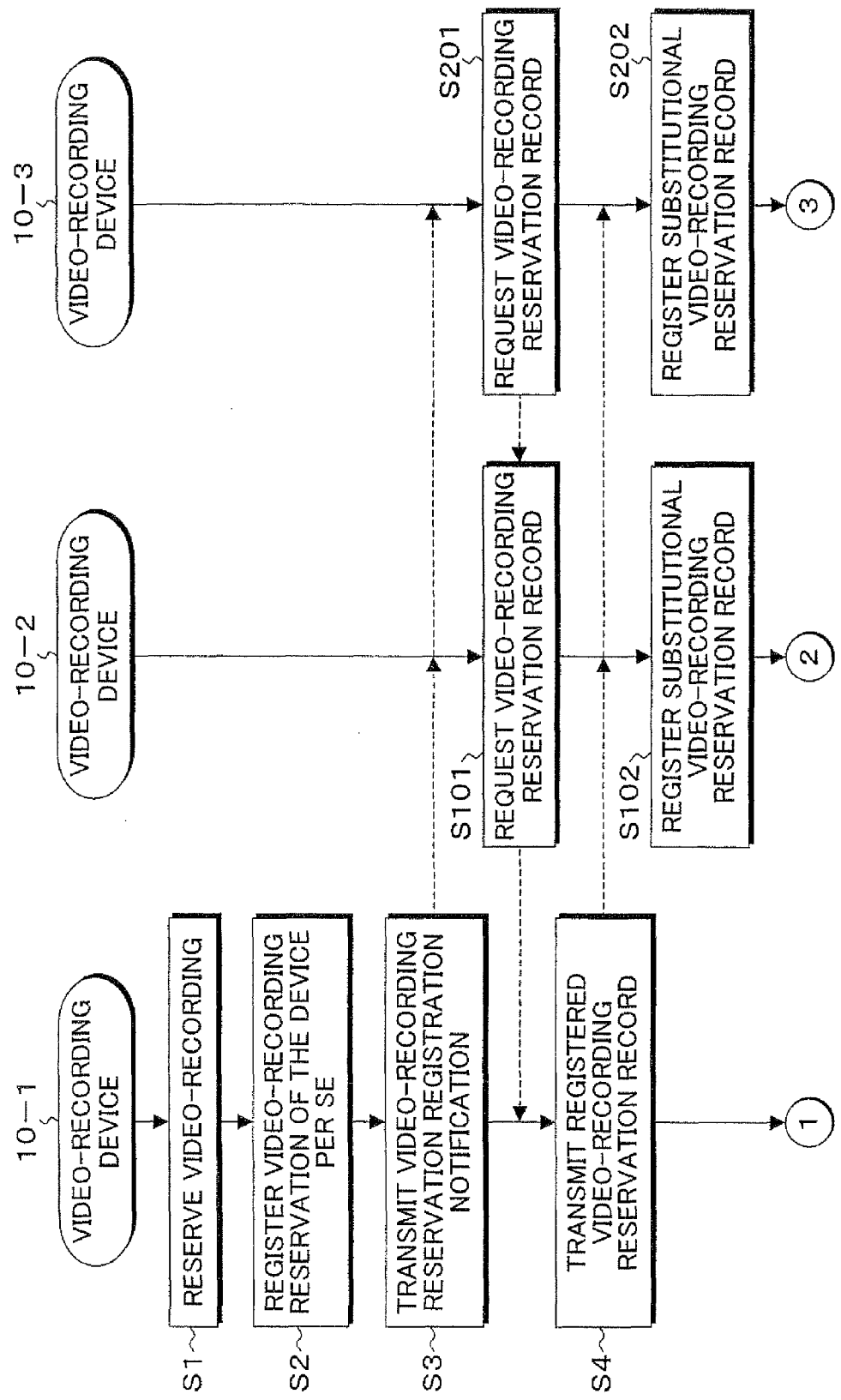

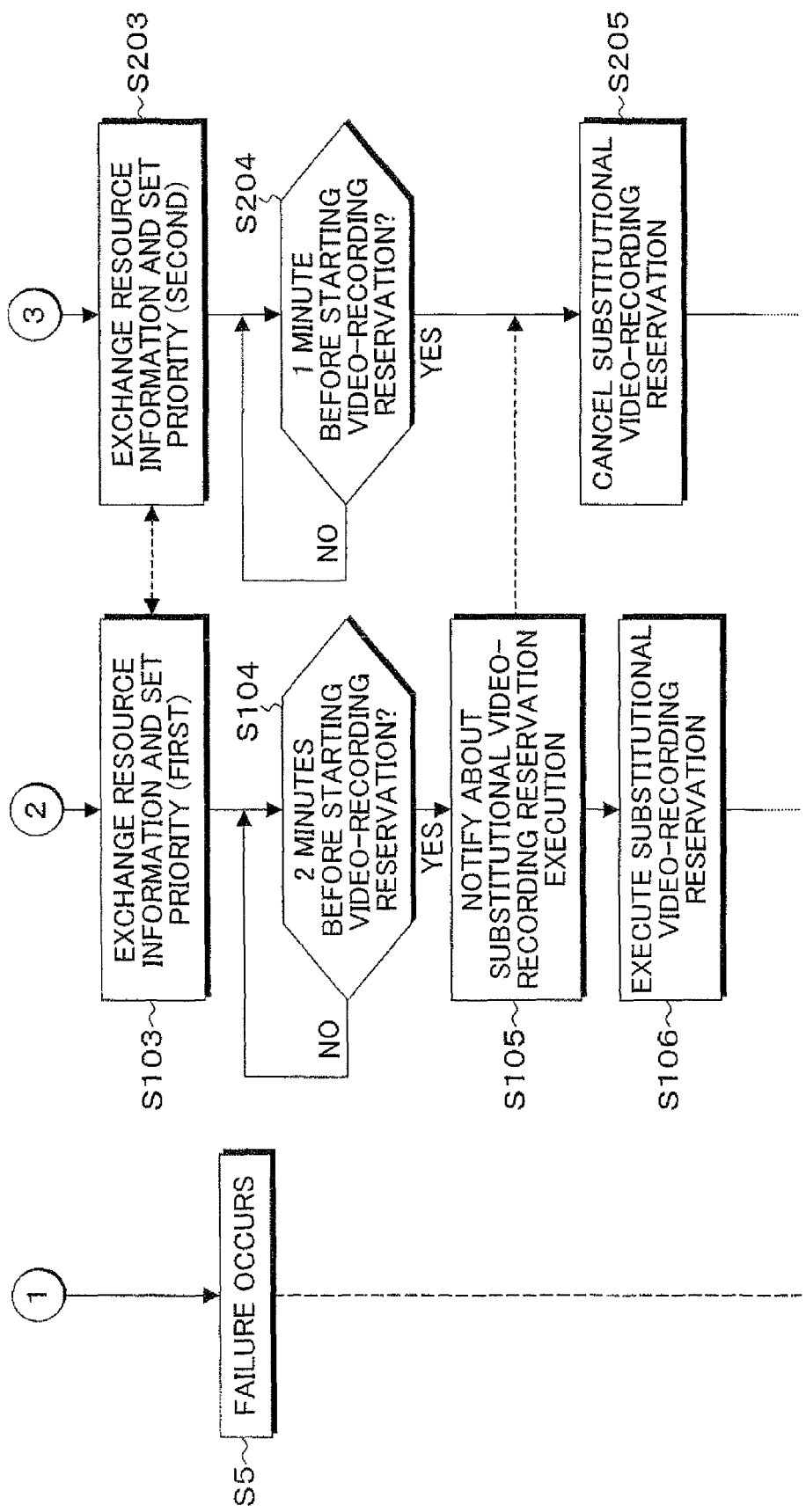

VIDEO-RECORDING RESERVATION MANAGEMENT APPARATUS, METHOD, PROGRAM, AND SYSTEM

This application is a divisional of application Ser. No. 11/904,281, filed Sep. 26, 2007, which claims priority based on prior application No. JP 2006-310073, filed Nov. 16, 2006, in Japan.

BACKGROUND OF THE INVENTION

1. Field of the Invention

The present invention relates to a video-recording reservation management apparatus, method, program, and system in which video-recording reservations are mutually substituted between a plurality of devices which are connected to a network, are communicatable, and have video-recording functions and, particularly, relates to a video-recording reservation management apparatus, method, program, and system in which video-recording reservations are mutually substituted between a plurality of devices having communication functions used when connected to an in-home network environment such as video devices such as HDD recorders or personal computers.

2. Description of the Related Arts

Conventionally, video-recording devices such as AV devices such as HDD recorders and personal computers, which are connected and used in a home network environment in a home and have communication functions, have video-recording reservation functions. There has been proposed a system in which, when video-recording is reserved in a video-recording device to which video-recording can be reserved, and the video-recording cannot be performed, for example, since a storage apparatus such as a HDD does not have free space, the video-recording is substituted by searching another device on a network having a non-operating resource which is video-recordable in the time period required by the video-recording reservation and registering a video-recording reservation in the other searched AV device (JP 2001-333337). Furthermore, there has also been proposed a system in which, when video-recording reservations having the same contents are made in a plurality of AV devices on a network, the redundant video-recording reservations are avoided, and resources for video-recording are effectively utilized by cancelling the video-recording reservation except for one of them (JP 2005-252402).

However, in such a conventional system, which causes another device to substitute a video-recording reservation, the search per se of other video-recording devices on the network which can substitute video-recording cannot be performed when the power of the device in which a video-recording reservation is made is not turned on in the video-recording reserved time period or when the communication function thereof malfunctions; and there is a problem that the reserved video-recording cannot be substituted by another video-recording device on the network unless the AV device, in which the video-recording reservation is made, operates normally.

SUMMARY OF THE INVENTION

According to the present invention to provide a video-recording reservation management apparatus, method, program, and system in which a video-recording reservation is reliably substituted by another device on a network even when video-recording cannot be performed due to power outage, failure, etc. of a device in which the video-recording reservation is made.

(Apparatus)

The present invention provides a video-recording reservation management apparatus. In the present invention, a first video-recording reservation management apparatus which is connected to a network, is communicatable with a second apparatus having a video-recording function, and has a video-recording function, is characterized by having a video-recording reservation processing unit which registers video-recording reservation information of the first apparatus in a video-recording reservation management area of a storage unit and notifies the second apparatus of the video-recording reservation registration of the first apparatus via the network when a video-recording reservation is made with respect to the video-recording function of the first apparatus; and a substitutional video-recording reservation processing unit which acquires registered video-recording reservation information from the second apparatus and registers substitutional video-recording reservation information in a substitutional video-recording reservation management area of the storage unit when a registration notification of a video-recording reservation of the second apparatus is received from the network, and executes a substitutional video-recording reservation by using the video-recording function of the first apparatus when the video-recording reservation of the second apparatus corresponding to the substitutional video-recording reservation information is not executed.

Herein, the video-recording reservation information registered in the video-recording reservation area includes a channel, start time, and end time; and the substitutional video-recording reservation information registered in the substitutional video-recording reservation area includes an identifier of the substitute apparatus, a channel, start time, and end time.

The video-recording reservation processing unit transmits an execution notification of the video-recording reservation to the network when remaining time before start time of the video-recording reservation reaches first predetermined time (for example, three minutes); and the substitutional video-recording reservation processing unit executes the substitutional video-recording reservation when an execution notification of the video-recording reservation is not received from the second apparatus before remaining time before start time of the substitutional video-recording reservation reaches second predetermined time (for example, two minutes) which is shorter than the first predetermined time (First Mode).

Moreover, it may be configured so that the substitutional video-recording reservation processing unit inquires the substitution destination apparatus about execution of the video-recording reservation when remaining time before start time of the substitutional video-recording reservation reaches first predetermined time (for example, three minutes), and executes substitutional video-recording when a response to the inquiry is not received before the remaining time reaches second predetermined time (for example, two minutes) which is shorter than the first predetermined time (Second Mode).

Furthermore, the video-recording reservation processing unit transmits an execution notification of the video-recording reservation to the network when remaining time before start time of the video-recording reservation reaches first predetermined time (for example, three minutes); and the substitutional video-recording reservation processing unit inquires the substitution destination apparatus about execution of the video-recording reservation when an execution notification of the video-recording reservation is not received from the second apparatus before remaining time before start time of the substitutional video-recording reservation reaches second predetermined time (for example, two minutes) which is shorter than the first predetermined time period, and executes substitutional video-recording when a response to the inquiry is not received before the remaining time reaches third predetermined time (for example, one minute) which is shorter than the second predetermined time (Third Mode).

In order to perform substitutional video-recording by one of a plurality of devices, the substitutional video-recording reservation processing unit notifies the second apparatus of registration of the substitutional video-recording reservation when the substitutional video-recording reservation is registered, and, when a registration notification of a substitutional video-recording reservation is received from the second apparatus, acquires resource information allocated to the substitutional video-recording reservation from the second apparatus so as to determine priorities through comparison with resource information of the first apparatus, and executes substitutional video-recording by the apparatus having the highest priority.

When a plurality of apparatuses including the first apparatus which perform the substitutional video-recording reservation are present on the network (when substitutional video-recording is performed by a plurality of devices), the substitutional video-recording reservation processing unit sets a video-recording condition different from the second apparatus so as to execute substitutional video-recording. For example, the substitutional video-recording reservation processing unit sets image quality or a compression ratio different from the second apparatus so as to execute substitutional video-recording.

(Apparatus not Having Video-Recording Function)

In the present invention, a first video-recording reservation management apparatus which is connected to a network, is communicatable with a second apparatus having a video-recording function, manages a video-recording reservation by using a particular video-recording dedicated device as a management object, and does not have a video-recording function, is characterized by having a video-recording reservation processing unit which, when the video-recording dedicated device serving as the management object reserves video-recording, notifies the second apparatus of video-recording reservation registration of the video-recording dedicated device via the network; and a substitutional video-recording reservation processing unit which acquires registered video-recording reservation information from the second apparatus and registers substitutional video-recording reservation information in a substitutional video-recording reservation management area of the storage unit when a registration notification of a video-recording reservation of the second apparatus is received from the network, and executes the substitutional video-recording reservation by using the video-recording function of the video-recording dedicated device when the video-recording reservation of the second apparatus corresponding to the substitutional video-recording reservation information is not executed.

(Method)

The present invention provides a video-recording reservation management method. In the present invention, the video-recording reservation management method of a first apparatus which is connected to a network, is communicatable with a second apparatus having a video-recording function, and has a video-recording function, is characterized by including a video-recording reservation processing step in which video-recording reservation management information of the first apparatus is registered in a video-recording reservation management area of a storage unit and the second apparatus is notified of the video-recording reservation registration of the first apparatus via the network when a video-recording reservation is made with respect to the video-recording function of the first apparatus; and a substitutional video-recording reservation processing step in which registered video-recording reservation information is acquired from the second apparatus and substitutional video-recording reservation information is registered in a substitutional video-recording reservation management area of the storage unit when a registration notification of a video-recording reservation of the second apparatus is received from the network, and a substitutional video-recording reservation is executed by using the video-recording function of the first apparatus when the video-recording reservation of the second apparatus corresponding to the substitutional video-recording reservation information is not executed.

Moreover, in the present invention, a video-recording reservation management method of a first apparatus which is connected to a network, is communicatable with a second apparatus having a video-recording function, manages a video-recording reservation by using a particular video-recording dedicated device as a management object, and does not have a video-recording function, is characterized by including a video-recording reservation processing step, in which, when the video-recording dedicated device serving as the management object reserves video-recording, the second apparatus is notified of video-recording reservation registration of the video-recording dedicated device via the network; and a substitutional video-recording reservation processing step, in which registered video-recording reservation information is acquired from the second apparatus and substitutional video-recording reservation information is registered in a substitutional video-recording reservation management area of the storage unit when a registration notification of a video-recording reservation of the second apparatus is received from the network, and a substitutional video-recording reservation is executed by using the video-recording function of the video-recording dedicated device when the video-recording reservation of the second apparatus corresponding to the substitutional video-recording reservation information is not executed.

(Program)

The present invention provides a video-recording reservation management program executed by a computer of a first video-recording device. The present invention is characterized by causing the computer of the first apparatus which is connected to a network, is communicatable with a second apparatus having a video-recording function, and has a video-recording function, to execute a video-recording reservation processing step in which video-recording management information of the first apparatus is registered in a video-recording reservation management area of a storage unit and the second apparatus is notified of the video-recording reservation registration of the first apparatus via the network when a video-recording reservation is made with respect to the video-recording function of the first apparatus; and a substitutional video-recording reservation processing step in which registered video-recording reservation information is acquired from the second apparatus and substitutional video-recording reservation information is registered in a substitutional video-recording reservation management area of the storage unit when a registration notification of a video-recording reservation of the second apparatus is received from the network, and a substitutional video-recording reservation is executed by using the video-recording function of the first apparatus when the video-recording reservation of the second apparatus corresponding to the substitutional video-recording reservation information is not executed.

Moreover, the present invention is characterized by causing a computer of a first apparatus which is connected to a network, is communicatable with a second apparatus having a video-recording function, manages a video-recording reservation by using a particular video-recording dedicated device as a management object, and does not have a video-recording function to execute a video-recording reservation processing step, in which, when the video-recording dedicated device serving as the management object reserves video-recording, the second apparatus is notified of video-recording reservation registration of the video-recording dedicated device via the network; and a substitutional video-recording reservation processing step, in which registered video-recording reservation information is acquired from the second apparatus and substitutional video-recording reservation information is registered in a substitutional video-recording reservation management area of the storage unit when a registration notification of a video-recording reservation of the second apparatus is received from the network, and a substitutional video-recording reservation is executed by using the video-recording function of the video-recording dedicated device when an execution notification of the video-recording reservation of the second apparatus corresponding to the substitutional video-recording reservation information is not received.

(System)

The present invention provides a video-recording reservation management system. In the present invention, the video-recording reservation management system in which a plurality of mutually-communicatable apparatuses having video-recording functions are connected via a network, is characterized in that each of the apparatuses has a video-recording reservation processing unit which registers video-recording reservation information of the apparatus per se in a video-recording reservation management area of a storage unit and notifies the other apparatus of the video-recording reservation registration of the apparatus per se via the network when a video-recording reservation is made with respect to the video-recording function of the apparatus per se; and a substitutional video-recording reservation processing unit which acquires registered video-recording reservation information from the other apparatus and registers substitutional video-recording reservation information in a substitutional video-recording reservation management area of the storage unit when a registration notification of a video-recording reservation of the other apparatus is received from the network, and executes a substitutional video-recording reservation by using the video-recording function of the apparatus per se when the video-recording reservation of the other apparatus corresponding to the substitutional video-recording reservation information is not executed.

According to the present invention, a video-recordable device connected to a network retains a list of video-recording reservations which are registered in other devices (substitutional video-recording reservation management information) in a storage area of the device per se in addition to a list of video-recording reservations registered in the device per se (video-recording reservation management information of the device per se), the newest state of the mutual video-recording reservation lists is maintained between the devices on the network, and a start notification of a video-recording reservation is transmitted to the network immediately before the video-recording is started. The video-recording device which has received the message becomes aware of the fact that video-recording is to be executed in the device of the message transmitting source and cancels substitutional video-recording, meanwhile, when a start notification of the video-recording reservation is not received even when start time of the substitutional video-recording reservation is close, substitutional video-recording is executed. Therefore, when power of the device in which a video-recording reservation is made is not turned on, or the communication function thereof malfunctions, a start notification of the video-recording reservation cannot be received by the other devices from the network, and it can be understood that the video-recording may not be performed for some reason. At the point when the fact that the video-recording reservation cannot be executed is detected, substitutional video-recording corresponding to the video-recording reservation can be reliably performed by the other devices. As described above, in the present invention, by understanding the video-recording reservation states of each other mutually between the devices having video-recording functions and communication functions and monitoring each other if the reserved video-recording is executed or not, substitution of video-recording can be reliably realized even when video-recording cannot be performed due to power outage, failure, or the like. The above and other objects, features, and advantages of the present invention will become more apparent from the following detailed description with reference to the drawings.

BRIEF DESCRIPTION OF THE DRAWINGS

FIGS. 4A and 4B are explanatory diagrams of the video-recording reservation management table and substitutional video-recording reservation management table shown in FIG. 2;

FIGS. 5A and 5B are explanatory diagrams of a registration process of the video-recording reservation management tables and substitutional video-recording reservation management tables in the present embodiment;

FIGS. 6A and 6B are explanatory diagrams of substitutional video-recording reservation registration of the case in which new video-recording reservation registration is performed in FIGS. 5A and 5B;

FIGS. 7A and 7B are time charts showing a video-recording reservation management process according to a first embodiment (first mode) of the present invention in the case in which a video-recording reservation is normally executed;

FIG. 8 is a time chart showing a video-recording reservation management process according to the first embodiment (first mode) of the present invention in the case in which a video-recording reservation is not performed and substitutional video-recording is executed;

FIGS. 13A and 13B are time charts showing a video-recording reservation management process according to the second embodiment (second mode) of the present invention in the case in which a video-recording reservation is not performed and substitutional video-recording is executed;

FIGS. 16A and 16B are time charts showing a video-recording reservation management process according to third embodiment (third mode) of the present invention in the case in which a video-recording reservation is normally executed;

FIGS. 17A and 17B are time charts showing a video-recording reservation management process according to a third embodiment (third mode) of the present invention in the case in which a video-recording reservation is not performed and substitutional video-recording is executed;

FIGS. 20A and 20B are explanatory diagrams showing a video-recording reservation management table and a substitutional video-recording reservation management table used in a fourth embodiment of the present invention;

FIGS. 21A and 21B are time charts showing a video-recording reservation management process according to fourth embodiment of the present invention in the case in which a video-recording reservation is normally executed;

FIGS. 22A and 22B are time charts showing a video-recording reservation management process according to the fourth embodiment of the present invention in the case in which a video-recording reservation is not performed and substitutional video-recording is executed;

DETAILED DESCRIPTION OF THE PREFERRED EMBODIMENTS

Figure 1:
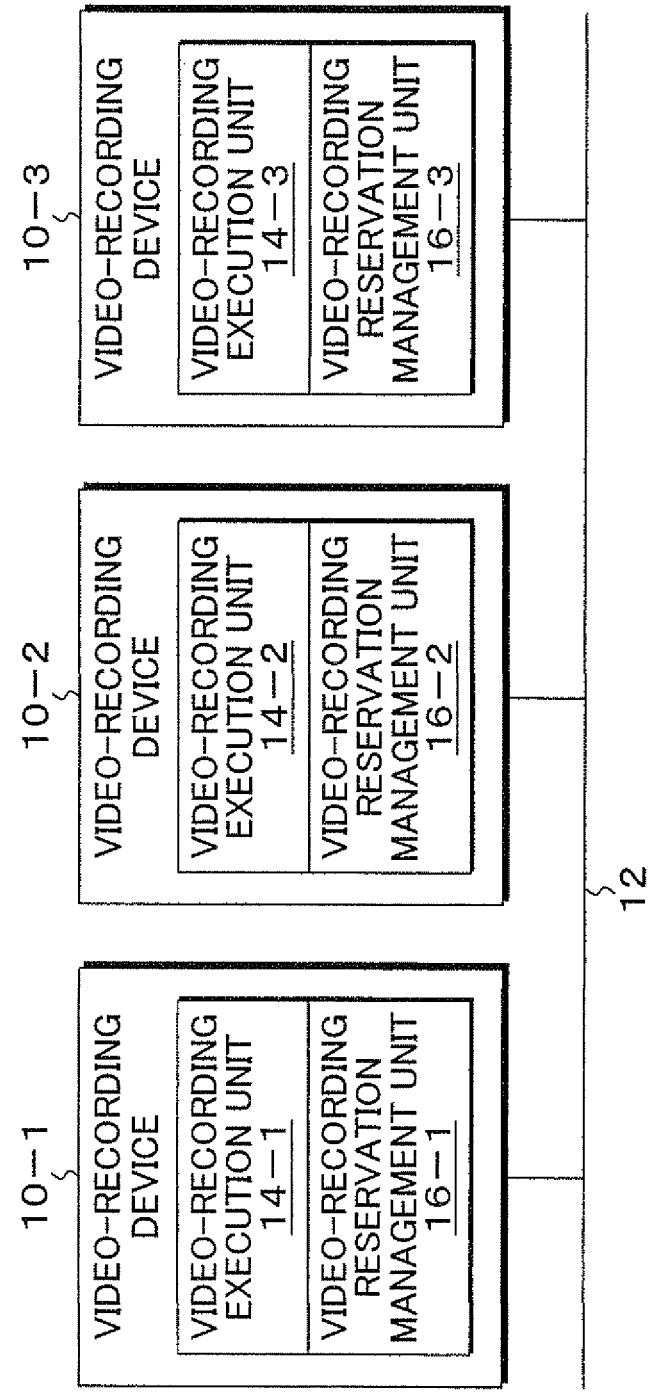
FIG. 1 is a block diagram showing an embodiment of a video-recording reservation management system according to the present invention.

FIG. 1 is a block diagram showing an embodiment of a video-recording reservation management system according to the present invention for a home network in a home. In FIG. 1, video-recording devices 10-1, 10-2, and 10-3 placed in the home are mutually connected via the home network 12. In the video-recording devices 10-1 to 10-3, video-recording execution units 14-1, 14-2, and 14-3 and video-recording reservation management units 16-1, 16-2, and 16-3 are respectively provided. Examples of the video-recording devices 10-1 to 10-3 includes AV devices known as HDD video recorders and personal computers incorporating a TV tuner and equipped with a video-recording function. The home network 12 may be an in-home LAN of, for example, Ethernet (R), which is most widely used in a local area network (LAN) of personal computers, home PNA, or home RF, and it may be a home network using a wireless LAN although the wired home network 12 is shown in the present embodiment. In addition, other than the video-recording devices 10-1, 10-3 having the shown video-recording function and communication function, devices such as peripheral devices of a personal computer such as a printer, telephones, and home electric appliances are connected to the home network 12 in accordance with needs. The video-recording execution units 14-1 to 14-3 provided in the video-recording devices 10-1 to 10-3 execute video-recording of images received by TV tuners with respect to HDDs according to video-recording operations of a user. The video-recording reservation management units 16-1 to 16-3 receive and register video-recording reservations for video-recording of a user performed in the respective video-recording execution units 14-1 to 14-3, monitor reach to video-recording reservation start time for the registered video-recording reservations, and executes video-recording processes. In the present embodiment, each of the video-recording reservation management units 16-1 to 16-3 includes the function which acquires video-recording reservation management information from another video-recording device and performs substitutional video-recording when it is determined that a video-recording reservation is not executed in the other device.

Figure 2:
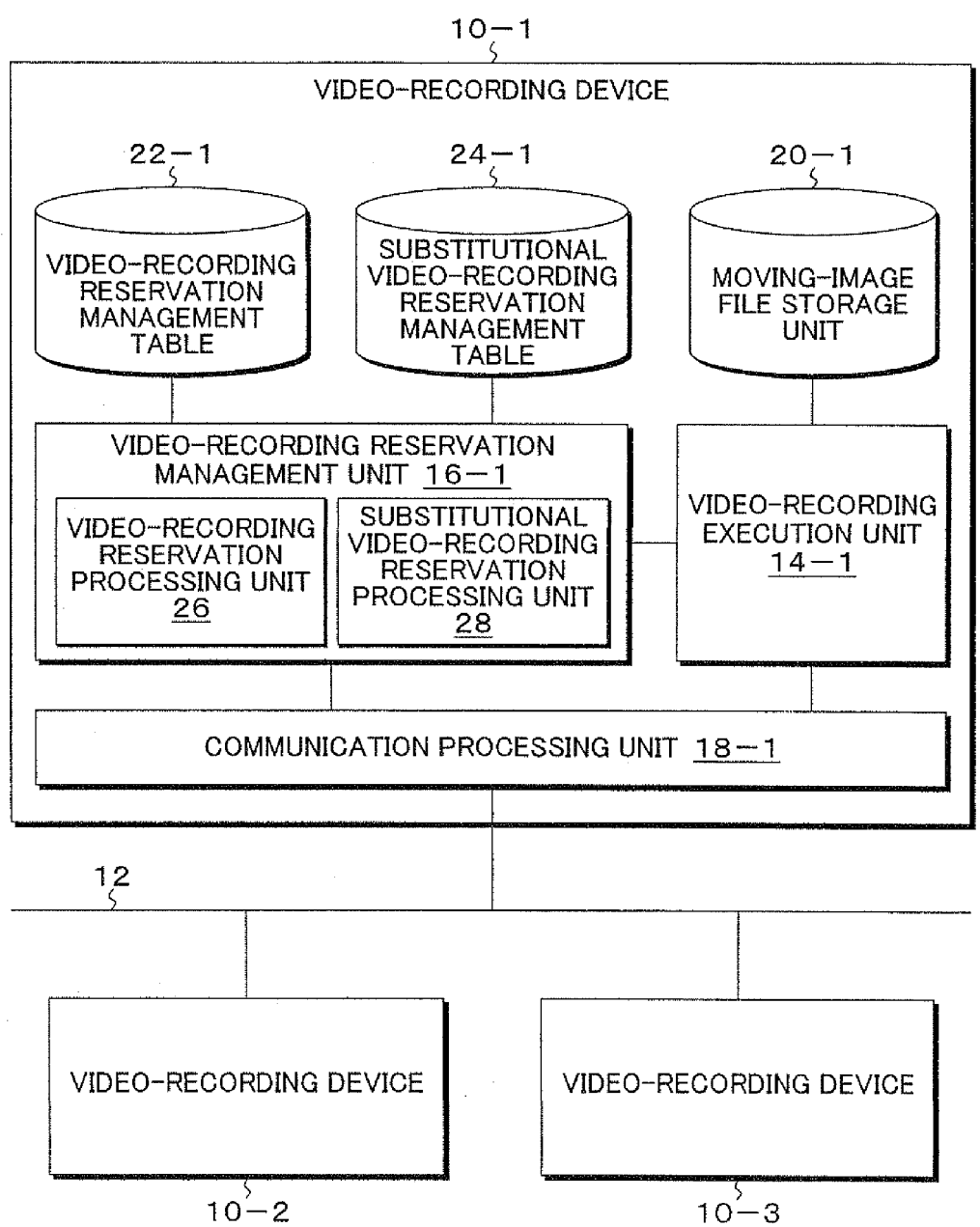
FIG. 2 is a block diagram showing a functional configuration of the video-recording device of FIG. 1.

FIG. 2 is a block diagram showing a functional configuration of the video-recording device 10-1 of FIG. 1 together with the other video-recording devices 10-2 and 10-3. Note that the video-recording devices 10-2 and 10-3 also have the functions same as that of the video-recording device 10-1. In FIG. 2, in the video-recording device 10-1, the video-recording execution unit 14-1 and the video-recording reservation management unit 16-1 are provided. With respect to the video-recording execution unit 14-1, a moving-image file storage unit 20-1 allocated in a hard disk HDD is disposed. In addition, with respect to the video-recording reservation management unit 16-1, a video-recording reservation management table 22-1 in which video-recording reservations of the device per se are registered and a substitutional video-recording reservation management table 24-1 in which video-recording reservations of the other devices are registered as substitutional video-recording reservations are provided. Furthermore, a communication processing unit 18-1 is provided, and the information required in video-recording reservation processes can be mutually transmitted between the device and the other video-recording devices 10-2 and 10-3 via the home network 12. As a communication protocol used for a video-recording reservation process by the communication processing unit 18-1, for example, Universal Plug and Play (UPnP) can be used. Universal Plug and Play is a function that connects devices such as personal computers, peripheral devices, AV devices, telephones, and home electric appliances in a home through a network for mutually providing functions and uses, as a network environment, PNA, RF, or the like which are known for use in an in-home LAN, other than a LAN using Ethernet (R). For mutual communications of the video-recording devices 10-1 to 10-3 performed by the communication processing unit 18-1, for example, network addresses such as IP addresses are allocated to the video-recording devices 10-1 to 10-3 in advance, respectively. In the video-recording reservation management unit 16-1, functions of a video-recording reservation processing unit 26 and a substitutional video-recording reservation processing unit 28 are provided. The video-recording reservation processing unit 26 registers video-recording reservation information in the video-recording reservation management table 22-1 when a user makes a video-recording reservation with respect to the video-recording execution unit 14-1 and notifies the other video-recording devices 10-2 and 10-3 of video-recording reservation registration via the home network 12 by using multicast disclosing messages in Universal Plug and Play (UPnP). When receiving a registration notification of a video-recording reservation by a multicast disclosing message of the other video-recording device 10-2 or 10-3 from the home network 12, the substitutional video-recording reservation processing unit 28 acquires registered video-recording reservation information (video-recording reservation record) from the corresponding other video-recording device 10-2 or 10-3 and registers substitutional video-recording reservation information (substitutional video-recording reservation record) in the substitutional video-recording reservation management table 24-1. Herein, when the video-recording reservation record is received from the other device and registered as the substitutional video-recording reservation record, the video-recording reservation management table 22-1 and the substitutional video-recording management table 24-1 of the device per se are searched, it is determined that the time period and the channel are not redundant with already registered video-recording reservations and substitutional video-recording reservations, and it is registered. Note that, in a video-recording device on which a plurality of TV tuners are mounted so that multiple video-recording can be performed, in consideration of the number of multiple video-recording channels, it is determined that the time period and channels are not redundant, and it is registered. After the registration with respect to the substitutional video-recording reservation management table 24-1 is finished, the substitutional video-recording reservation processing unit 28 executes substitutional video-recording by using the video-recording execution unit 14-1 of the device per se when the video-recording reservation of the other device corresponding to the registered substitutional video-recording reservation information is not executed. As a method of substitutional video-recording performed by the substitutional video-recording reservation processing unit 28 in the present embodiment, the process of any of the following first to third modes is performed.

(First Mode)

In the process of the first mode, when the remaining time before start time of a video-recording reservation is first predetermined time, for example, three minutes (three minutes before starting the video-recording reservation), the video-recording reservation processing unit 26 transmits the execution notification of the video-recording reservation to the home network 12 by multicast disclosing messages. On the other hand, when the execution notification of a video-recording reservation from the other device 10-2 or 10-3 is not received until the remaining time before the start time of a substitutional video-recording reservation is second predetermined time which is shorter than the first predetermined time, for example, two minutes (two minutes before starting the video-recording reservation), the substitutional video-recording reservation video-recording unit 28 executes substitutional video-recording.

(Second Mode)

In the process of the second mode, the video-recording reservation processing unit 26 does not transmit an execution notification of the video-recording reservation to the home network 12 like the first mode even when the remaining time before the start time of the video-recording reservation is, for example, three minutes. Instead of that, when the remaining time before the start time of the substitutional video-recording reservation is first predetermined time, for example, three minutes (three minutes before starting the substitutional video-recording reservation), the substitutional video-recording reservation processing unit 28 inquires the video-recording device 10-2 or 10-3, which is a substitution destination, about execution of the video-recording reservation and, when a response for the inquiry is not received until the remaining time is the second predetermined time which is, for example, two minutes shorter than the first predetermined time, which is three minutes, executes substitutional video recording. In the inquiry from the substitutional video-recording reservation processing unit 28 to the video-recording device of the video-recording reservation destination and the response, for example, a CINP protocol of PING known as a program which diagnoses a TCP-IP network is utilized. In the CINP protocol, inquiry data is transmitted by specifying the IP address (network address) of the video-recording device which is the counterpart, and whether there is a response from the counterpart video-recording device or not is checked. Specifically, a packet called an echo request is transmitted to the video-recording device which is the inquiry destination to be checked, and the video-recording device of the inquiry destination returns a packet of an echo reply when the video-recording can be executed. When the packet of the echo reply is not received, the substitutional video-recording reservation processing unit 28 executes substitutional video-recording.

(Third Mode)

The process of the third mode is a combination process of the first mode and the second mode. In the process of the third mode, when the remaining time before the start time of the video-recording reservation is the first predetermined time, for example, three minutes (three minutes before starting the video-recording reservation), the video-recording reservation processing unit 26 transmits an execution notification of the video-recording reservation to the home network 12 as multicast disclosing messages. On the other hand, when any execution notification of a video-recording reservation from other video-recording devices is not received until the remaining time before the start time of the substitutional video-recording reservation is the second predetermined time which is shorter than the first predetermined time, for example, two minutes (two minutes before starting the substitutional video-recording reservation), the substitutional video-recording reservation processing unit 28 inquires the video-recording device 10-2 or 10-3, in which the video-recording reservation to be substituted is registered, about execution of the video-recording reservation. With respect to the inquiry about execution of the video-recording reservation, when a response from the counterpart video-recording device to the inquiry is not received until the remaining time before the start time of the substitutional video-recording reservation is third predetermined time which is shorter than the second predetermined time, for example, one minute (one minute before starting the substitutional video-recording reservation), the substitutional video-recording is executed.

Figure 3:
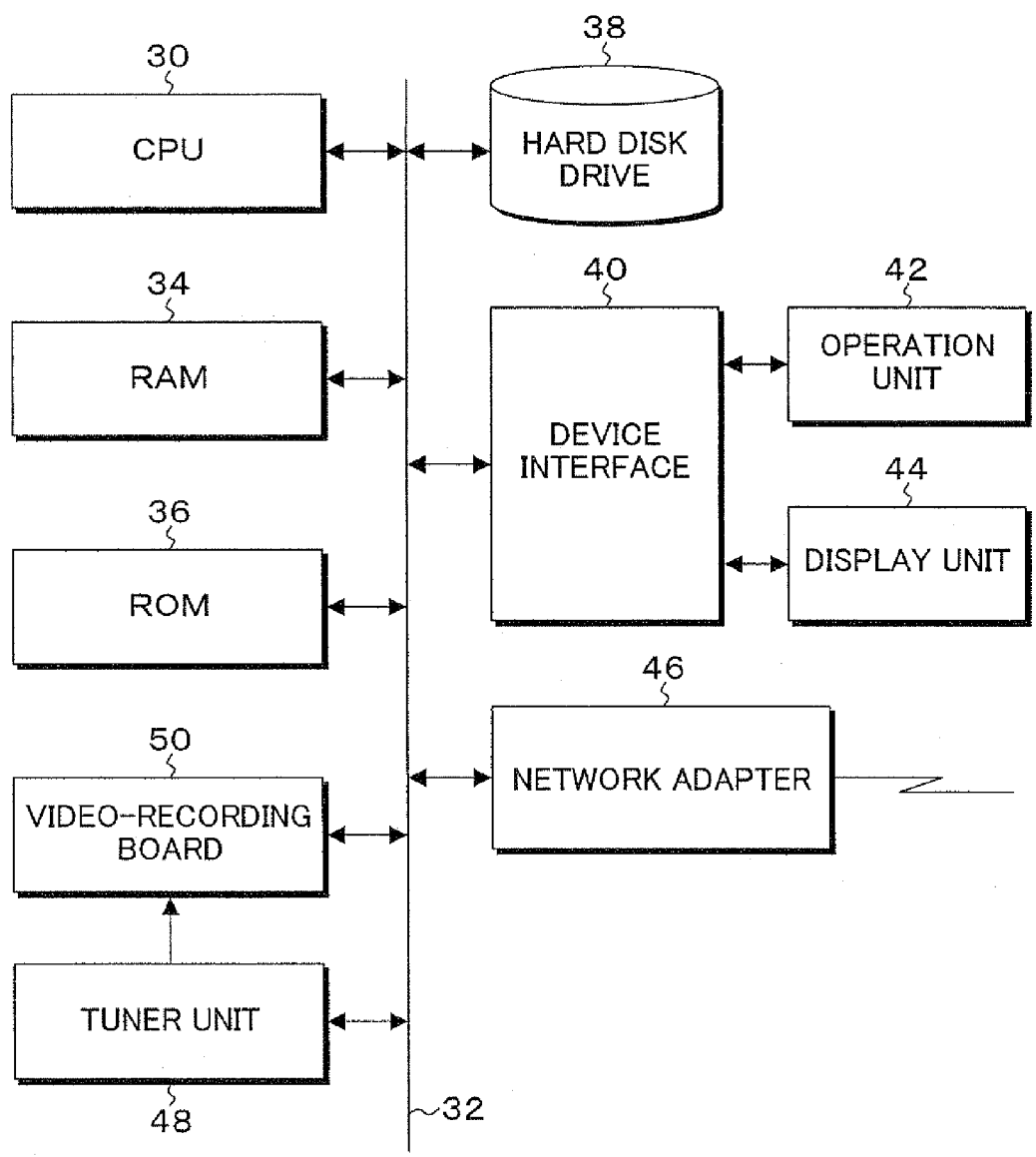
FIG. 3 is a block diagram showing a hardware environment of a computer in which a video-recording reservation management program according to the present embodiment is executed.

FIG. 3 is a block diagram showing a hardware environment of a computer in which a video-recording reservation management program according to the present embodiment is executed. In FIG. 3, with respect to a bus 32 of a CPU 30, a RAM 34, a ROM 36, a hard disk drive 38, a device interface 40 connecting an operation unit 42 and a display unit 44, a network adapter 46, a tuner unit 48, and a video-recording board 50 are provided. In the hard disk drive 38, the video-recording reservation management program of the present embodiment is stored. When the computer is started-up, an OS of the hard disk drive 38 is read and deployed to the RAM 34 and executed by a boot-up process by BIOS. Subsequently, the video-recording reservation management program of the present embodiment stored in the hard disk drive 38 is read and deployed to the RAM 34 and executed by the CPU 30. The video-recording function in the hardware configuration of FIG. 3 is realized by the tuner unit 48, the video-recording board 50, and the hard disk drive 38. When video-recording input is performed by specifying a channel, time, video-recording quality, a compression ratio, and the like by operations of the operation unit 42, the video-recording contents thereof are registered in a management table, video signals obtained by channel selection by the tuner unit 48 are then provided to the video-recording board 50, and the video data is encoded by a MPEG method or the like and stored as a moving-image file in the hard disk drive 38. When a video-recording reservation specifying a channel, video-recording reservation start time, video-recording reservation end time, image quality, a compression ratio, and the like is made by the operation unit 42, the contents of the video-recording reservation is registered in the management table of the hard disk drive 38, and video-recording is then executed by the tuner unit 48 and the video-recording board 50 when it is the video-recording reservation start time. In addition to such a video-recording reservation according to user setting, in the present embodiment, as shown by the substitutional video-recording reservation processing unit 28 of FIG. 2, a process for a video-recording reservation according to any of the above described first mode, second mode, and third mode is executed.

FIG. 4A is an explanatory diagram of the video-recording reservation management table 22-1 shown in FIG. 2, and FIG. 4B also shows an explanatory diagram of the substitutional video-recording reservation management table 24-1. In the video-recording reservation management table 22-1 of FIG. 4A, with respect to video-recording reservation input according to user setting, video-recording reservation records 52-1 and 52-2 which comprise IDs, channels, start time, end time, image quality, and compression ratios are registered. In the substitutional video-recording reservation management table 24-1 of FIG. 4B, based on acquisition of video-recording reservation records through inquiry performed when notifications of video-recording registration are received from the other video-recording devices, substitutional video-recording reservation records 54-11, 54-12, 56-11, and 56-12 which comprise IDs, channels, start time, end time, substitute devices, image quality, and compression ratios are registered. Herein, the reference numerals of the video-recording devices 10-2 and 10-3 shown in FIG. 2 are shown in this example as the substitute devices in the substitutional video-recording reservation management table 24-1; however, in practice, network addresses of the video-recording devices 10-2 and 10-3 are used.

Figure 5B:
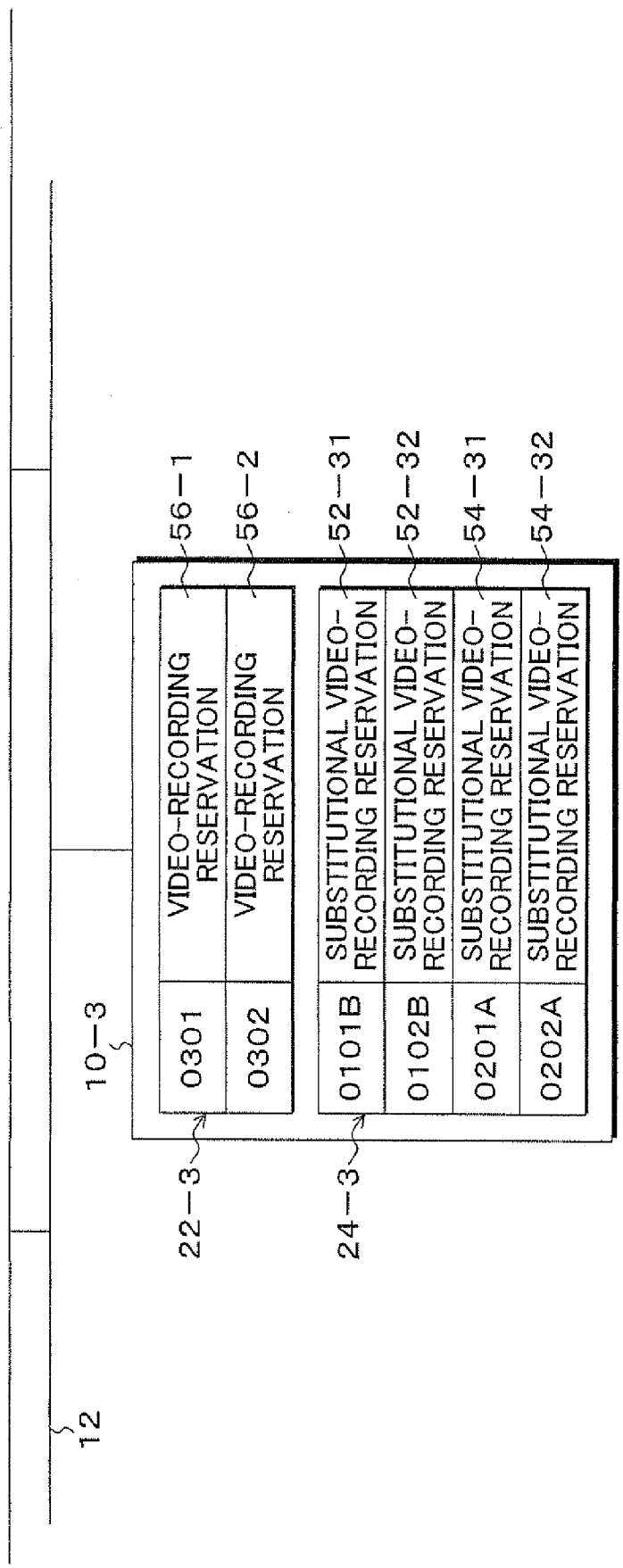

FIGS. 5A and 5B are explanatory diagrams of a registration process of the video-recording reservation management tables and the substitutional video-recording reservation management tables in the present embodiment. In FIGS. 5A and 5B, in the video-recording reservation management tables 221, 22-2, and 22-3 provided in the video-recording devices 10-1, 10-2, and 10-3, video-recording reservation records 52-1 and 52-2, 54-1 and 54-2, and 56-1 and 56-2 are already registered by video-recording input operations of a user on the respective device thereof. Corresponding to these video-recording reservation records 52-1 to 56-2, in the substitutional video-recording reservation management tables 24-1 to 24-3 of the video-recording devices 10-1 to 10-3, substitutional video-recording reservation records corresponding to the reservation registration records of the respective other video-recording devices are already registered. For example, when looking at the substitutional video-recording reservation management table 24-1 of the video-recording device 10-1, corresponding to the video-recording reservation records 54-1 and 54-2 of the other video-recording device 10-2, the substitutional video-recording reservation records 54-11 and 54-12 are registered. In addition, corresponding to the video-recording reservation records 56-1 and 56-2 of the video-recording device 10-3 which is another video-recording device, the substitutional video-recording reservation records 56-11 and 56-12 are registered.

FIGS. 6A and 6B are explanatory diagrams of substitutional video-recording reservation management registration in the case in which new reservation registration is performed in the video-recording device 10-1 in FIGS. 5A and 5B. In FIGS. 6A and 6B, when the new video-recording reservation is made by a user with respect to the video-recording device 10-1 in the state of FIGS. 5A and 5B, a video-recording reservation record 52-3 is registered in the video-recording reservation management table 22-1. Along with the registration of the video-recording reservation record 52-3, the other video-recording devices 10-2 and 10-3 are notified of the execution of the video-recording; and, in response to the execution notification, the other video-recording devices 10-2 and 10-3 acquire the newly registered video-recording reservation record 52-3, generate substitutional video-recording reservation records 52-13 and 52-23, respectively, and newly register them in the respective substitutional video-recording reservation management tables 24-2 and 24-3.

Figure 7B:
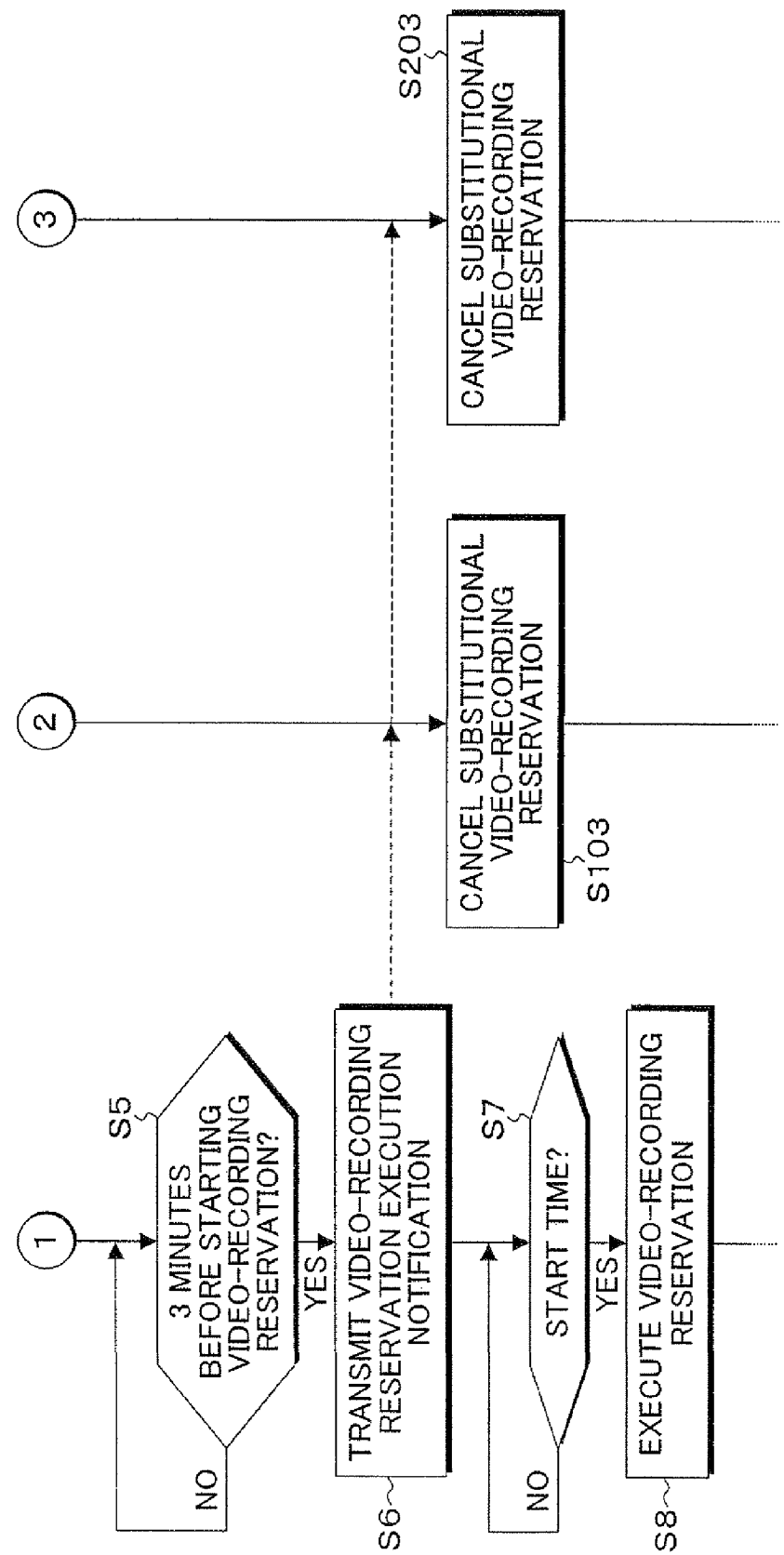

FIGS. 7A and 7B are time charts showing a video-recording reservation management process according to a first embodiment (first mode) of the present invention in the case in which a video-recording reservation is normally executed. The time charts of FIGS. 7A and 7B will be described below with reference to FIG. 2. In FIGS. 7A and 7B, when a video-recording reservation is made by a user in step S1 in the video-recording device 10-1, the video-recording reservation processing unit 26 registers a video-recording reservation record having contents such as those shown in FIG. 4A in the video-recording reservation management table 22-1. Subsequently, in step S3, the video-recording device 10-1 transmits notifications of the video-recording reservation registration, which is performed in step S2, to the home network 12 as disclosing messages using multicast messages of Universal Plug and Play (UPnP). Insteps S101 and S201, respectively, the other video-recording devices 10-2 and 10-3 receive the video-recording reservation registration transmitted from the video-recording device 10-1 and requests video-recording reservation information to the video-recording device 10-1. In response to this, in step S4, the video-recording device 10-1 transmits a video-recording reservation record to the network as registered video-recording reservation information. Insteps S102 and S202, respectively, each of the other video-recording devices 10-2 and 10-3 acquires, from the network, the video-recording reservation record serving as the video-recording reservation information corresponding to the video-recording reservation registration notification and registers the substitutional video-recording reservation record having the contents such as those shown in FIG. 4B in the substitutional video-recording reservation management table. Then, the video-recording device 10-1, in which the video-recording reservation is made, checks if there is any record which is three minutes before starting the video-recording reservation thereof among the video-recording reservation records registered in the video-recording reservation management table 22-1 of the device per se. When the video-recording device 10-1 determines a record which is three minutes before starting the video-recording reservation thereof, the process proceeds to step S6 in which the other video-recording devices 10-2 and 10-3 are notified of video-recording execution notifications via the home network 12. The video-recording execution notifications of this case are also transmitted to the home network 12 as multicast disclosing messages of the Universal Plug and Play (UPnP). In steps S103 and S203, respectively, each of the other video-recording devices 10-2 and 10-3 which have received the video-recording execution notification from the video-recording device 10-1 confirms that the video-recording reservation is to be executed in the video-recording device 10-1 for which the substitutional video-recording reservation record is registered and cancels the substitutional video-recording reservation. Therefore, in the other devices 10-2 and 10-3, the substitutional video-recording reservations are not performed when the video-recording reservation is normally executed in the video-recording device 10-1. In the cancelling process of the substitutional video-recording reservation in the other device 10-2 or 10-3, for example, the corresponding substitutional video-recording reservation record in the substitutional video-recording reservation management table shown in FIG. 4B is deleted, alternatively, a substitutional video-recording reservation flag may be provided in each record, and the flag which is set to 1 upon substitutional video-recording reservation registration may be rest to 0 for cancelling. The video-recording device 10-1 transmits video-recording execution notifications to the home network 12 in step S6, and then, when it is determined to be the video-recording reservation start time in step S7, executes the reserved video-recording by the video-recording execution unit 14-1 of the device per se in step S8.

FIG. 8 is a time chart showing a video-recording reservation management process according to the first embodiment (first mode) in the case in which a video-recording reservation is not performed and substitutional video-recording reservations are executed. In FIG. 8, the processes of steps S1 to S4 in the video-recording device 10-1 and steps S101, S102, and S201, S202 in the video-recording devices 10-2 and 10-3 are same as those of the time charts of FIGS. 7A and 7B. However, in the case of FIG. 8, failure occurs in step S5 in the video-recording device 10-1 after registration of the video-recording reservation due to power outage, failure of a communication function, etc. Therefore, the video-recording device 10-1 cannot transmit video-recording execution notifications to the other video-recording devices in the manner shown in step S6 of FIGS. 7A and 7B even when it is three minutes before start of the video-recording reservation record registered in step S2. Therefore, each of the other video-recording devices 10-2 and 10-3 checks whether it is two minutes before starting the substitutional video-recording reservation respectively in step S103 and S203 and, when it is determined that it is two minutes before the start, executes substitutional video-recording corresponding to the video-recording reservation of the video-recording device 10-1 respectively in steps S104 and S204. In this case, the video-recording devices 10-2 and 10-3 simultaneously record the same contents; however, each of the devices may judge the state of the video-recording resource of the device per se and set conditions other than the other video-recording device, for example, a compression ratio or image quality so as to perform substitutional video-recording.

Figure 9:
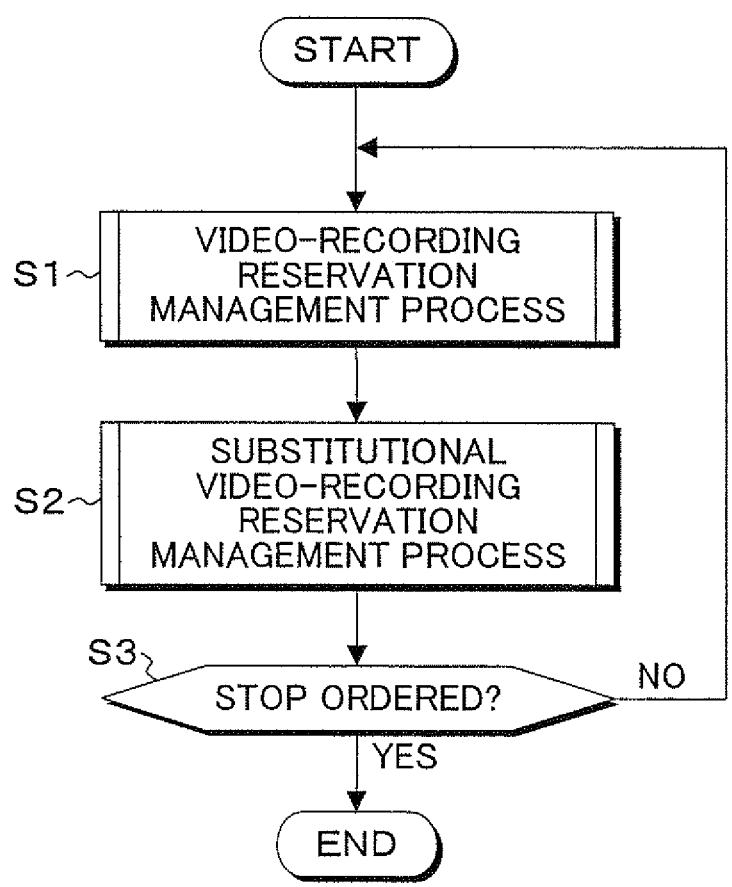
FIG. 9 is a flow chart of a video-recording reservation management process according to the present invention.

FIG. 9 is a flow chart of a video-recording reservation management process according to the present invention. In the video-recording reservation management process of the present invention, after a video-recording reservation management process by the video-recording reservation management unit 26 shown in FIG. 2 is executed in step S1, a substitutional video-recording reservation management process by the substitutional video-recording reservation processing unit 28 of FIG. 2 is executed in step S2. Such processes are repeated until there is a stop order in step S3.

Figure 10:
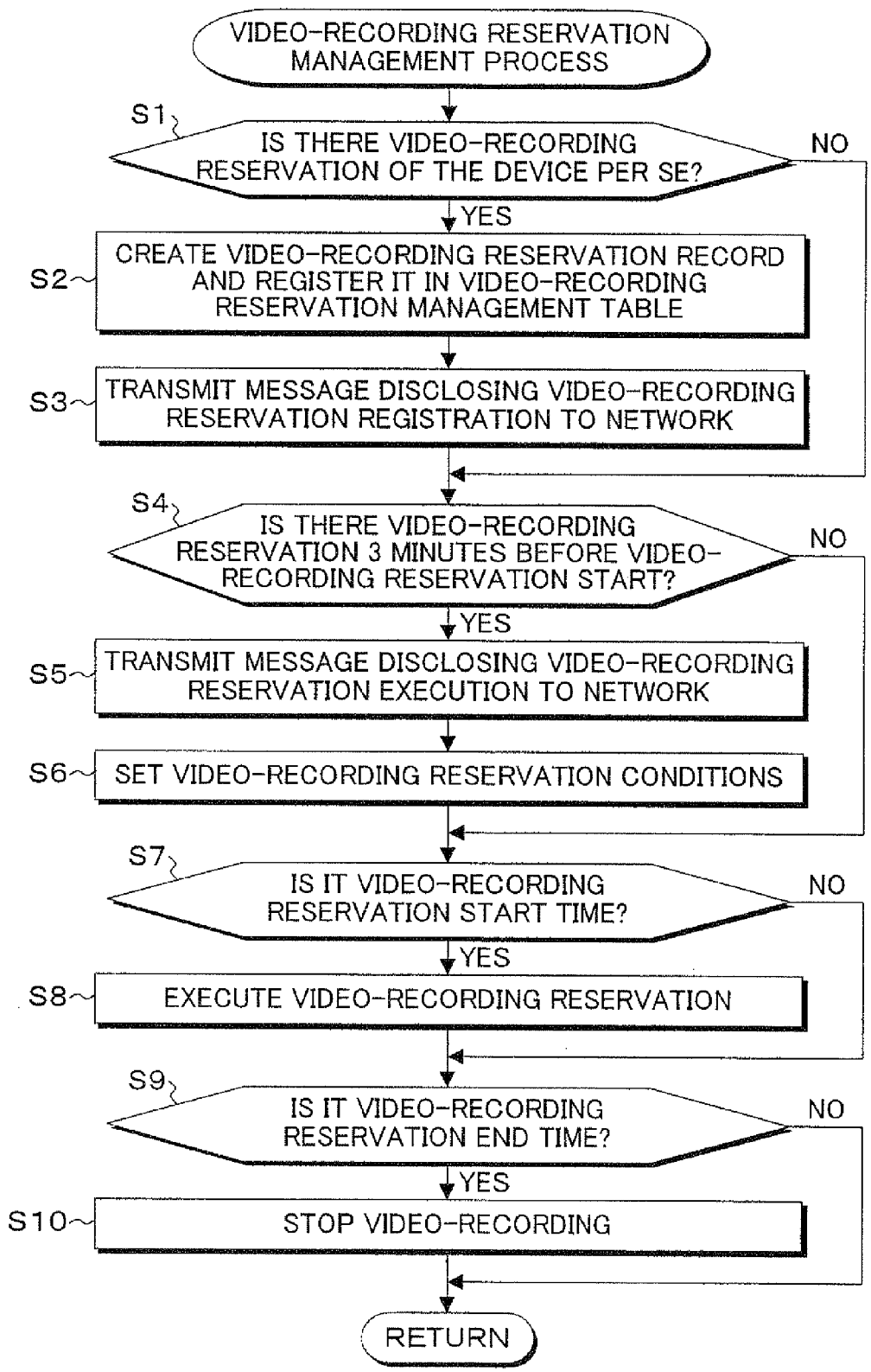
FIG. 10 is a flow chart showing details of the video-recording reservation management process in step S1 of FIG. 9 corresponding to the first embodiment of FIGS. 7A, 7B and 8.

FIG. 10 is a flow chart showing details of the video-recording reservation management process in step S1 of FIG. 9 corresponding to the first embodiment of FIGS. 7A, 7B and 8. In the first embodiment of FIG. 10, in other words, in the video-recording reservation management process in the first mode, presence of a video-recording reservation of the device per se is checked in step S1, and, when there is a video-recording reservation of the device per se made by a user, the process proceeds to step S2 in which a video-recording reservation record of the device per se is created and registered in the video-recording reservation management table 22-1. Subsequently, in step S3, messages disclosing the video-recording reservation registration, in other words, video-recording reservation registration notifications are transmitted to the home network 12. Meanwhile, in step S4, presence of a video-recording reservation which is three minutes before starting the video-recording reservation is checked with respect to the video-recording reservation records of the device per se which are already registered in the video-recording reservation management table 22-1. When there is the video-recording reservation record which is three minutes before starting the video-recording reservation, the process proceeds to step S5 in which messages disclosing video-recording execution are transmitted to the home network 12, and video-recording conditions are set in step S6. As the video-recording conditions in this case, start time, end time, image quality, a compression ratio, etc. in the reservation management record of the device per se registered in the video-recording reservation management table 22-1 shown in FIGS. 4A and 4B are set. Subsequently, in step S7, when it is determined to be the video-recording reservation start time in step S7, video-recording based on the reservation management record of the device per se according to the set video-recording conditions is started in step S8. When the video-recording reservation end time is determined in step S9, the video-recording process which is currently being executed is stopped in step S10.

Figure 11A:
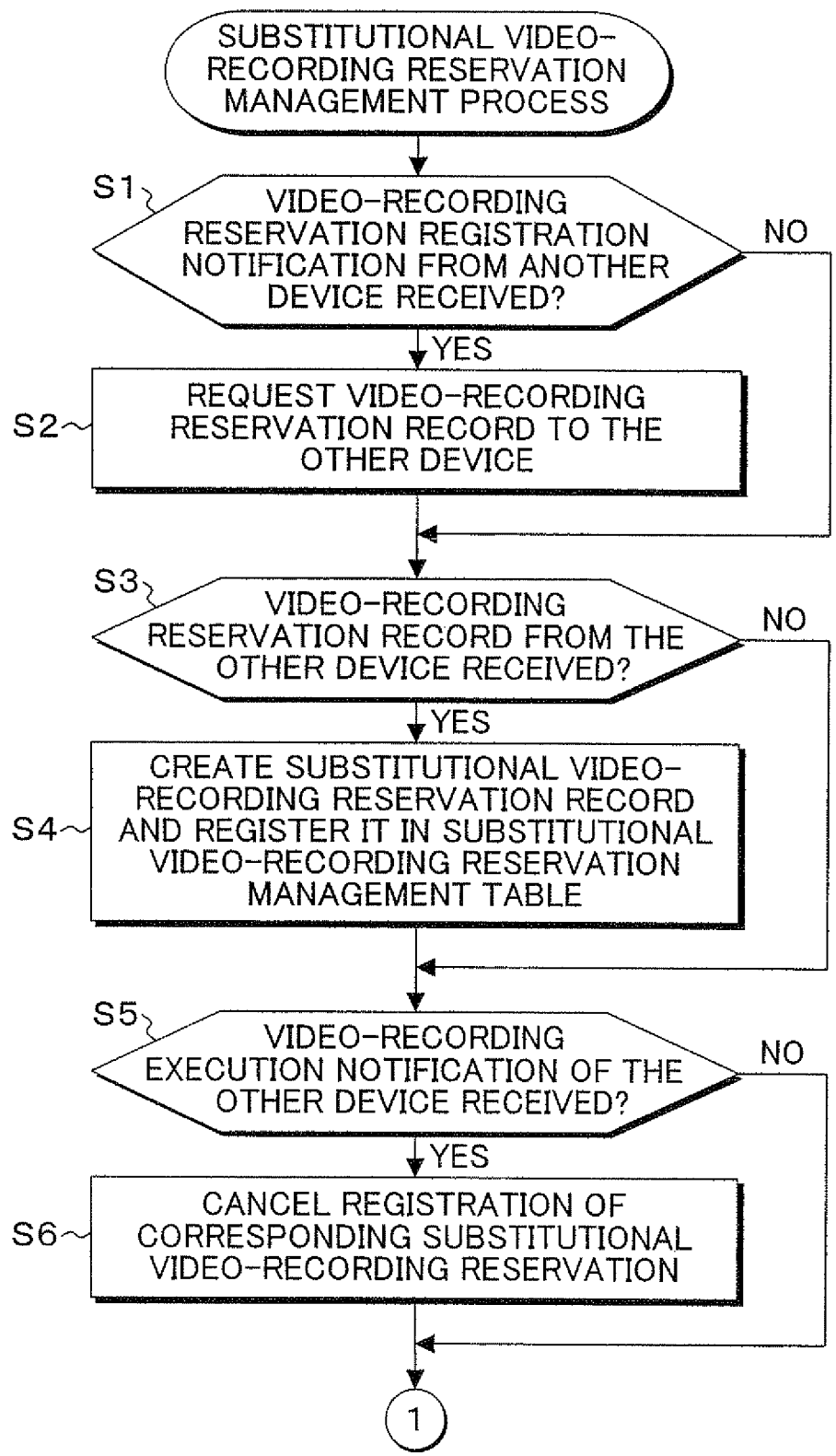
FIGS. 11A and 11B are flow charts showing details of the substitutional video-recording reservation management process in step S2 of FIG. 9 corresponding to the first embodiment of FIGS. 7A, 7B and 8.
Figure 11B:
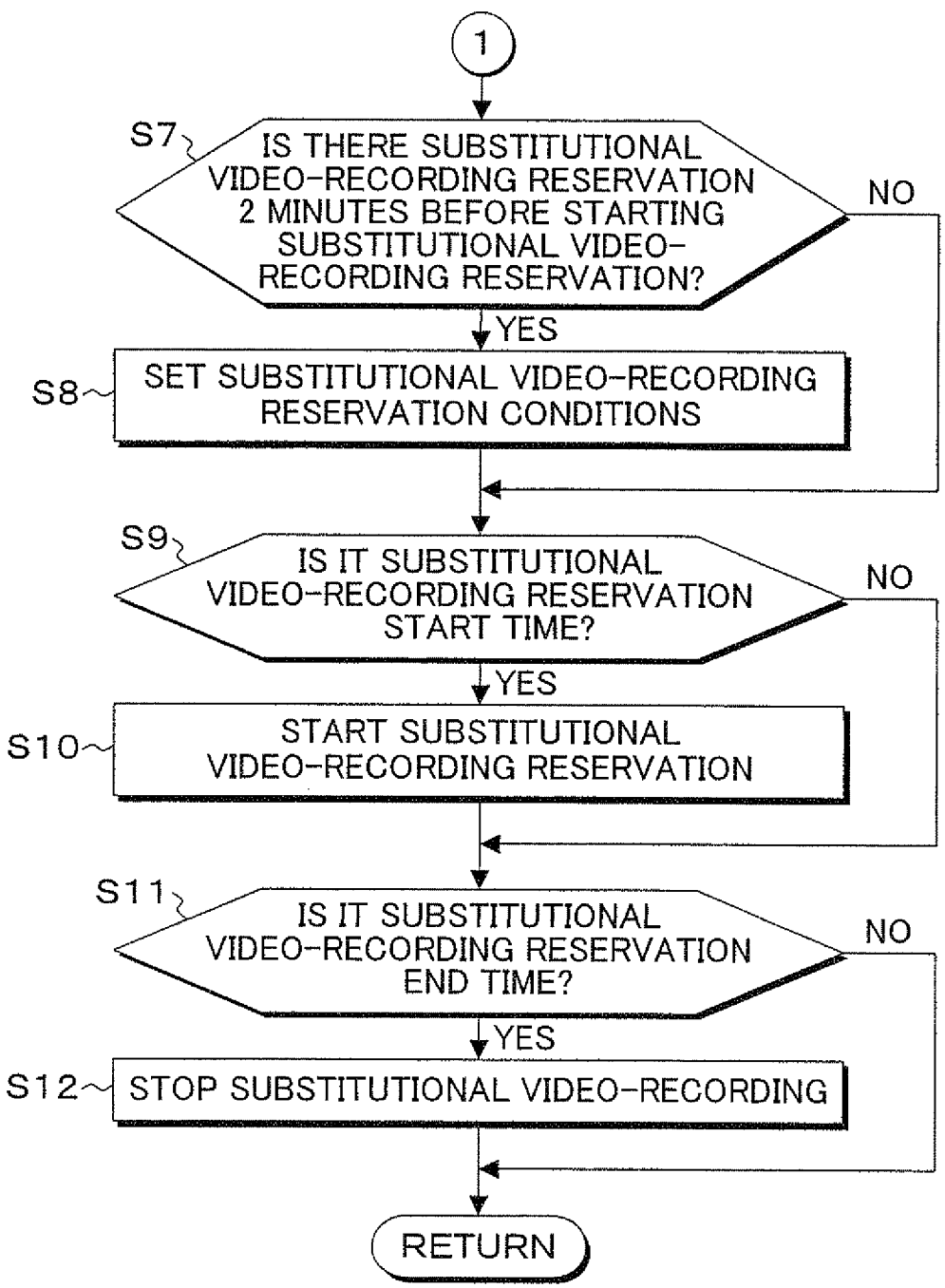

FIGS. 11A and 11B are flow charts showing details of the substitutional video-recording reservation management process of the first mode in step S2 of FIG. 9 corresponding to the first embodiment (first mode) of FIGS. 7A, 7B and 8. In FIGS. 11A and 11B, in the substitutional video-recording reservation management process, whether a video-recording reservation registration notification from another video-recording device is received or not is checked in step S1. When reception of the video-recording reservation registration notification is determined, the process proceeds to step S2 in which the video-recording reservation record thereof is requested to the other video-recording device. When it is determined in step S3 that the video-recording reservation record is received from the other device, the process proceeds to step S4 in which a substitutional video-recording reservation record such as that shown in FIG. 4B is created and registered in the substitutional video-recording reservation management table 24-1. Subsequently, in step S5, whether a video-recording execution notification of the other video-recording device is received or not is checked. When the video-recording execution notification is received, the process proceeds to step S6 in which registration of the substitutional video-recording reservation is cancelled so that the substitutional video-recording is not performed. Meanwhile, when the video-recording execution notification from the other device is not received in step S5, the process proceeds to step S7 in which whether there is a substitutional video-recording reservation record two minutes before starting the substitutional video-recording or not is checked. When there is the substitutional video-recording reservation record, the process proceeds to step S8 in which substitutional video-recording conditions are set, then, the process waits until it is the substitutional video-recording reservation start time in step S9, and the substitutional video-recording is started in step S10. When it is determined to be the substitutional video-recording reservation end time with respect to the substitutional video-recording reservation of which video-recording is being performed in step S11, the substitutional video-recording is stopped in step S12.

Figure 12A:
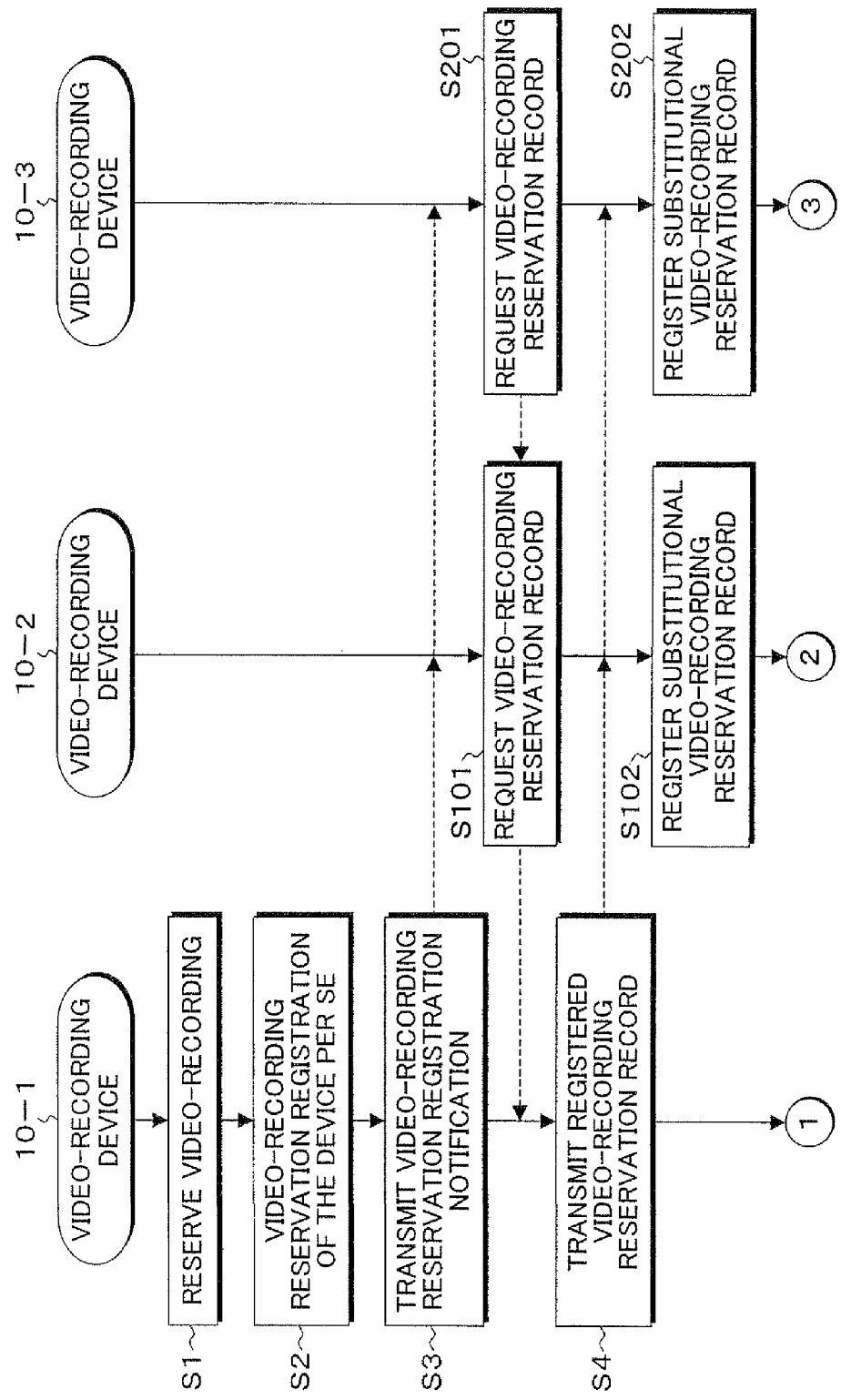
FIGS. 12A and 12B are time charts showing a video-recording reservation management process according to a second embodiment (second mode) of the present invention in the case in which a video-recording reservation is normally executed.
Figure 12B:
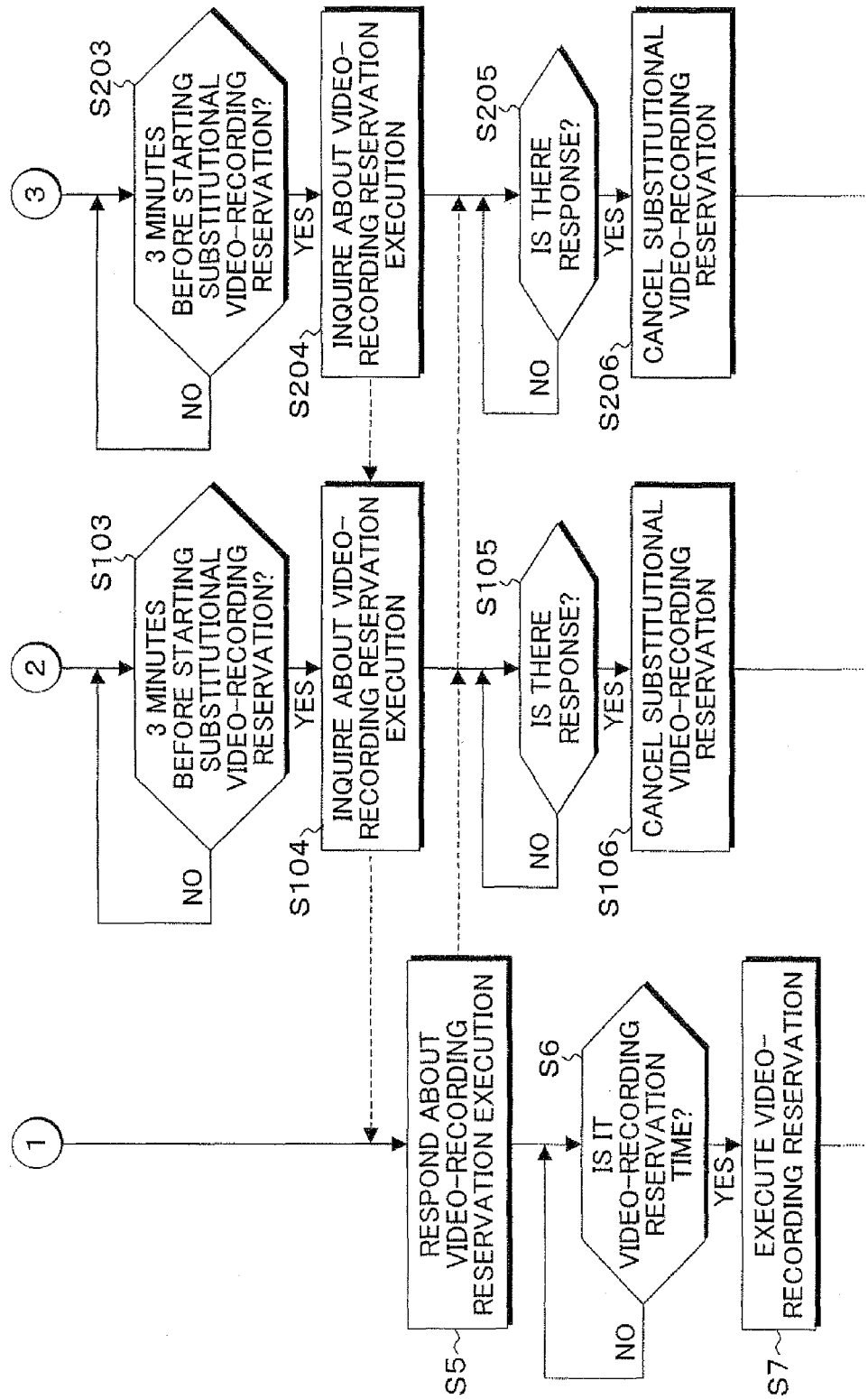

FIGS. 12A and 12B are time charts showing a video-recording reservation management process according to a second embodiment (second mode) in the case in which a video-recording reservation is normally executed. In FIGS. 12A and 12B, in the video-recording device 10-1, after a video-recording reservation is made by user input in step S1, a video-recording reservation record of the device per se is registered in the video-recording reservation management table 22-1 in step S2, and video-recording reservation registration notifications are transmitted to the home network 12 as multicast disclosing messages in step S3. The other video-recording devices 10-2 and 10-3 request video-recording reservation information to the video-recording device 10-1 in steps S101 and S201. In response to this, the video-recording device 10-1 transmits the registered video-recording reservation record in step S4, and, in the video-recording devices 10-2 and 10-3, as shown in steps S102 and S202, substitutional video-recording reservation records are created and registered in the substitutional video-recording reservation tables. Subsequently, in the second mode, in the side of the other video-recording devices 10-2 and 10-3 in which the substitutional video-recording reservations are registered, as shown in steps S103 and S203, reach to the point three minutes before starting the substitutional video-recording reservations is determined; and, when reach to the point three minutes before starting the substitutional video-recording reservations is determined, the processes proceeds to steps S104 and S204 in which the video-recording device 10-1 is inquired about video-recording execution. When the video-recording device 10-1 normally operates, response about video-recording execution is made in step S5. The inquiry of the video-recording execution from steps S104 and S204 and the response of the video-recording execution from step S5 are performed by transmission of echo request packets and responses of echo replay packets according to the ICMP protocol as described above. When video-recording execution responses from the video-recording device 10-1 are determined in step S105 and S205, the video-recording devices 10-2 and 10-3 cancel the substitutional video-recording reservations in steps S106 and S206. Meanwhile, in the video-recording device 10-1, which is normally operating, when it reaches the video-recording reservation start time in step S6, video-recording corresponding to the reservation management record of the device per se is executed in step S7.

Figure 13A:
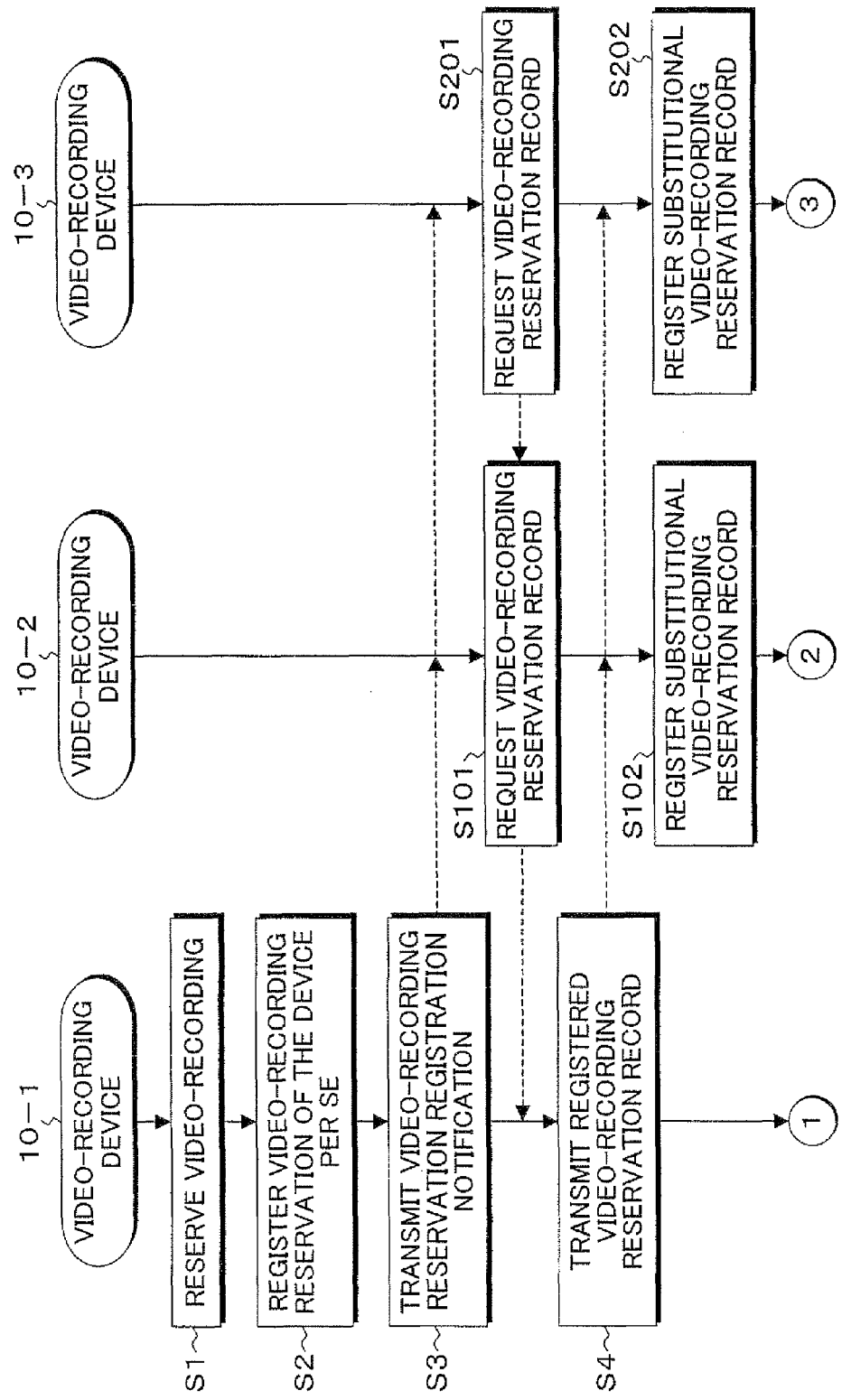

FIGS. 13A and 13B are time charts showing a video-recording reservation management process according to the second embodiment (second mode) of the present invention in the case in which a video-recording reservation is not performed and substitutional video-recording is executed. In FIGS. 13A and 13B, the processes of steps S1 to S4 of video-recording registration performed by user input in the video-recording device 10-1 and steps S101, S5102 and S201, S202 of substitutional video-recording reservation registration in the other video-recording devices 10-2 and 10-3 based on video-recording reservation registration from the video-recording device 10-1 are same as those of FIGS. 12A and 12B. However, it is assumed that failure due to power outage, failure of a communication function, etc. occurs in the video-recording device 10-1 after a video-recording reservation of the device per se is finished. With respect to such failure occurrence, in the video-recording devices 10-2 and 10-3, whether it is three minutes before starting substitutional video-recording reservations or not is determined in step S103 and S203; and, when it is determined to be three-minutes before starting the substitutional video-recording reservations, the processes proceed to steps S104 and S204 in which the video-recording device 10-1 is inquired about video-recording execution. However, since the video-recording device 10-1 is in the failure-occurred state as shown in step S5, it cannot transmit responses to the inquiries of the video-recording execution. Therefore, in the video-recording devices 10-2 and 10-3, when responses are not determined in steps S105 and S205, whether it has reached to a point two minutes before starting the substitutional video-recording reservations or not is checked in steps S106 and S206. When no response is obtained and it reaches the point two minutes before starting the substitutional video-recording reservations, the processes proceed to steps S107 and S207 in which substitutional video-recording is executed. In terms of the execution contents of the substitutional video-recording, substitutional video-recording is started when it reaches the substitutional video-recording reservation start time after substitutional video-recording conditions are set. Meanwhile, when failure occurrence of step S5 in the video-recording device 10-1 is, for example, temporary failure of the communication function, and responses are made when failure is recovered thereafter although responses could not made at the timing of the video-recording execution inquiries due to failure, the responses are determined in steps S105 and S205, and, in that case, the processes proceed to steps S108 and S208 in which the substitutional video-recording reservations are cancelled. In other words, with respect to temporary failure occurrence in the video-recording device, the substitutional video-recording reservations can be canceled at the point when failure is recovered. Note that, in order to confirm the responses generated upon recovery from occurring failure, the inquiries of video-recording execution in steps S104 and S204 are repeatedly performed until it is two minutes before starting the substitutional video-recording reservations in step S106.

Figure 14A:
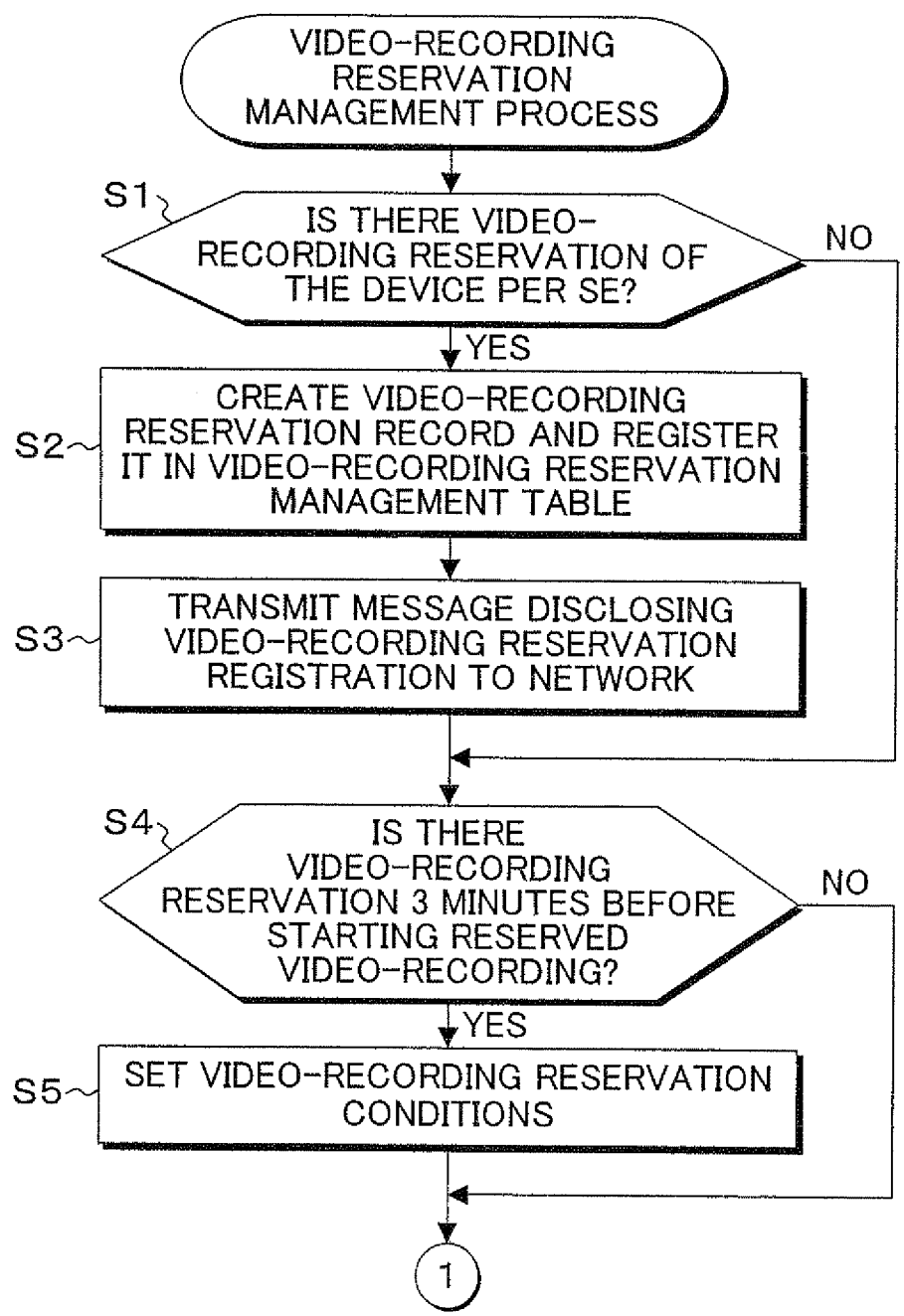
FIGS. 14A and 14B are flow charts showing details of the video-recording reservation management process in step S1 of FIG. 9 corresponding to the second embodiment of FIGS. 12A, 12B, 13A and 13B.
Figure 14B:
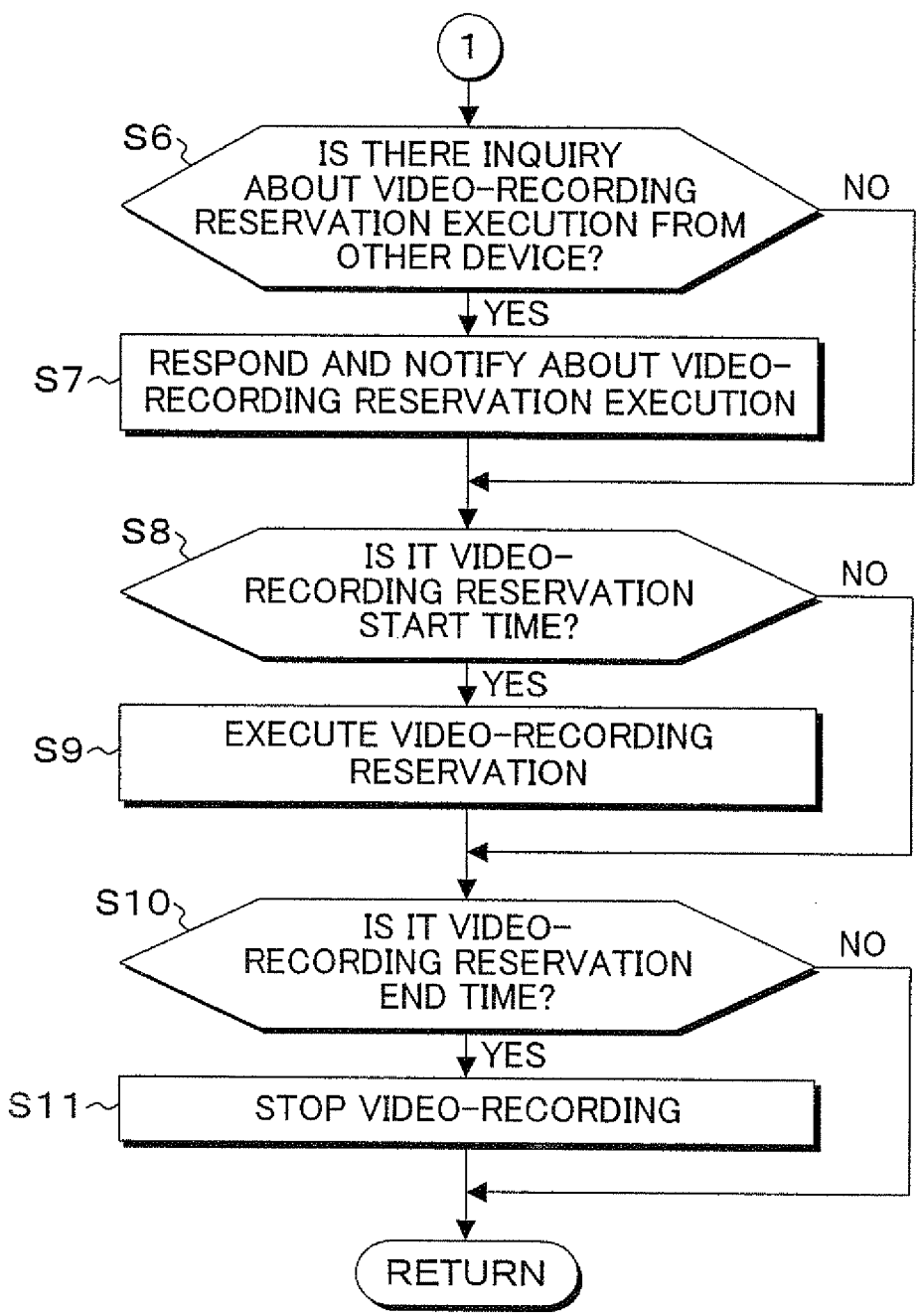

FIGS. 14A and 14B are flow charts showing details of a video-recording reservation management process of the second mode in step S1 of FIG. 9 corresponding to the second embodiment of FIGS. 12A, 12B, 13A and 13B. In the video-recording reservation management process of the second mode of FIGS. 14A and 14B, when a video-recording reservation of the device per se is determined by the video-recording device 10-1 in step S1, the process proceeds to step S2 in which a video-recording record is created and registered in the video-recording reservation management table 22-1. Subsequently, in step S3, disclosing messages of video-recording reservation registration notifications are transmitted to the home network 12. After registration of the video-recording reservation of the device per se is finished, whether there is a video-recording reservation three minutes before starting the video-recording reservation or not is checked in step S4; and, when there is the video-recording reservation three minutes before start, video-recording conditions are set in step S5. In this case, transmission of video-recording execution notifications is not performed in the second mode although video-recording execution notifications are transmitted to the other video-recording devices in the first mode. After setting of the video-recording conditions is finished in step S5, presence of inquiries about video-recording execution from the other video-recording devices is checked in step S6. The other video-recording devices perform the inquiries three minutes before the corresponding substitutional video-recording reservation start time; therefore, when the inquiries are determined in step S6, the process proceeds to step S7 in which responses about video-recording execution are transmitted to the video-recording devices, which are the inquiry origins. Subsequently, when reach to the video-recording reservation start time is determined in step S8, the video-recording is executed in step S9. When reach to the video-recording reservation end time is determined in step S10, the video-recording is stopped in step S11.

Figure 15A:
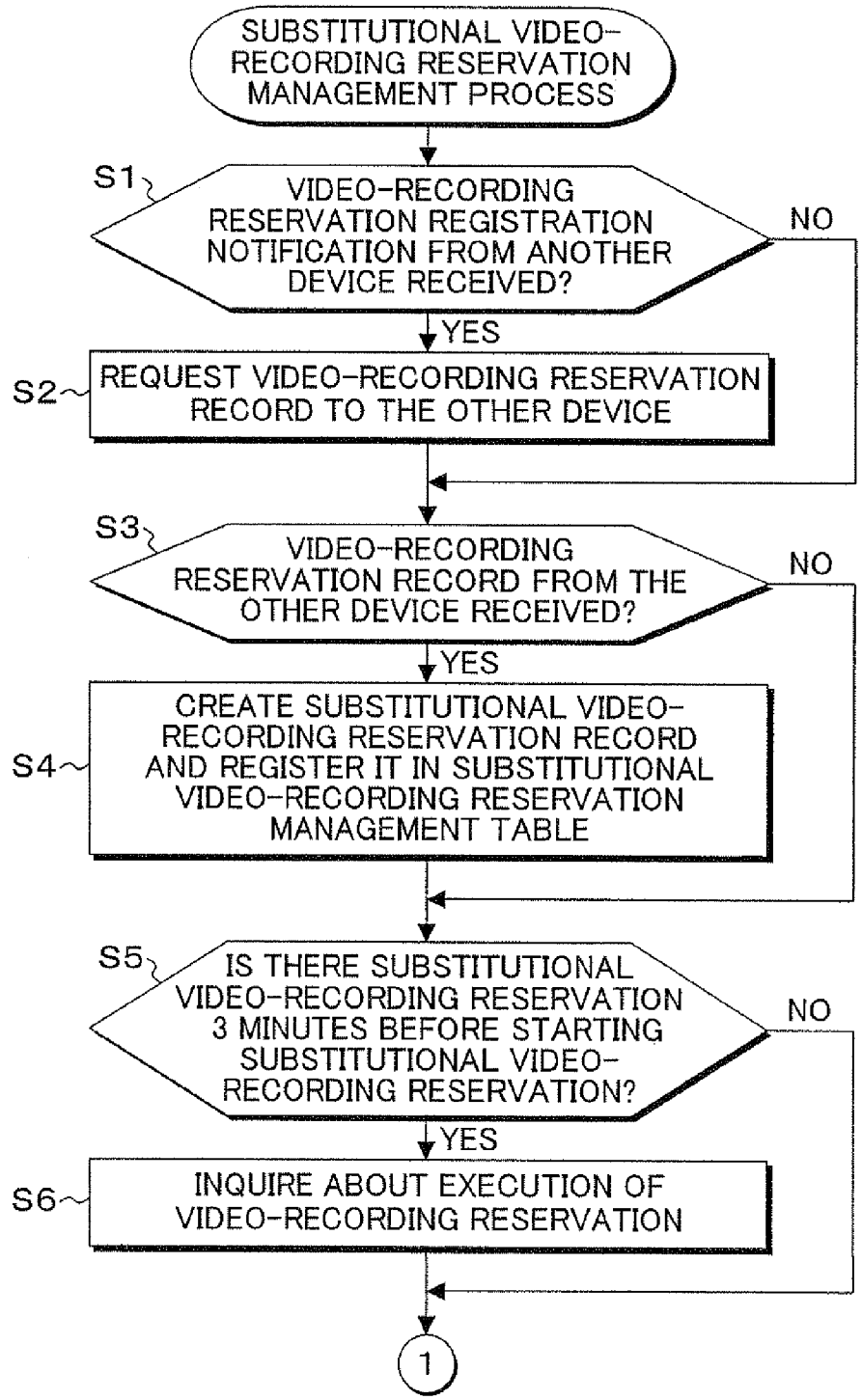
FIGS. 15A and 15B are flow charts showing details of the substitutional video-recording reservation management process in step S2 of FIG. 9 corresponding to the second embodiment of FIGS. 12A, 12B, 13A and 13B.
Figure 15B:
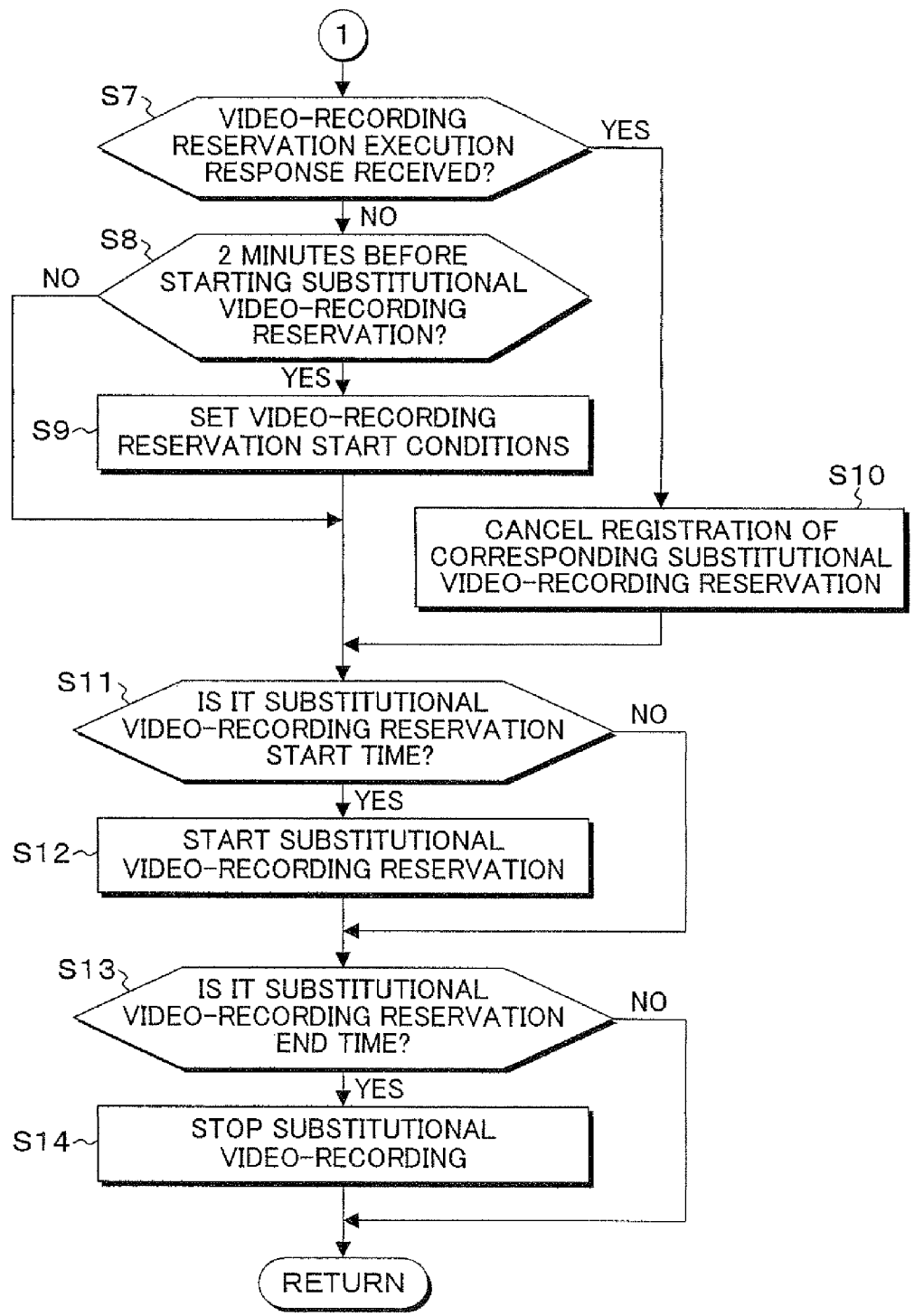

FIGS. 15A and 15B are flow charts showing details of a substitutional video-recording reservation management process of the second mode in step S2 of FIG. 9 corresponding to the second embodiment of FIGS. 12A, 12B, 13A and 13B. In FIGS. 15A and 15B, in the substitutional video-recording reservation process of the second mode, when a video-recording reservation registration notification is received from another video-recording device in step S1, a video-recording reservation record is requested to the other video-recording device in step S2. When reception of the video-recording reservation record from the other video-recording device is determined in step S3, a substitutional video-recording reservation record is created and registered, for example, in the substitutional video-recording reservation management table 24-1 in the case of the video-recording device 10-1. Subsequently, presence of a substitutional video-recording reservation which is three minutes before starting the substitutional video-recording reservation is checked in step S5; and, when there is the substitutional video-recording reservation, the other video-recording device 10-2 or 10-3 is inquired about execution of the video-recording reservation in step S6. When a response about the video-recording execution is received in step S7, the process proceeds to step S10 in which the registration of the corresponding substitutional video-recording reservation is cancelled. On the other hand, when the video-recording execution response cannot be received in step S7 due to failure of the counterpart video-recording device, the process proceeds to step S8, and, when it is two minutes before starting the substitutional video-recording reservation, the process proceeds to step S9 in which video-recording reservation start conditions are set. Subsequently, when reach to the substitutional video-recording reservation start time is determined in step S11, the substitutional video-recording is started in step S12. When the substitutional video-recording reservation end time is determined in step S13, the substitutional video-recording is stopped in step S14.

Figure 16A:
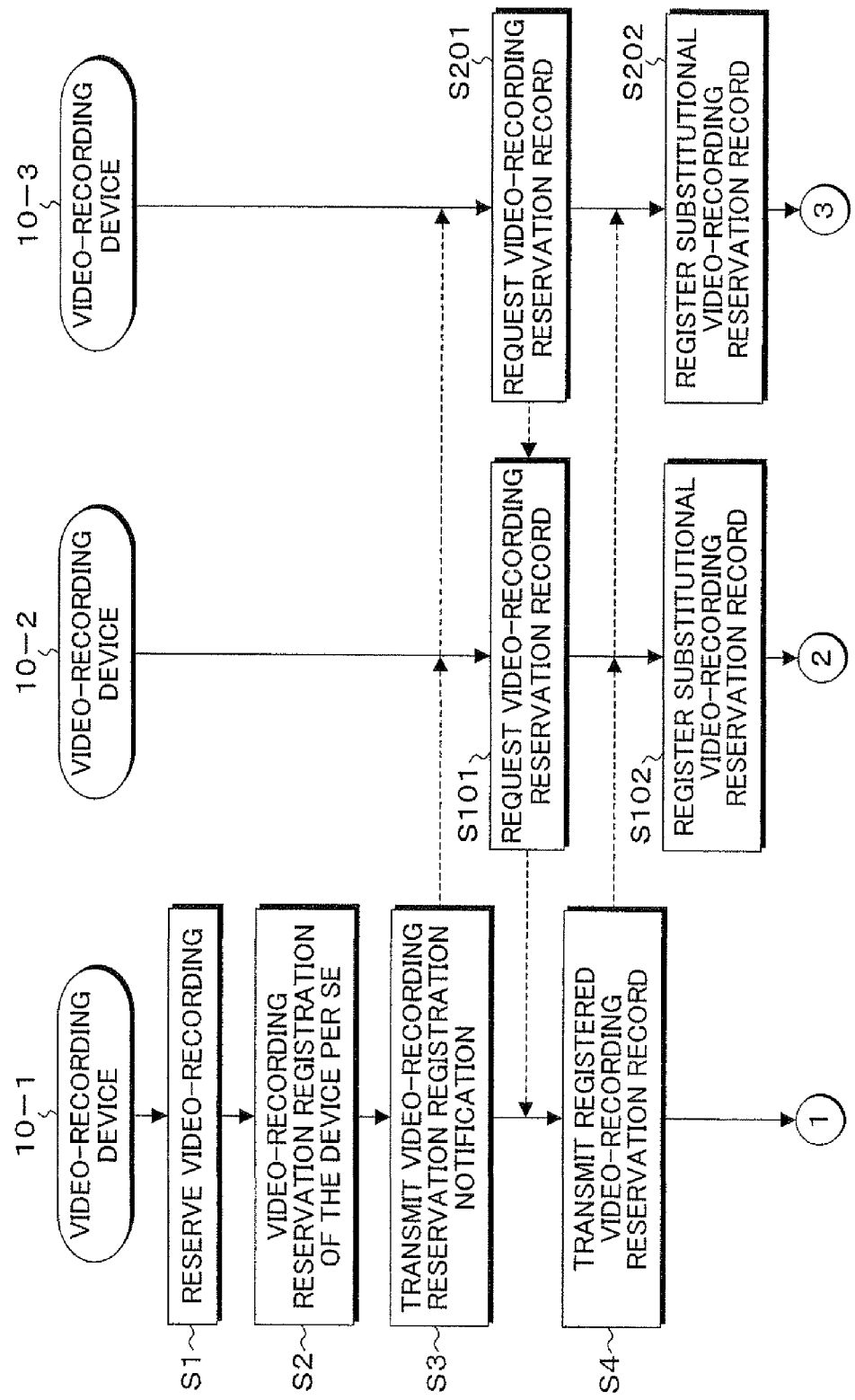

FIGS. 16A and 16B are time charts showing a video-recording reservation management process according to a third embodiment (third mode) of the present invention in the case in which a video-recording reservation is normally executed. Herein, the process of the third mode is a combination process of the first mode and the second mode. In FIGS. 16A and 16B, the operation of the normal case when a video-recording reservation based on user input is performed in the video-recording device 10-1 is same as that of the case of the first mode shown in FIGS. 7A and 7B.

Figure 17A:
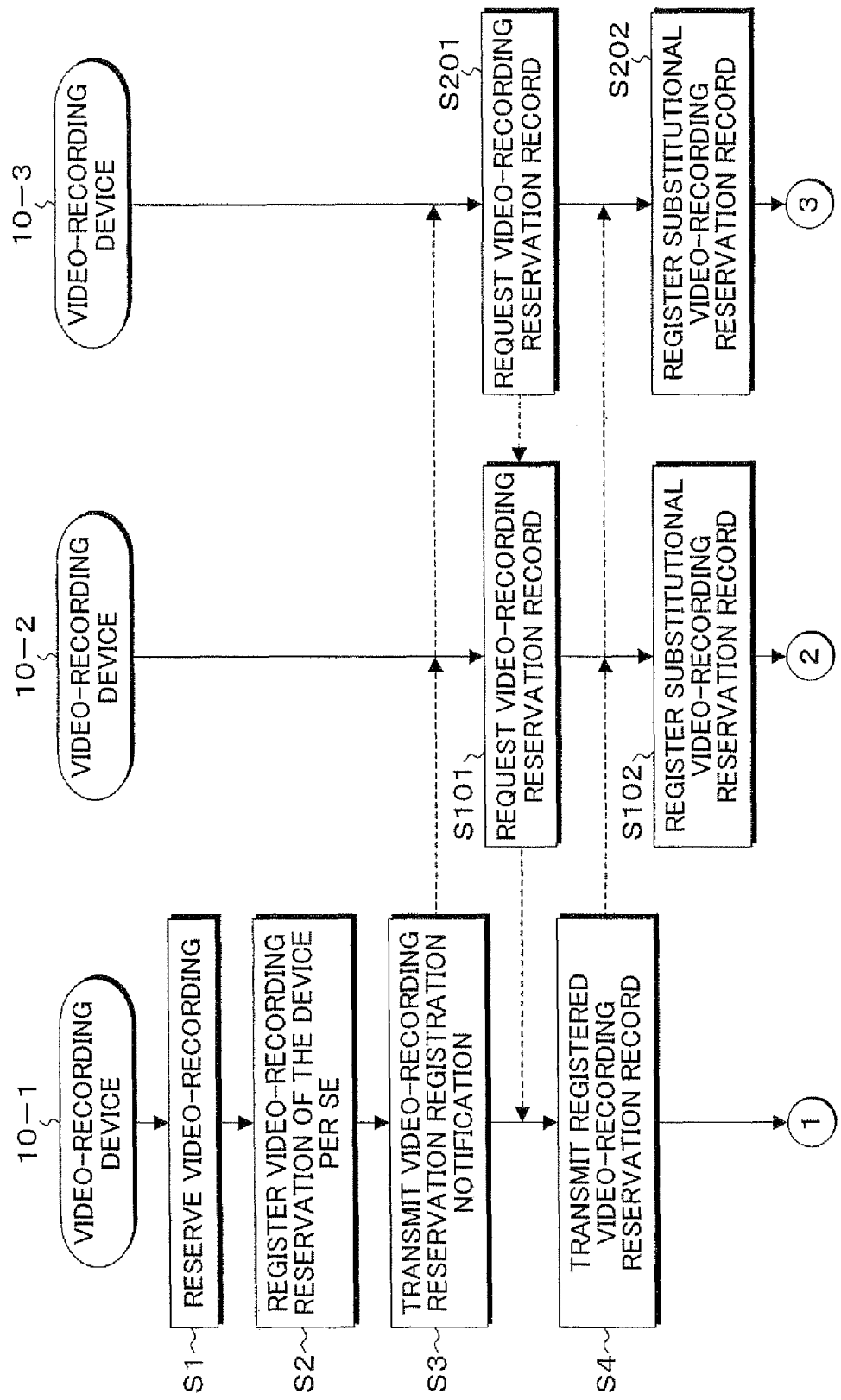

FIGS. 17A and 17B are time charts showing a video-recording reservation management process according to the third embodiment (third mode) in the case in which a video-recording reservation is not performed and substitutional video-recording is executed. In FIGS. 17A and 17B, in the video-recording device 10-1, after the video-recording reservation is made by user input in step S1, video-recording reservation registration of the device per se, in other words, registration of a video-recording reservation record with respect to the video-recording reservation management table 22-1 of FIG. 2 is performed in step S2. Along with the registration, video-recording reservation registration notifications are transmitted to the home network 12 as multicast disclosing messages in step S3, the other video-recording devices 10-2 and 10-3 request video-recording reservation information in steps S101 and S201, the registered video-recording reservation information is transmitted in step S4, and registration of substitutional video-recording reservations in the video-recording devices 10-2 and 10-3 is performed in steps S102 and S202. Then, it is assumed that failure such as power outage, failure of the communication function, or the like occurs in the video-recording device 10-1 in step S5. In this case, video-recording execution notifications cannot be transmitted from the video-recording device 10-1 at the timing that is three minutes before video-recording reservation start time like the case in which it normally operates; therefore, in the video-recording devices 10-2 and 10-3 in the substituting side, when reach to the point that is two minutes before starting the substitutional video-recording reservations is determined in steps S103 and S203, the video-recording device 10-1 is inquired about video-recording execution in steps S104 and S204. In response to the inquiries, in the video-recording device 10-1, execution responses cannot be obtained since it is in the failure-occurred state. After no response is determined in each of steps S105 and S205, when reach to the point that is one minute before starting the substitutional video-recording reservations is determined in steps S106 and S206, the processes respectively proceed to steps S107 and S207, and substitutional video-recording is executed. In execution of the substitutional video-recording, reach to the substitutional video-recording reservation start time is determined so as to start the substitutional video-recording. Meanwhile, when the failure of the video-recording device is temporary and then recovered, and responses with respect to the inquiries of steps S104 and S204 which are repeatedly performed until when it is one minute before substitutional video-recording reservation start are obtained from the video-recording device 10-1, the processes proceed from steps S105 and S205 to S108 and S208, respectively, wherein the substitutional video-recording reservations are cancelled, and, in this case, the video-recording reservation is executed in the side of the video-recording device 10-1 which has been recovered from the failure.

Figure 18:
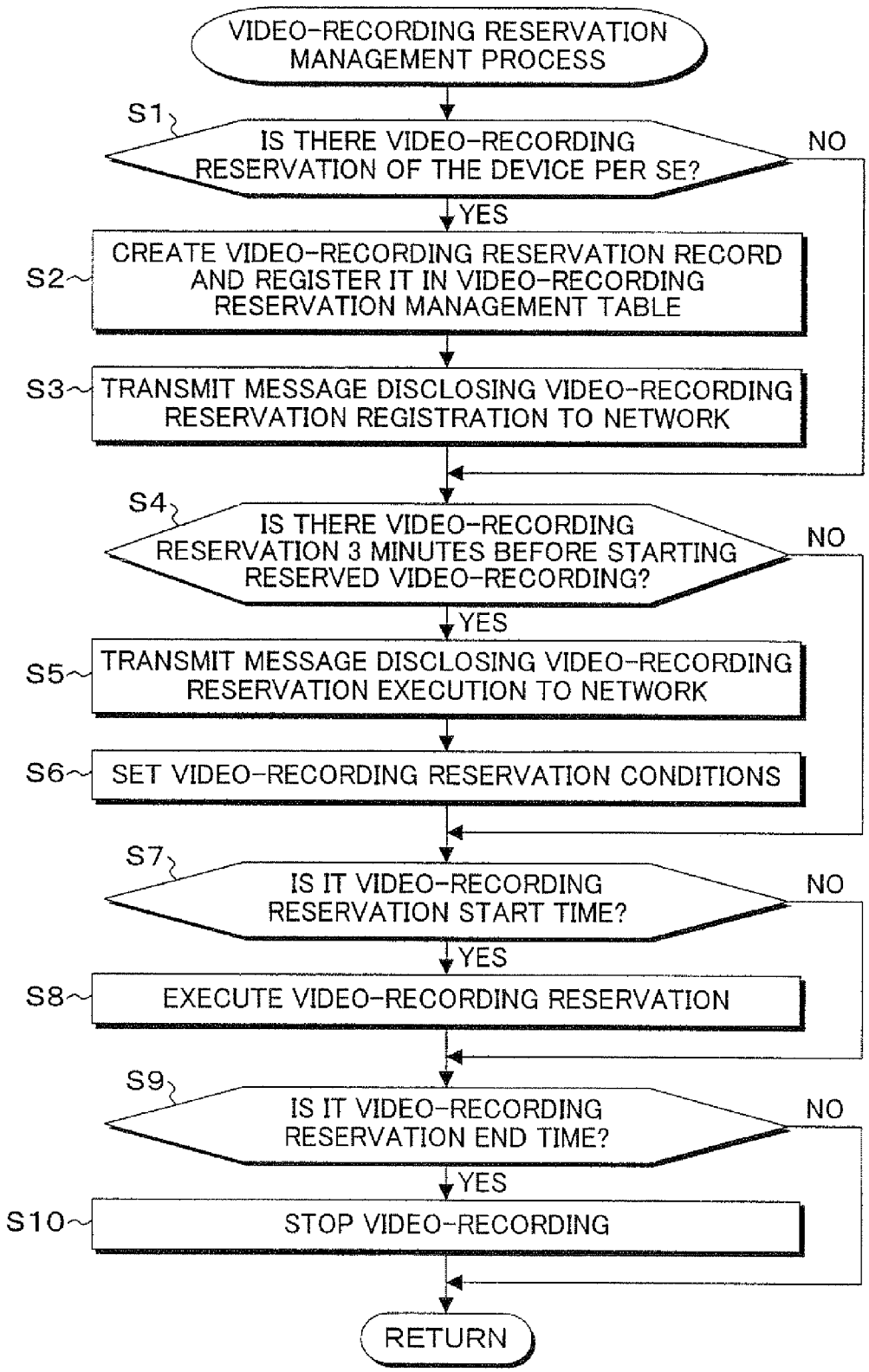
FIG. 18 is a flow chart showing details of the video-recording reservation management process in step S1 of FIG. 9 corresponding to the third embodiment of FIGS. 16A, 16B, 17A and 17B.

FIG. 18 is a flow chart showing details of a video-recording reservation management process of the third mode in step S1 of FIG. 9 corresponding to the third embodiment of FIGS. 16A, 16B, 17A and 17B. The video-recording reservation management process of the third mode is same as the video-recording reservation management process of the first mode shown in FIG. 10.

Figure 19A:
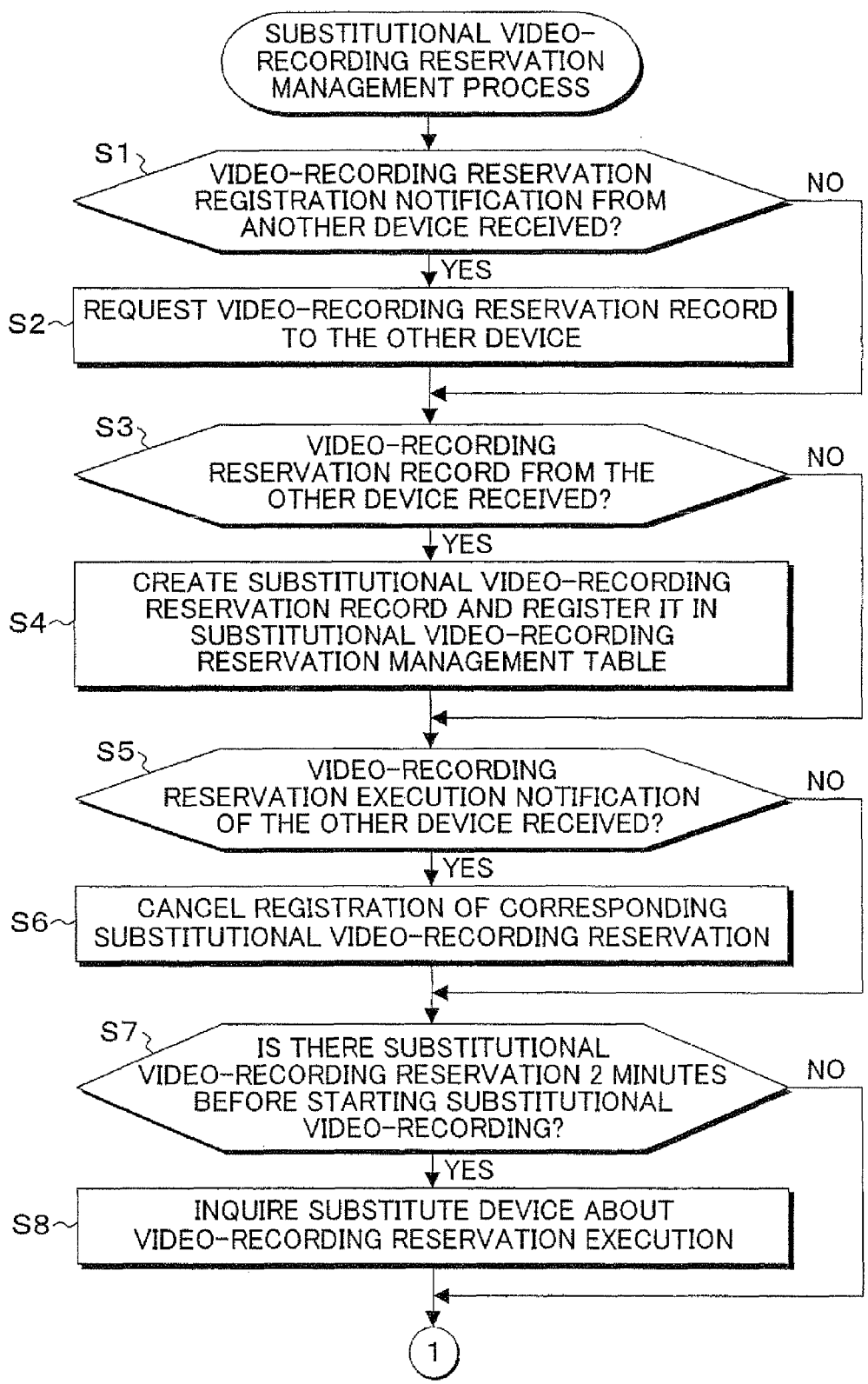
FIGS. 19A and 19B are flow charts showing details of the substitutional video-recording reservation management process in step S2 of FIG. 9 corresponding to the third embodiment of FIGS. 16A, 16B, 17A and 17B.
Figure 19B:
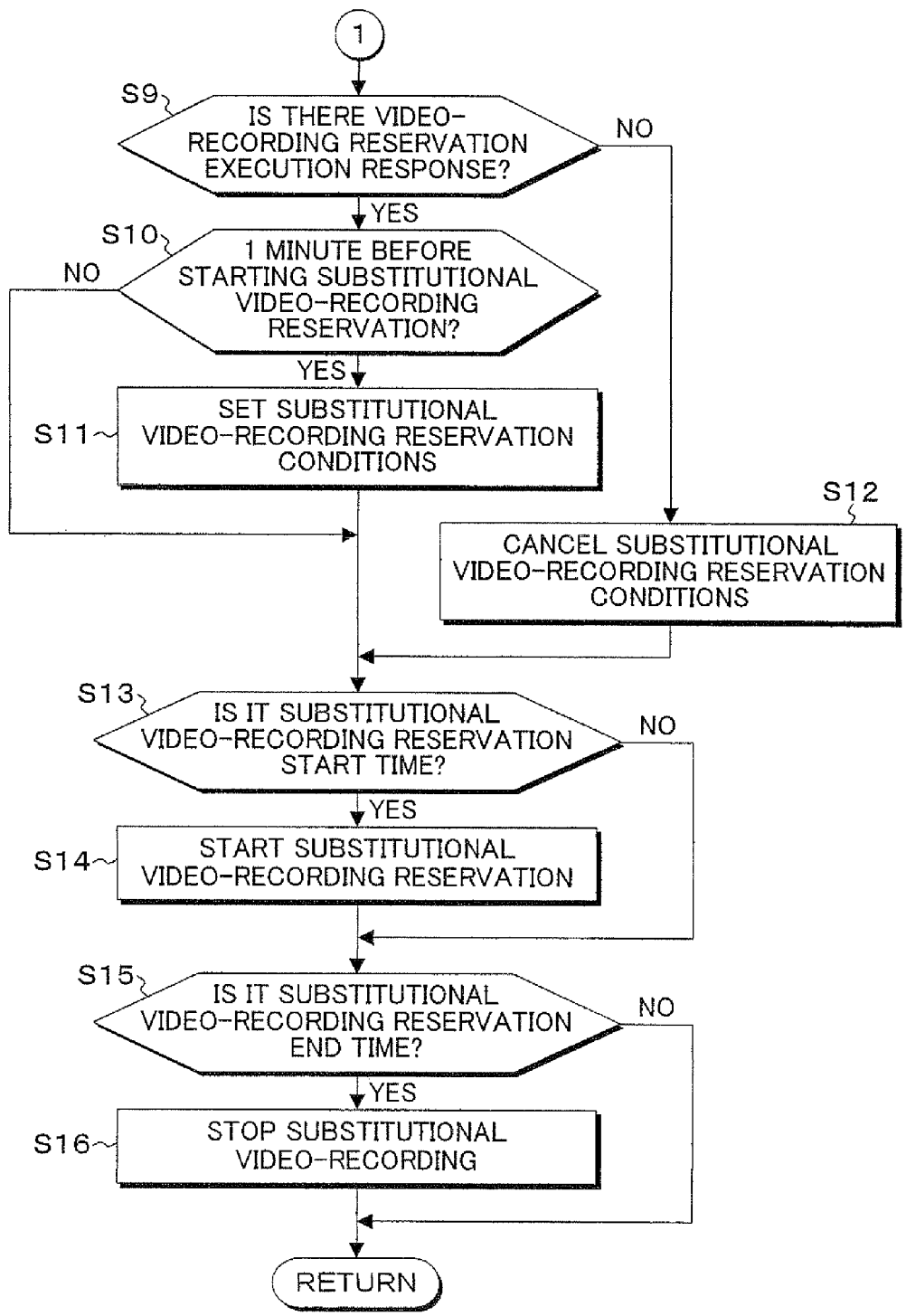

FIGS. 19A and 19B are flow charts showing details of a substitutional video-recording reservation management process of the third mode in step S2 of FIG. 9 corresponding to the third embodiment of FIGS. 16A, 16B, 17A and 17B. The substitutional video-recording reservation management process of the third mode of FIGS. 19A and 19B will be described below for the video-recording device 10-1 of FIG. 2. In the first place, when a video-recording reservation registration notification from another video-recording device 10-2 or 10-3 is received in step S1, a video-recording reservation record is requested to the other video-recording device 10-2 or 10-3 in step S2. When the video-recording reservation record is received from the other video-recording device 10-2 or 10-3, the process proceeds to step S4 in which a substitutional video-recording reservation record is created and registered in the substitutional video-recording reservation management table 24-1. Subsequently, whether a video-recording execution notification from the other video-recording device 10-2 or 10-3 is received or not is checked. When the video-recording execution notification is received, the process proceeds to step S6 in which registration of the corresponding substitutional video-recording reservation is cancelled. Whether there is a substitutional video-recording reservation that is two minutes before starting the substitutional video-recording reservation or not is checked in step S7, and when the substitutional video-recording reservation is determined, the process proceeds to step S8 in which the video-recording device 10-2 or 10-3 is inquired about video-recording execution. Subsequently, when there is a response of video-recording execution from the inquiry destination in step S9, the process proceeds to step S12 in which the corresponding substitutional video-recording reservation is cancelled. When no video-recording execution response is obtained in step S9, the process proceeds to step S10 in which whether it is one minute before starting the substitutional video-recording reservation or not is checked, and, when it is one minute before, substitutional video-recording conditions are set in step S11. Subsequently, when reach to the substitutional video-recording reservation start time is determined in step S13, substitutional video-recording is started in step S14.

FIGS. 20A and 20B are explanatory diagrams showing a video-recording reservation management table and a substitutional video-recording reservation management table used in a fourth embodiment of the present invention, wherein FIG. 20A shows the video-recording reservation management table 22-1, and FIG. 20B shows the substitutional video-recording reservation management table 24-1. The video-recording reservation management table 22-1 of FIG. 20A is same as that of FIG. 4A; however, in the substitutional video-recording reservation management table 24-1 of FIG. 20B, priorities of substitutional video-recording reservations are further set in addition to the IDs, channels, start time, end time, substitute devices, image quality, and compression ratios. As the priorities of the substitutional video-recording reservations, the resources which can be allocated to the substitutional video-recording reservations, specifically, free space of moving-image files which can be used by substitutional video-recording reservations are exchanged between the plurality of video-recording devices in which the substitutional video-recording reservations are registered, and the priorities are set in the descending order of free space. The priorities of the substitutional video-recording reservations are set so that substitutional video-recording can be executed merely in the video-recording device having the highest priority when a plurality of video-recording devices connected on the home network 12 which can perform substitutional video-recording are present. More specifically, in the substitutional video-recording of the above-described first mode, second mode, and the third mode, when a plurality of video-recording devices which can perform substitutional video-recording are present on a network, substitutional video-recording is simultaneously performed by the plurality of substitutional video-recordable devices, and video-recording files are created by the substitutional video-recording in the plurality of video-recording devices. On the other hand, in the fourth embodiment of FIGS. 20A and 20B, merely the video-recording substitute device having the first highest priority performs substitutional video-recording, wherein substitutional video-recording can be performed merely by one video-recording device even when there are a plurality of video-recording devices which can perform substitutional video-recording. The priorities of the substitutional video-recording reservations are set so that the set time before substitutional video-recording reservation start is varied. For example, in the first mode of the present embodiment, when failure of a video-recording device which is to execute a video-recording reservation occurs, video-recording devices which are to perform substitutional video-recording execute substitutional video-recording two minutes before starting the substitutional video-recording reservation; however, in the fourth embodiment in which priorities of substitutional video-recording are set, they are set so that the higher the priority, the longer the remaining time before substitutional video-recording execution time for example in the manner that (1) substitutional video-recording is executed two minutes before substitutional video-recording reservation start for the first priority and (2) substitutional video-recording is executed one minute before substitutional video-recording reservation start for the second priority.

Therefore, the substitutional video-recording reservation is executed first in the video-recording device having the substitutional video-recording reservation start time that is the first time in accordance with the priorities, and substitutional video-recording in the other video-recording devices having lower priorities can be prohibited by notifying the other video-recording devices of the substitutional video-recording execution at that point.

FIGS. 21A and 21B are time charts showing a video-recording reservation management process according to the fourth embodiment of the present invention in the case in which a video-recording reservation is normally executed. FIGS. 21A and 21B take, as an example, the case in which reservation registration by user input is performed in the video-recording device 10-1, and substitutional video-recording reservations are made in the other video-recording devices 10-2 and 10-3. The video-recording reservation management process in the fourth embodiment is that of the case to which the priorities of substitutional video-recording reservations are applied to the first mode shown in FIGS. 7A and 7B. In FIGS. 21A and 21B, the processes of steps S1 to S8 in the video-recording device 10-1 are same as that of the video-recording device 10-1 of FIGS. 7A and 7B. Meanwhile, in the video-recording devices 10-2 and 10-3 which perform substitutional video-recording, resource information, for example, free space of image-recording files is mutually exchanged in step S103 after registration of a substitutional video-recording reservation, and priorities are set. In this example, a first priority is set for the video-recording device 10-2 since the free space thereof is large, and a second priority is set for the video-recording device 10-3 since it has small free space. The processes in the video-recording devices 10-2 and 10-3 other than these are same as that of the case of FIGS. 7A and 7B.

FIGS. 22A and 22B are time charts showing a video-recording reservation management process in the fourth embodiment of the present invention in the case in which a video-recording reservation is not executed and substitutional video-recording is executed. In FIGS. 22A and 22B, the video-recording device 10-1 performs reservation registration by user input and performs communication of the video-recording reservation registration and transmission of video-recording reservation information with respect to the other video-recording devices in steps S1 to S4 as well as FIGS. 21A and 21B, and then, it is assumed that failure such as power outage, malfunction of a communication function, etc. occurs as shown in step S5. With respect to the failure occurrence of the video-recording device 10-1, in the video-recording devices 10-2 and 10-3 in which substitutional video-recording reservations are registered, priorities of the substitutional video-recording reservations are set through exchange processes of resource information in step S103 and S203, wherein the video-recording device 10-2 has the first priority, and the video-recording device 10-3 has the second priority. Therefore, whether it is two minutes before substitutional video-recording reservation start or not is checked in step S104 in video-recording device 10-2 of the first priority; and, when reach to the point that is two minutes before substitutional video-recording reservation start is determined, in step S105, the video-recording device 10-3 which also performs substitutional video-recording is notified of substitutional video-recording execution. In response to this, the video-recording device 10-3 cancels the substitutional video-recording reservation in step S205. The video-recording device 10-2 of the first priority then executes substitutional video-recording in step S106. More specifically, the substitutional video-recording is executed when it reaches the substitutional video-recording reservation start time.

Figure 23:
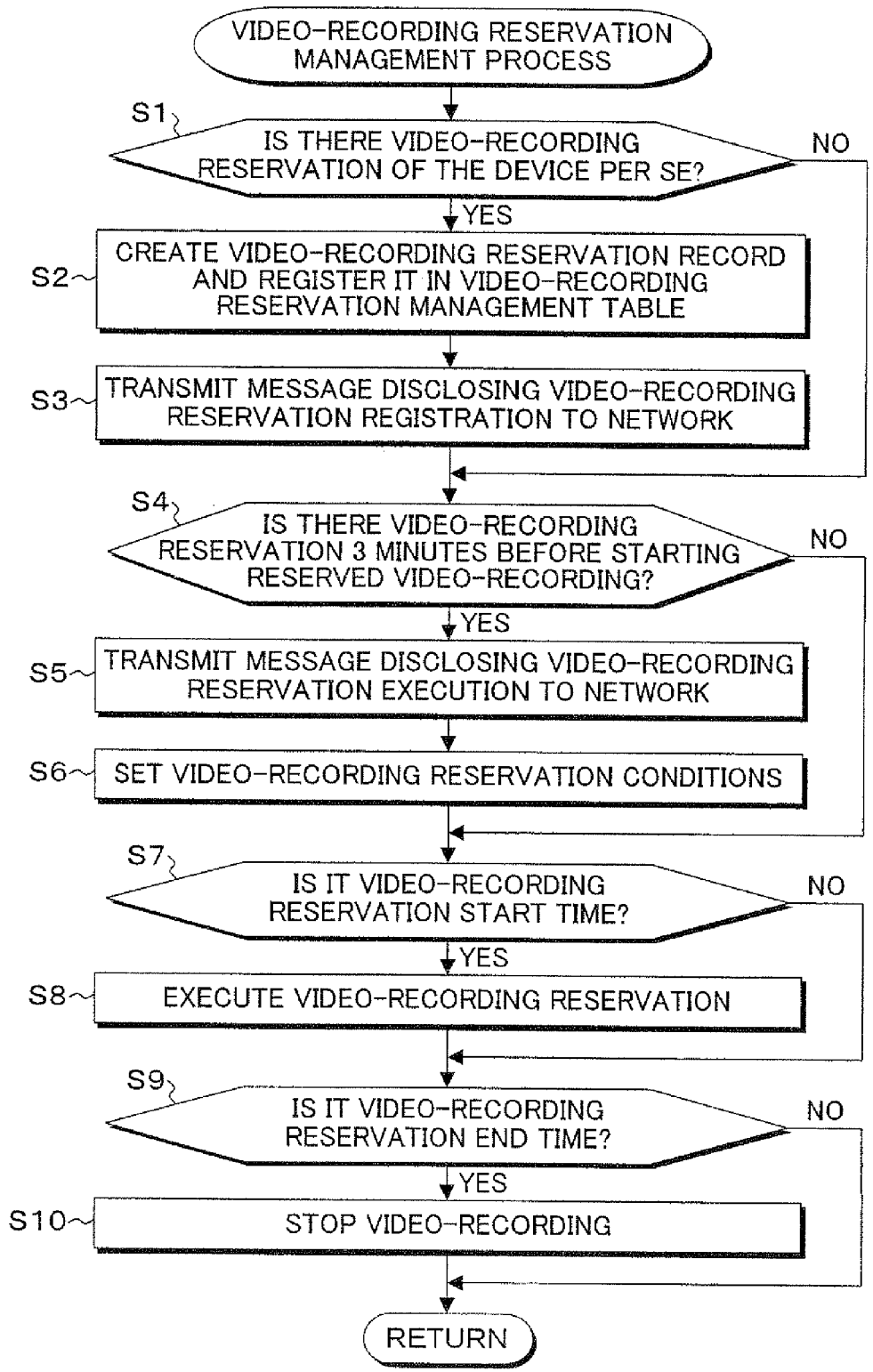
FIG. 23 is a flow chart showing details of the video-recording reservation management process in step S1 of FIG. 9 corresponding to the fourth embodiment of FIGS. 21A, 21B, 22A and 22B.

FIG. 23 is a flow chart showing details of a video-recording reservation management process in step S1 of FIG. 9 corresponding to the fourth embodiment of FIGS. 21A, 21B, 22B and 22B. The flow chart of the video-recording reservation management process of the fourth embodiment is same as the video-recording reservation management process of the first mode shown in FIG. 10.

Figure 24A:
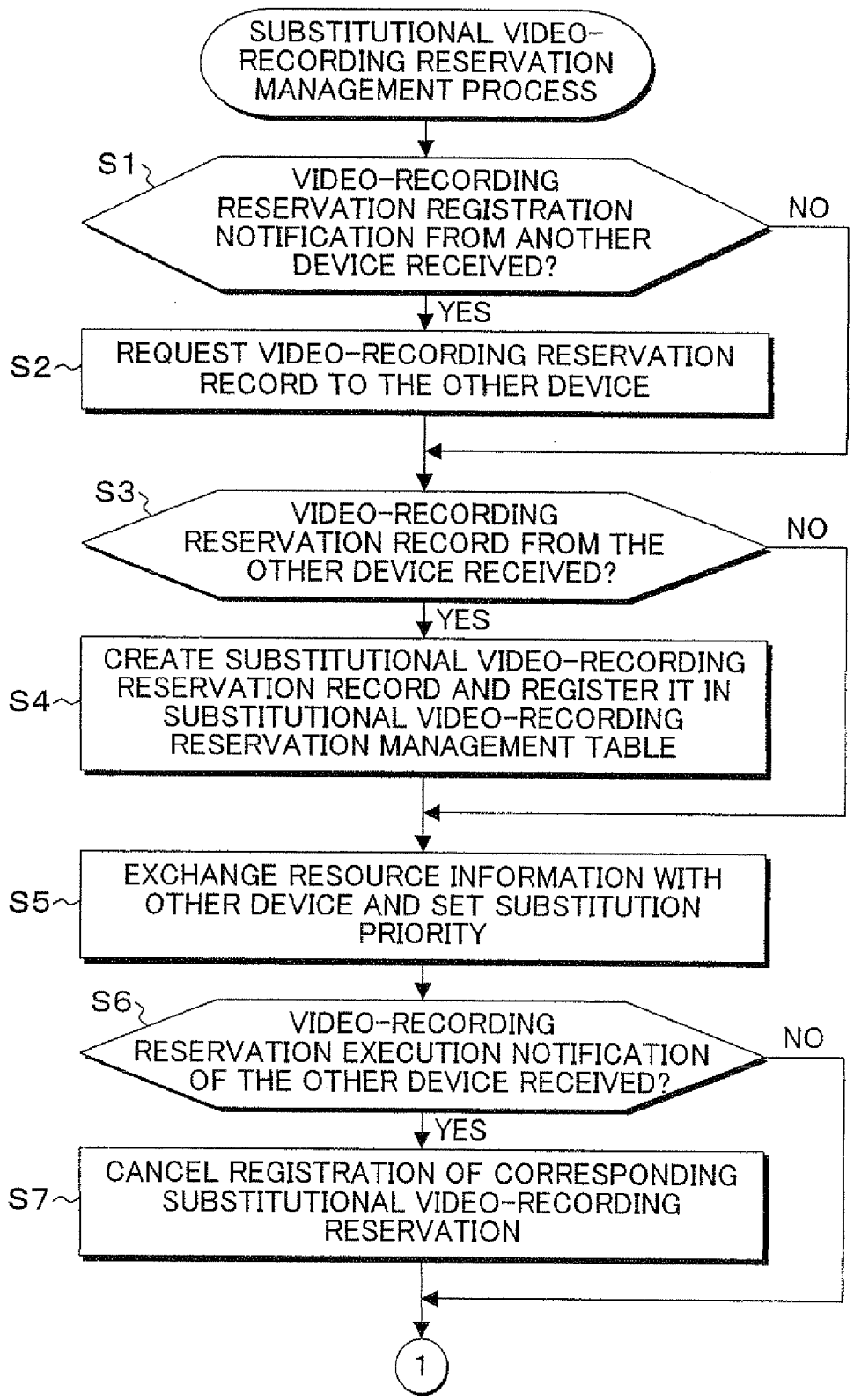
FIGS. 24A and 24B are flow charts showing details of the substitutional video-recording reservation management process in step S2 of FIG. 9 corresponding to the fourth embodiment of FIGS. 21A, 21B and 23.
Figure 24B:
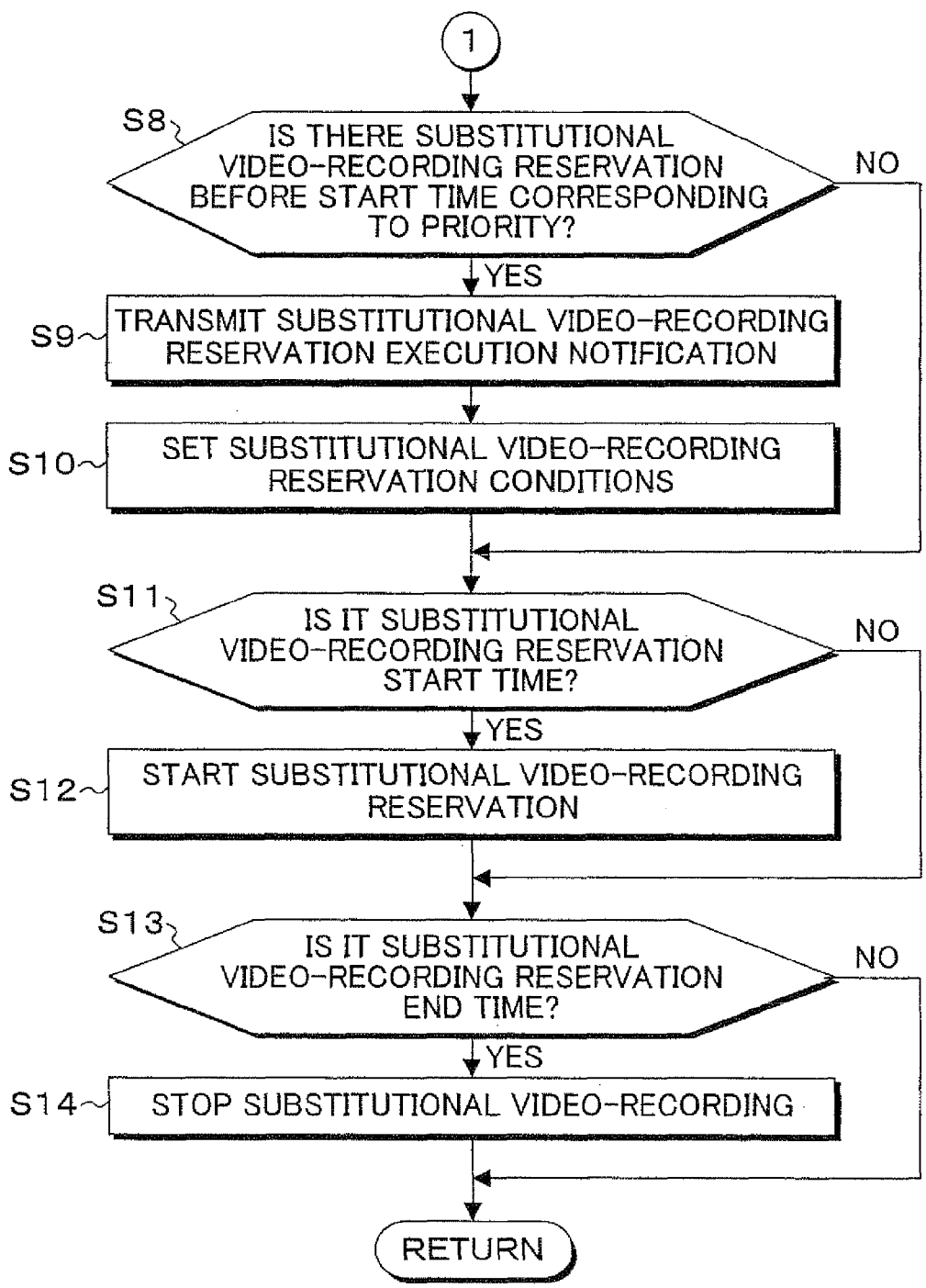

FIGS. 24A and 24B are flow charts showing details of a substitutional video-recording reservation management process in step S2 of FIG. 9 corresponding to the fourth embodiment of FIGS. 21A, 21B and 23. In the substitutional video-recording reservation management process of FIGS. 24A and 24B, when a video-recording reservation registration notification is received from another video-recording device in step S1, a video-recording reservation record is requested to the other video-recording device in step S2. When the video-recording reservation record is received from the other video-recording device in step S3, a substitutional video-recording reservation record is created and registered in the substitutional video-recording reservation management table in step S4. Subsequently, in step S5, resource information is exchanged with the other video-recording devices which perform substitutional video recording, and priorities are set. Subsequently, when a video-recording execution notification from any of the other video-recording devices is determined in step S6, the registration of the corresponding substitutional video-recording is cancelled in step S7. Meanwhile, presence of a substitutional video-recording reservation before substitutional video-recording reservation start time which is corresponding to the priority is checked in step S8, and, when there is the substitutional video-recording reservation, the reservation of the substitutional video-recording is transmitted to the video-recording devices in which other substitutional video-recording reservations are registered, thereby cancelling the substitutional video-recording in the video-recording devices with low priorities in step S9. Subsequently, substitutional video-recording conditions are set in step S10, and, when reach to the substitutional video-recording reservation start time is determined in step S11, substitutional video-recording is started in step S12. When reach to the substitutional video-recording reservation end time is determined in step S13, the substitutional video-recording is stopped in step S14.

Figure 25:
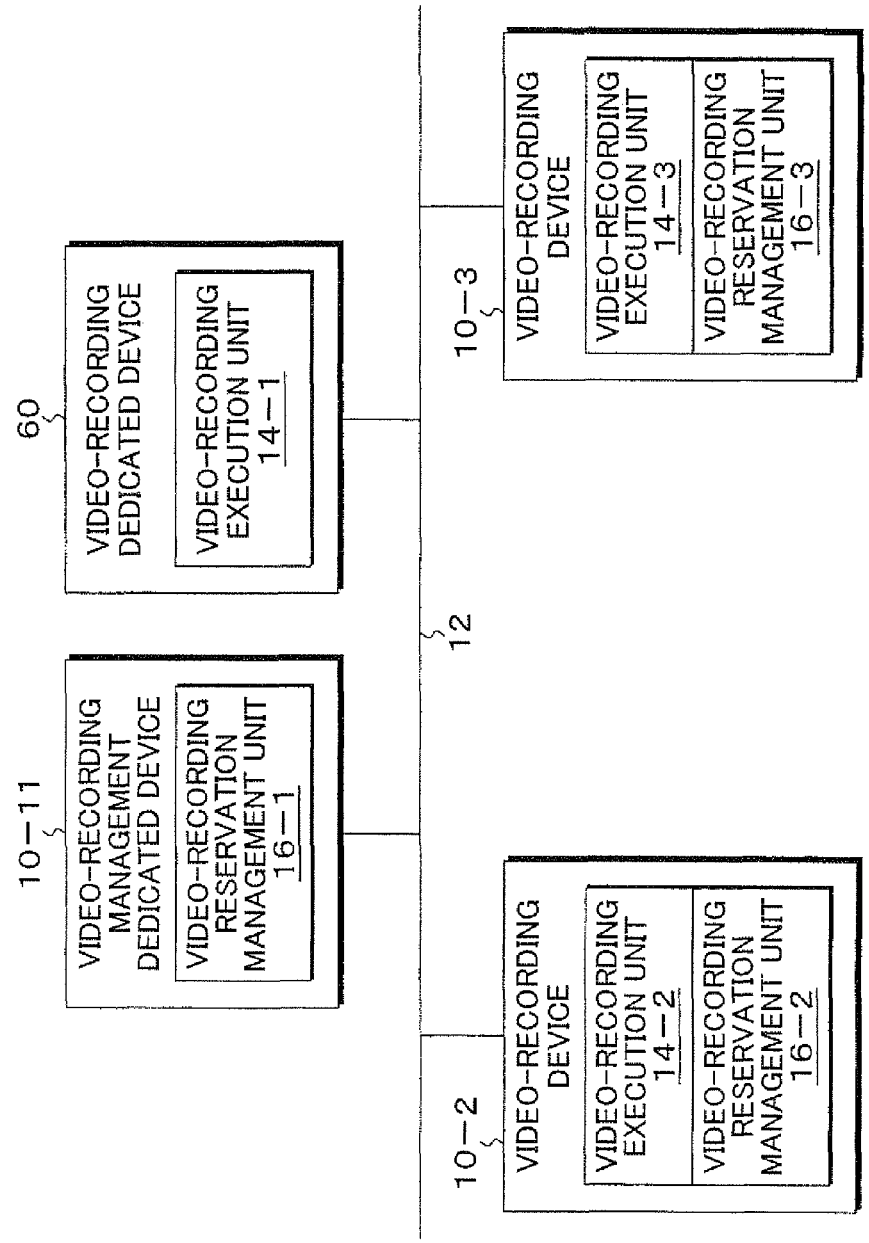
FIG. 25 is a block diagram of a system configuration according to a fifth embodiment of the present invention.

FIG. 25 is a block diagram of a system configuration according to a fifth embodiment of the present invention, wherein the present embodiment is characterized in that a management dedicated device having no video-recording function performs video-recording reservation management processes with other video-recording devices having video-recording functions. In FIG. 25, the video-recording devices 10-2 and 10-3 having the video-recording functions are connected to the home network 12, they have the video-recording execution units 14-2 and 14-3 and the video-recording reservation management units 16-2 and 16-3, respectively, and the details thereof are same as that shown in the video-recording device 10-1 of FIG. 2. On the other hand, the video-recording management dedicated device 10-11 and a video-recording dedicated device 60 are connected to the home network 12. The video-recording management dedicated device 10-11 does not have a video-recording function, but merely has a function as the video-recording reservation management unit 16-1, and is used, for example, as a home server. In such a case, the video-recording management dedicated device 10-11 is set so that the video-recording dedicated device 60 connected to the home network 12, for example, an AV device such as a HDD recorder having a communication function with respect to the home network 12 serves as a video-recording management object. Therefore, the video-recording reservation management unit 16-1 is provided in the video-recording management dedicated device 10-11, and the video-recording execution unit 14-1 is provided in the video-recording dedicated device 60.

Figure 26:
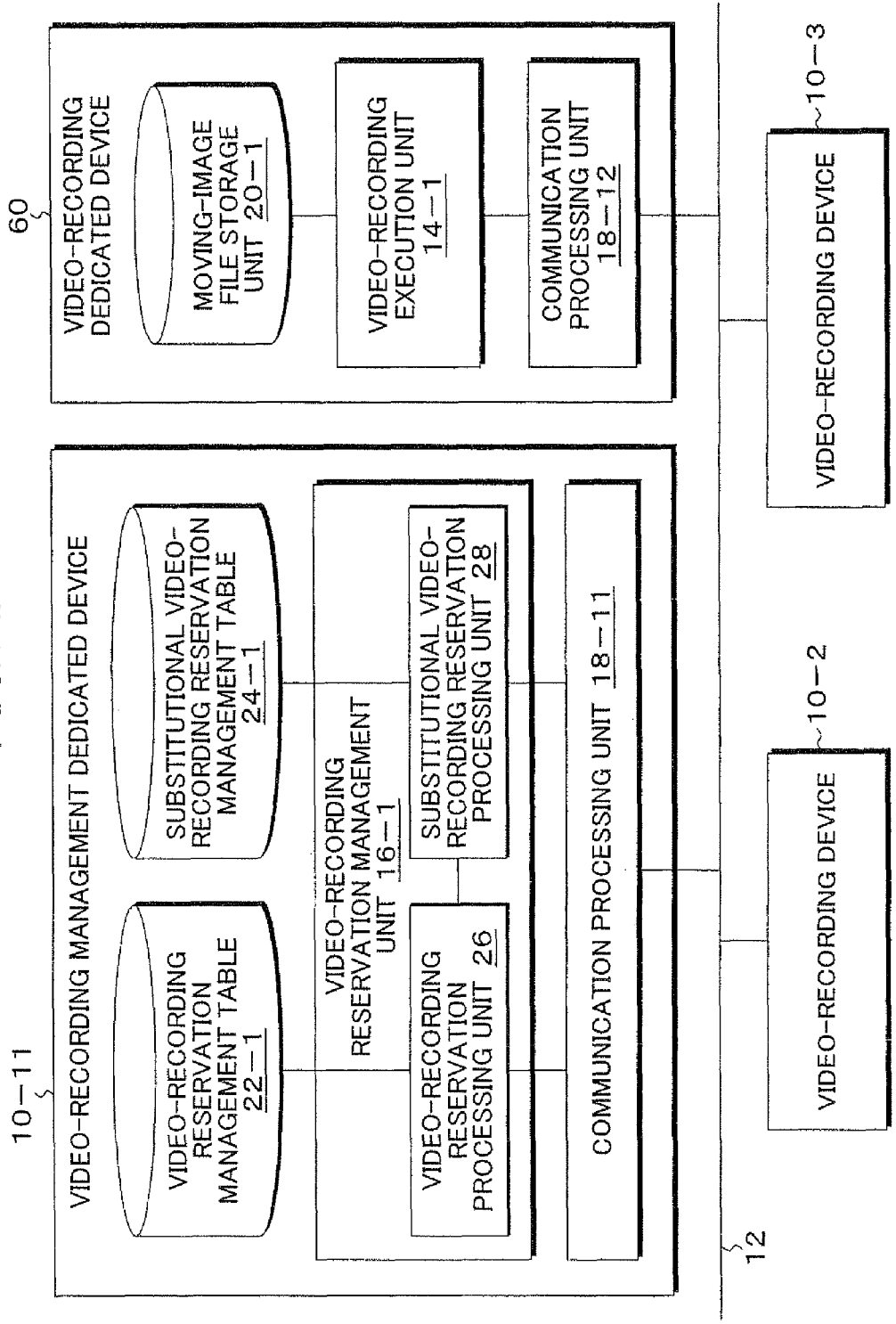
FIG. 26 is a block diagram showing a functional configuration of the video-recording management dedicated device and video-recording dedicated device of FIG. 25.

FIG. 26 is a block diagram showing a functional configuration of the video-recording management dedicated device 10-11 and the video-recording dedicated device 60 of FIG. 25 together with the other video-recording devices 10-2 and 10-3. In FIG. 26, the video-recording reservation management unit 16-1 is provided in the video-recording management dedicated device 10-11, and the video-recording reservation processing unit 26 and the substitutional video-recording reservation processing unit 28 are provided therein. Moreover, with respect to the video-recording reservation management unit 16-1, the video-recording reservation management table 22-1 and the substitutional video-recording reservation management table 24-1 are provided, and communication processes with respect to the home network 12 can be performed by a communication processing unit 18-11. On the other hand, in the video-recording dedicated device 60, the video-recording execution unit 14-1, the moving-image file 20-1, and a communication processing unit 18-12 are provided. When the video-recording dedicated device 60 serving as a manager object makes a video-recording reservation, the video-recording reservation processing unit 26 of the video-recording management dedicated device 10-11 notifies the other video-recording devices 10-2 and 10-3 of the video-recording reservation registration of the video-recording dedicated device 60 via the home network 12. When a registration notification of a video-recording reservation is received from any of the other video-recording devices 10-2 and 10-3 on the home network 12, the substitutional video-recording reservation processing unit 28 acquires a registered video-recording reservation record from the video-recording device 10-2 or 10-3 so as to create a substitutional video-recording reservation record and registers it in the substitutional video-recording reservation management table 24-1. When the video-recording reservation of the other video-recording device 10-2 or 10-3 corresponding to the substitutional video-recording reservation record is not executed, the substitutional video-recording reservation processing unit 28 executes substitutional video-recording by using the video-recording execution unit 14-1 of the video-recording dedicated device 60 and stores image data, which is obtained in the substitutional video-recording, in the moving-image file 20-1. The processing contents of the video-recording reservation processing unit 26 and the substitutional video-recording reservation processing unit 28 of the video-recording management dedicated device 10-11 may be any of the first, second, and third modes shown in the first to third embodiments of the present embodiment, and the point different from the first, second, and third modes is merely the point that the object that executes video-recording reservations and substitutional video-recording reservations is the video-recording dedicated device 60.

Figure 27A:
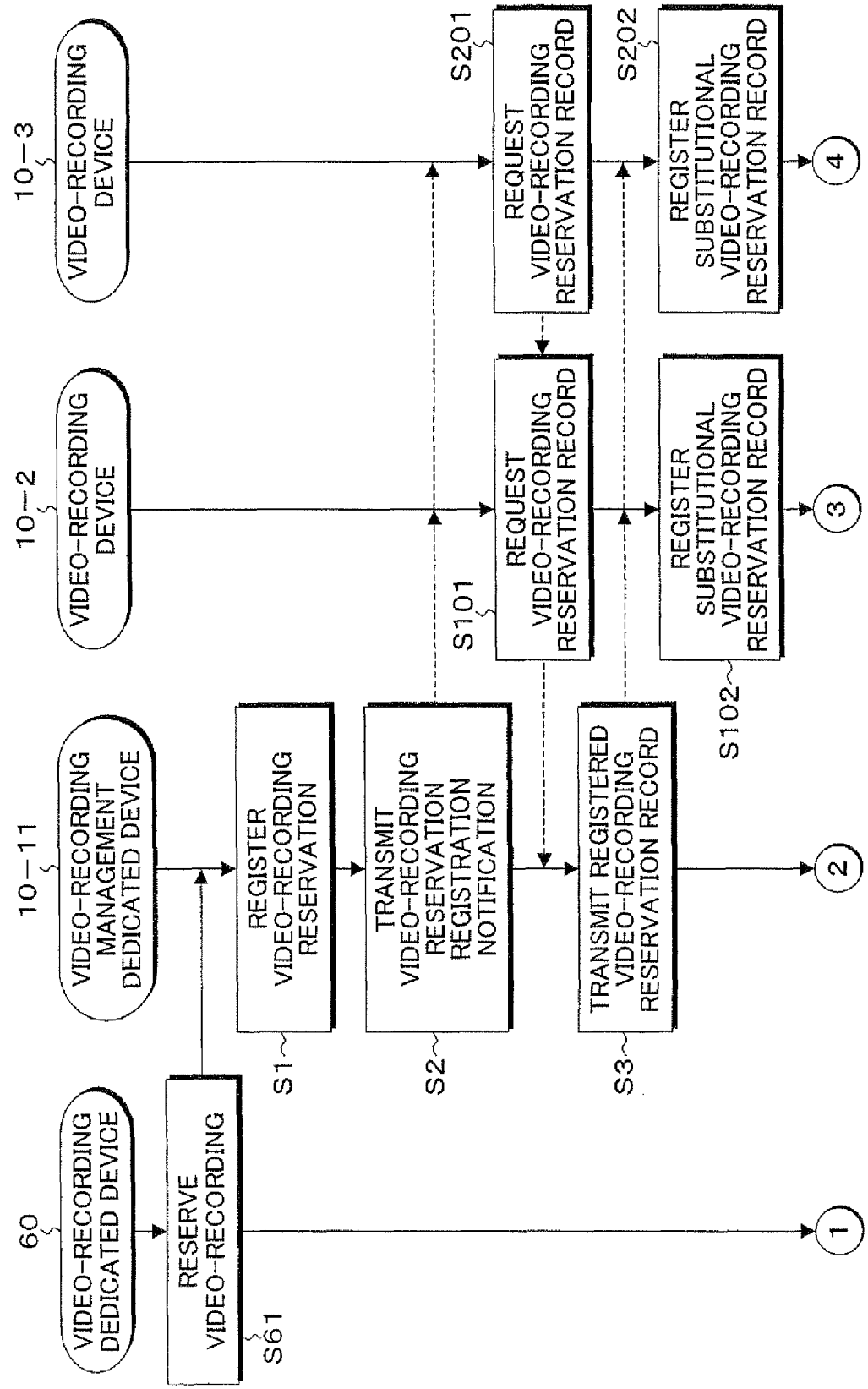
FIGS. 27A and 27B are time charts showing a video-recording reservation management process according to the fifth embodiment of the present invention in the case in which a video-recording reservation is normally executed.
Figure 27B:
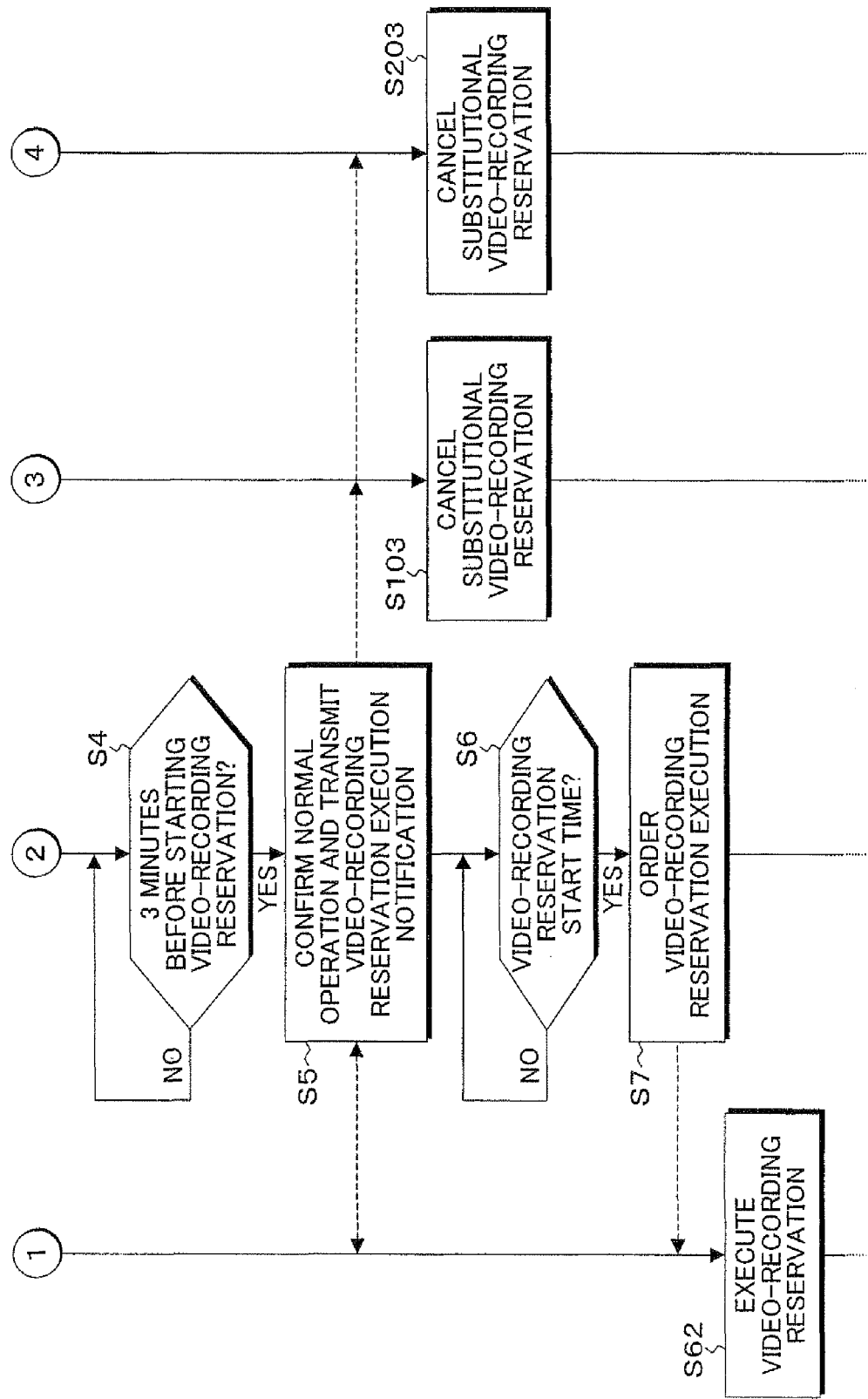

FIGS. 27A and 27B are time charts showing a video-recording reservation management process according to the fifth embodiment of the present invention in the case in which a video-recording reservation is normally executed, wherein the process of the first embodiment is taken as an example. In FIGS. 27A and 27B, in the video-recording management dedicated device 10-11, in response to a video-recording reservation made by user input in step S61 of the video-recording dedicated device 60 serving as a management object, a video-recording reservation record is registered in the video-recording reservation management table 22-1 in step S1, and video-recording reservation registration notifications are transmitted to the other video-recording devices 10-2 and 10-3 in step S2. The other video-recording devices 10-2 and 10-3 request the video-recording reservation information in steps S101 and S201, and the video-recording management dedicated device 10-11 responses and transmits the registered video-recording reservation information in step S3. In response to this, in the other video-recording devices 10-2 and 10-3, registration of substitutional video-recording reservations is performed in steps S102 and S202. Subsequently, when the video-recording management dedicated device 10-11 determines reach to the point that is three minutes before video-recording reservation start of the video-recording reservation in step S4, normal operation of the video-recording dedicated device is confirmed and the other video-recording devices 10-2 and 10-3 are notified of the video-recording execution in step S5, and the substitutional video-recording reservations are caused to be cancelled respectively in steps S103 and S203. Then, when reach to the start time of the video-recording reservation is determined in step S6, it orders the video-recording dedicated device 60 to execute video-recording in step S7, and the video-recording dedicated device 60 executes video-recording in step S62. Note that, in the time charts of FIGS. 27A and 27B, reach to the video-recording reservation start time is processed in the side of the video-recording management dedicated device 10-11; however, it may be managed in the side of the video-recording dedicated device 60.

Figure 28A:
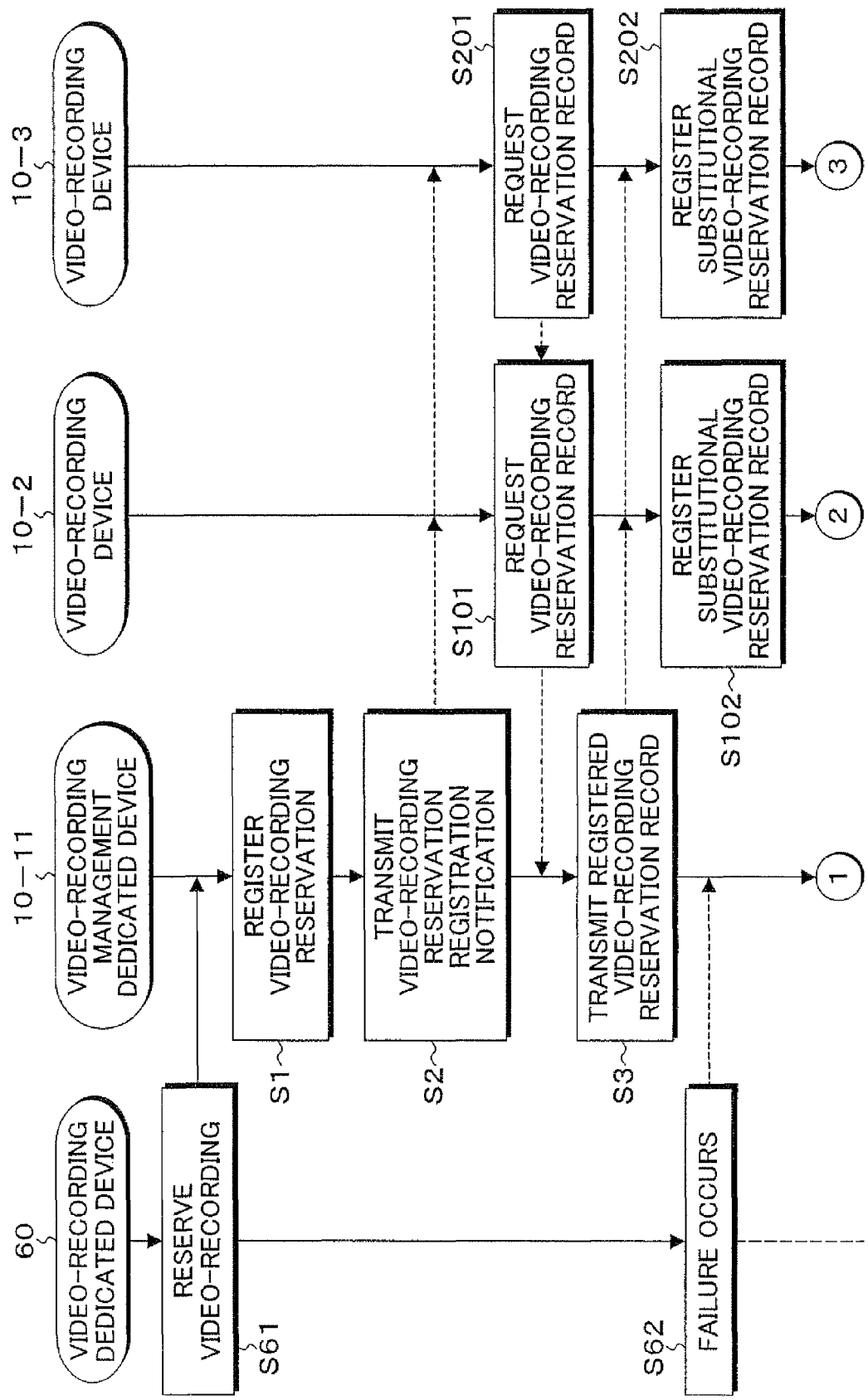
FIGS. 28A and 28B are time charts showing a video-recording reservation management process according to the fifth embodiment of the present invention in the case in which a video-recording reservation is not performed and substitutional video-recording is executed.
Figure 28B:
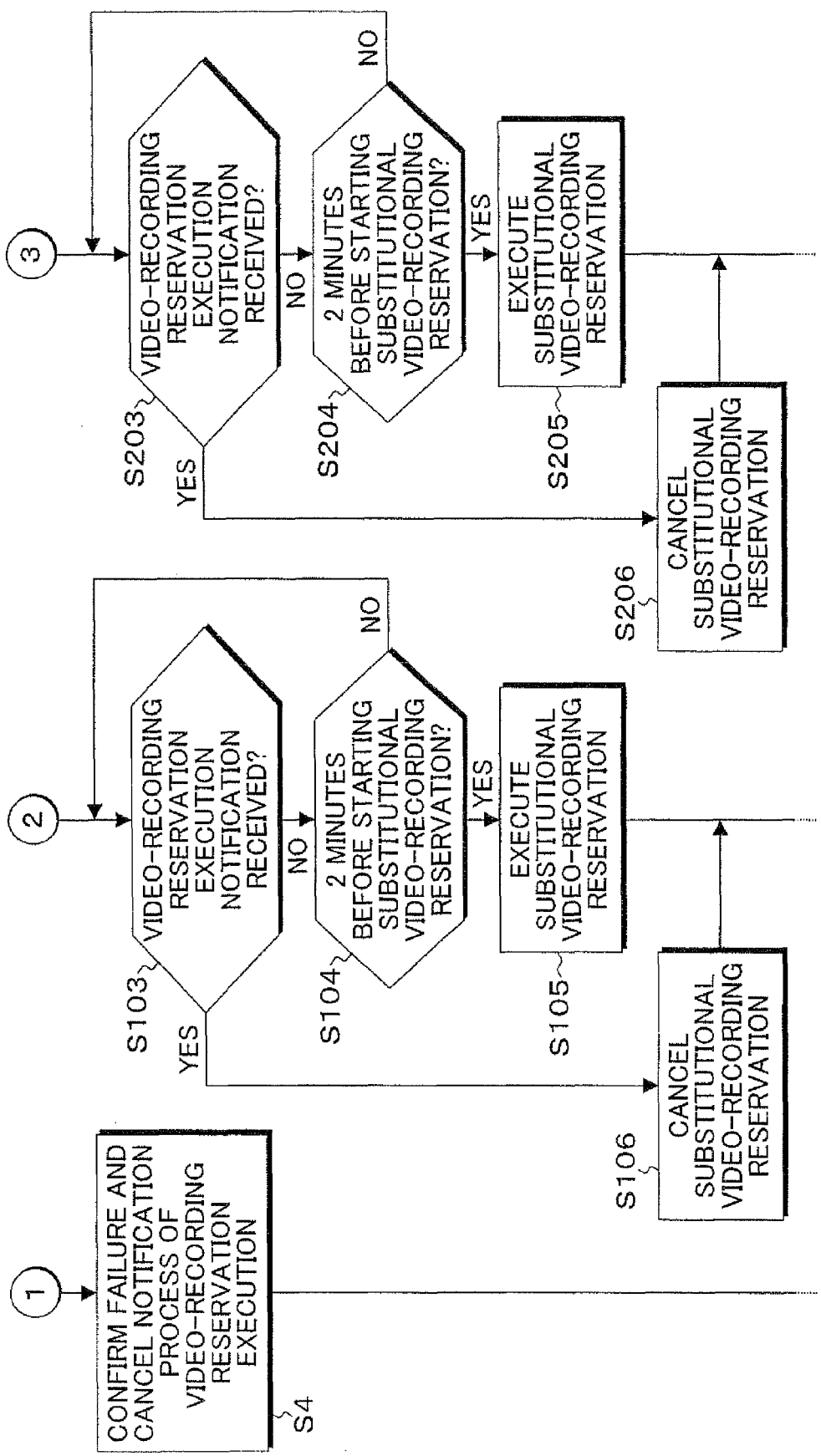

FIGS. 28A and 28B are time charts showing a video-recording reservation management process according to the fifth embodiment of the present invention in the case in which a video-recording reservation is not performed and substitutional video-recording is executed. In FIGS. 28A and 28B, in the video-recording dedicated device 60, after a video-recording reservation based on user input is made in step S61, failure due to power outage, malfunction, or the like occurs in step S62. The video-recording management dedicated device 10-11 confirms failure of the video-recording dedicated device 60 and cancels the video-recording execution notification process in step S4. Therefore, even when it is three minutes before the video-recording reservation, transmission of video-recording execution notifications to the other video-recording devices such as that shown in step S5 of FIGS. 27A and 27B is not performed. Meanwhile, in the video-recording devices 10-2 and 10-3 in which substitutional video-recording reservations are registered, whether a video-recording execution notification is received or not is checked respectively in steps S103 and S203. When it is not received, whether it is two minutes before substitutional video-recording reservation start or not is determined in steps S104 and S204, and, when it is two minutes before, substitutional video-recording is executed respectively in steps S105 and S205. In this case, when video-recording execution responses are received before it is two minutes before substitutional video-recording reservation start in steps S104 and S204, the processes proceed to steps S106 and S206 in which the substitutional video-recording reservations are cancelled. Note that, although FIGS. 27A, 27B, 28A and 28B take the process of the video-recording management dedicated device 10-11 in the first mode as an example, the second mode and the third mode can be processed thoroughly similarly by performing video-recording execution by the video-recording dedicated device 60.

Figure 29:
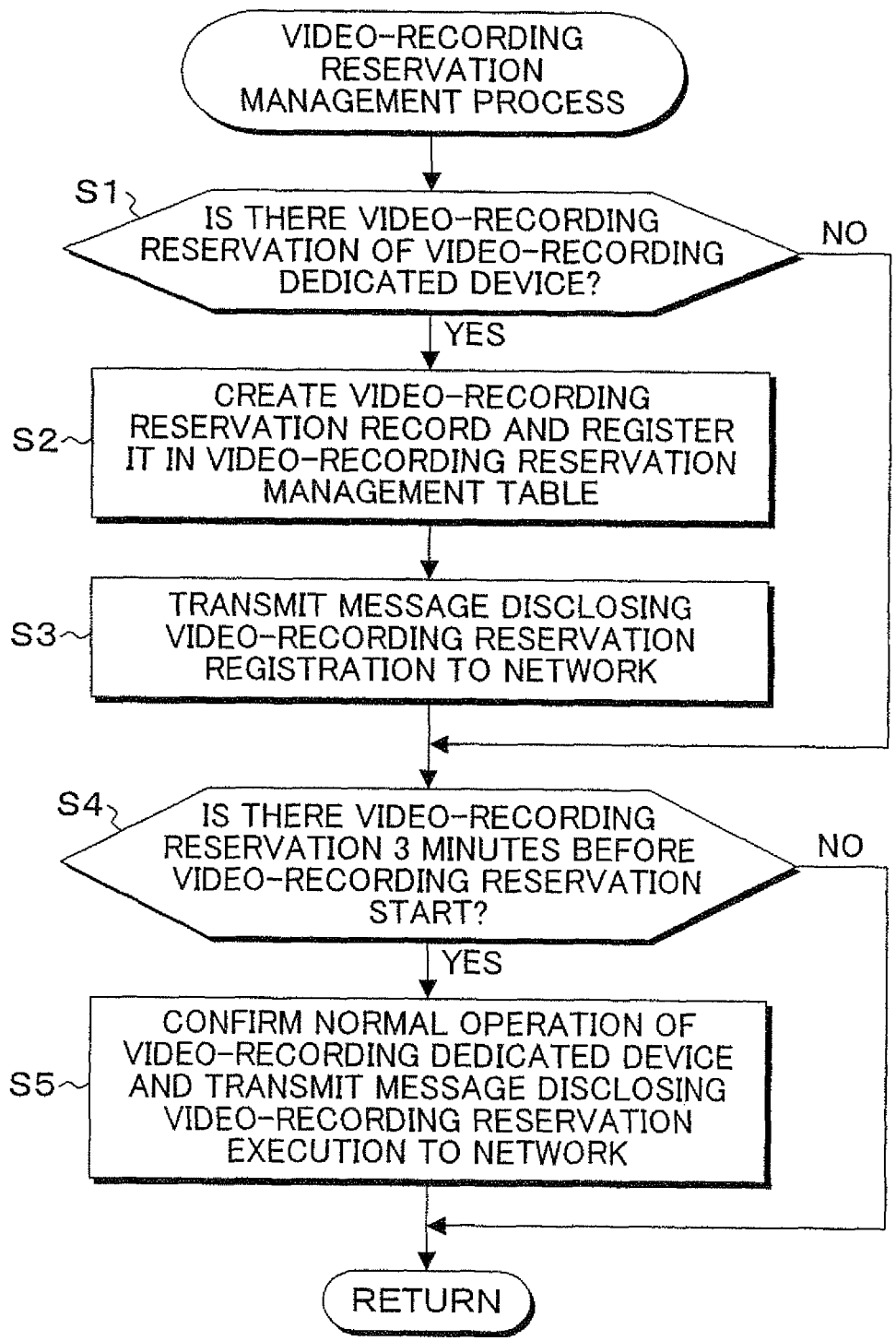
FIG. 29 is a flow chart showing details of the video-recording reservation management process in step S1 of FIG. 9 corresponding to the fifth embodiment of FIGS. 27A, 27B, 28A and 28B.

FIG. 29 is a flow chart showing details of a video-recording reservation management process in step S1 of FIG. 9 corresponding to the fifth embodiment of FIGS. 27A, 27B, 28A and 28B, and it will be described below with reference to FIG. 26. In FIG. 29, in the video-recording reservation management process of the video-recording management dedicated device 10-11, when a video-recording reservation of the video-recording dedicated device 60 is determined in step S1, the process proceeds to step S2 in which a video-recording reservation record is created and registered in the video-recording reservation management table 22-1. Subsequently, in step S3, disclosing messages of video-recording reservation registration notifications are transmitted to the home network 12 in step S3. Subsequently, when the video-recording reservation that is three minutes before video-recording reservation start is determined in step S4, normal operation of the video-recording dedicated device is confirmed, and disclosing messages of video-recording execution notifications are transmitted to the home network 12 in step S5.

Figure 30A:
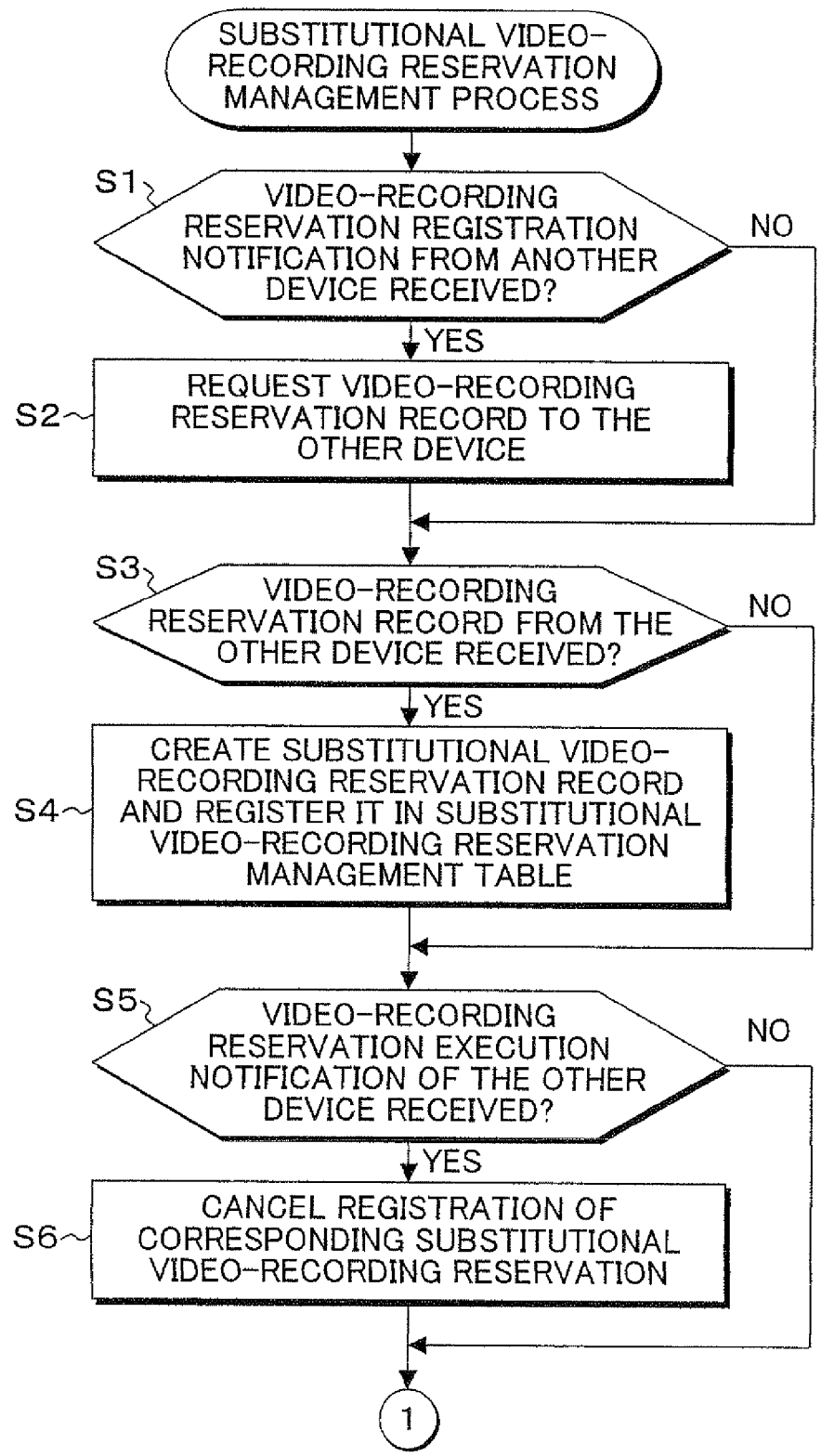
FIGS. 30A and 30B are flow charts showing details of the substitutional video-recording reservation management process in step S1 of FIG. 9 corresponding to the fifth embodiment of FIGS. 27A, 27B, 28A and 28B.
Figure 30B:
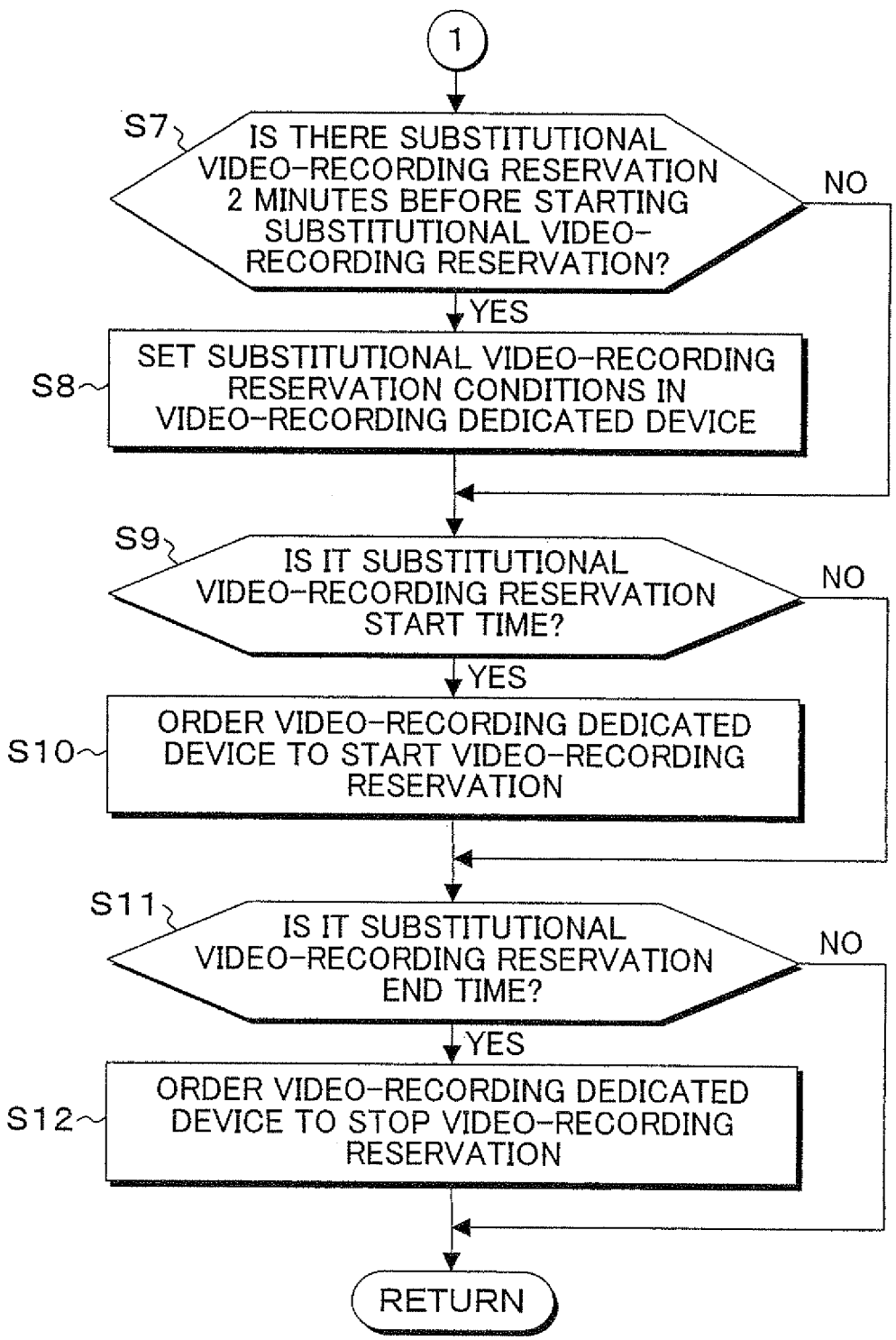

FIGS. 30A and 30B are flow charts showing details of a substitutional video-recording reservation management process in step S2 of FIG. 9 corresponding to the fifth embodiment of FIGS. 27A, 27B, 28A and 28B. The substitutional video-recording reservation management process of FIGS. 30A and 30B will be described below for the video-recording management dedicated device 10-11. When a notification of video-recording reservation registration of the other video-recording device 10-2 or 10-3 is received in step S1, a video-recording reservation record is requested to the other video-recording device in step S2, and, when reception of the video-recording reservation record is determined in step S3, a substitutional video-recording reservation record is created and registered in the substitutional video-recording reservation management table 24-1 in step S4. Subsequently, when reception of a video-recording execution notification from the other video-recording device 10-2 or 10-3 is determined, registration of the corresponding substitutional video-recording reservation is cancelled in step S6. Subsequently, when the substitutional video-recording reservation that is two minutes before substitutional video-recording reservation start is determined in step S7, video-recording reservation start conditions are set in the video-recording dedicated device 60 in step S8, then, reach to the substitutional video-recording reservation start time is determined in step S9, and the video-recording dedicated device is ordered to start video-recording in step S10. When reach to the substitutional video-recording reservation end time is determined in step S11, the video-recording dedicated device 60 is ordered to stop the video-recording in step S12. Herein, FIGS. 29, 30A and 30B are the processes of the fifth embodiment corresponding to the first mode; however, the second mode and the third mode can be thoroughly similarly applied when they are configured to be the processes in which video-recording execution is performed by the video-recording dedicated device 60. The present invention also provides a program which can be executed by a CPU of a microcomputer or a CPU of an AV device having a communication function and a video-recording function, and the program has the contents shown in the above described flow charts. The present invention also provides a recording medium storing the video-recording reservation management program executed by a computer. Examples of the recording medium storing the video-recording reservation management program include portable-type recording media such as a CD-ROM, a floppy disk (R), a DVD disk, a magneto-optical disk, and an IC card; storage apparatuses such as hard disk drives provided inside/outside computer systems; a database which retains programs via a line or another computer system and a database thereof; and online transmission media. Moreover, in the video-recording reservation management processes of the first, second, and third modes of the first to third embodiments and the fifth embodiment, substitutional video-recording of the same contents is simultaneously performed by the plurality of devices in which substitutional video-recording reservations are performed among the plurality of video-recording devices present on the home network; however, when the substitutional video-recording is simultaneously performed by the plurality of video-recording devices, it is desired that the image quality and/or compression ratios are caused to be different between the devices which perform the substitutional video-recording so that the substitutional video-recording is performed under different video-recording conditions. The video-recording conditions in this case in which substitutional video-recording is performed by the plurality of video-recording devices can be changed by utilizing, for example, the substitutional priorities determined by exchanging resource information between the video-recording devices which perform substitutional video-recording of the video-recording reservation management table 24-1 used in the fourth embodiment of FIG. 20B. More specifically, video-recording conditions of high image quality and a low compression ratio are used when the substitutional priority is high, and video-recording conditions of low image quality and a high compression ratio are used when the priority is low. Alternatively, instead of using the substitutional priorities, a round-robin method in which substitutional video-recording conditions of fixedly different image qualities and compression ratios are fixedly set according to the device numbers such as network addresses set for the video-recording devices may be used. Note that, the above described embodiments take, as examples, video-recording reservation management processes for substitutional video-recording in the devices having communication functions connected to a home network and video-recording functions; however, they can be applied to video-recording devices which are connected to a general LAN other than a home network without modification. The present invention also includes arbitrary modifications that do not impair the object and advantages thereof and is not limited by the numerical values shown in the above described embodiments.

What is claimed is:

1. A first video-recording reservation management apparatus which is connected to a network, is communicatable with a second apparatus having a video-recording function, and has a video-recording function, and can receive the same channels, the first video-recording reservation management apparatus comprising:

a video-recording reservation processing unit which registers video-recording reservation information of the first apparatus in a video-recording reservation management area of a storage unit and notifies the second apparatus of the video-recording reservation registration of the first apparatus via the network when a video-recording reservation is made with respect to the video-recording function of the first apparatus; and a substitutional video-recording reservation processing unit which acquires registered video-recording reservation information from the second apparatus and registers the information in a substitutional video-recording reservation management area of the storage unit as substitutional video-recording reservation information when a registration notification of a video-recording reservation of the second apparatus is received from the network, and executes a substitutional video-recording reservation by using the video-recording function of the first apparatus when the video-recording reservation of the second apparatus corresponding to the substitutional video-recording reservation information is not executed when video-recording cannot be performed due to power outage or failure.

2. The first video-recording reservation management apparatus according to claim 1, wherein:

the video-recording reservation information registered in the video-recording reservation area includes a channel, start time, and end time; and the substitutional video-recording reservation information registered in the substitutional video-recording reservation area includes an identifier of the substitute apparatus, a channel, start time, and end time.

3. The first video-recording reservation management apparatus according to claim 1, wherein the substitutional video-recording reservation processing unit notifies the second apparatus of registration of the substitutional video-recording reservation when the substitutional video-recording reservation is registered, and, when a registration notification of a substitutional video-recording reservation is received from the second apparatus, acquires resource information allocated to the substitutional video-recording reservation from the second apparatus so as to determine priorities through comparison with resource information of the first apparatus, and executes substitutional video-recording by the apparatus having the highest priority.

4. The first video-recording reservation management apparatus according to claim 1, wherein when a plurality of apparatuses including the first apparatus which perform the substitutional video-recording reservation are present on the network, the substitutional video-recording reservation processing unit sets a video-recording condition different from the other apparatus so as to execute substitutional video-recording.

5. The first video-recording reservation management apparatus according to claim 4, wherein the substitutional video-recording reservation processing unit sets image quality or a compression ratio different from the other apparatus so as to execute substitutional video-recording.

6. A first video-recording reservation management apparatus which is connected to a network, is communicatable with a second apparatus having a video-recording function, and can receive the same channels, manages a video-recording reservation by using a particular video-recording dedicated device as a management object, and does not have a video-recording function, the first video-recording reservation management apparatus comprising:
   a video-recording reservation processing unit which, when the video-recording dedicated device serving as the management object reserves video-recording, notifies the second apparatus of video-recording reservation registration of the video-recording dedicated device via the network; and
   a substitutional video-recording reservation processing unit which acquires registered video-recording reservation information from the second apparatus and registers substitutional video-recording reservation information in a substitutional video-recording reservation management area of the storage unit when a registration notification of a video-recording reservation of the second apparatus is received from the network, and executes substitutional video-recording by using the video-recording function of the video-recording dedicated device when the video-recording reservation of the second apparatus corresponding to the substitutional video-recording reservation information is not executed when video-recording cannot be performed due to power outage or failure.

7. A video-recording reservation management method of a first apparatus which is connected to a network, is communicatable with a second apparatus having a video-recording function, and has a video-recording function, and can receive the same channels, the video-recording reservation management method comprising:
   a video-recording reservation processing step in which video-recording reservation management information of the first apparatus is registered in a video-recording reservation management area of a storage unit and the second apparatus is notified of the video-recording reservation registration of the first apparatus via the network when a video-recording reservation is made with respect to the video-recording function of the first apparatus; and
   a substitutional video-recording reservation processing step in which registered video-recording reservation information is acquired from the second apparatus and substitutional video-recording reservation information is registered in a substitutional video-recording reservation management area of the storage unit when a registration notification of a video-recording reservation of the second apparatus is received from the network, and a substitutional video-recording reservation is executed by using the video-recording function of the first apparatus when the video-recording reservation of the second apparatus corresponding to the substitutional video-recording reservation information is not executed when video-recording cannot be performed due to power outage or failure.

8. A video-recording reservation management method of a first apparatus which is connected to a network, is communicatable with a second apparatus having a video-recording function, and can receive the same channels, manages a video-recording reservation by using a particular video-recording dedicated device as a management object, and does not have a video-recording function, the video-recording reservation management method comprising
   a video-recording reservation processing step, in which, when the video-recording dedicated device serving as the management object reserves video-recording, the second apparatus is notified of video-recording reservation registration of the video-recording dedicated device via the network; and
   in a substitutional video-recording reservation processing step, in which registered video-recording reservation information is acquired from the second apparatus and substitutional video-recording reservation information is registered in a substitutional video-recording reservation management area of the storage unit when a registration notification of a video-recording reservation of the second apparatus is received from the network, and a substitutional video-recording reservation is executed by using the video-recording function of the video-recording dedicated device when the video-recording reservation of the second apparatus corresponding to the substitutional video-recording reservation information is not executed when video-recording cannot be performed due to power outage or failure.

9. A non-transitory computer-readable storage medium which stores a video-recording reservation management program characterized by causing a computer of a first apparatus which is connected to a network, is communicatable with a second apparatus having a video-recording function, and has a video-recording function, and can receive the same channel, to execute:
   a video-recording reservation processing step in which video-recording management information of the first apparatus is registered in a video-recording reservation management area of a storage unit and the second apparatus is notified of the video-recording reservation registration of the first apparatus via the network when a video-recording reservation is made with respect to the video-recording function of the first apparatus; and
   a substitutional video-recording reservation processing step in which registered video-recording reservation information is acquired from the second apparatus and substitutional video-recording reservation information is registered in a substitutional video-recording reservation management area of the storage unit when a registration notification of a video-recording reservation of the second apparatus is received from the network, and a substitutional video-recording reservation is executed by using the video-recording function of the first apparatus when an execution notification of the video-recording reservation of the second apparatus corresponding to the substitutional video-recording reservation information is not received when video-recording cannot be performed due to power outage or failure.

10. A non-transitory computer-readable storage medium which stores a video-recording reservation management program characterized by causing a computer of a first apparatus which is connected to a network, is communicatable with a second apparatus having a video-recording function, and can receive the same channels, manages a video-recording reservation by using a particular video-recording dedicated device as a management object, and does not have a video-recording function, to execute:

a video-recording reservation processing step, in which, when the video-recording dedicated device serving as the management object reserves video-recording, the second apparatus is notified of video-recording reservation registration of the video-recording dedicated device via the network; and a substitutional video-recording reservation processing step, in which registered video-recording reservation information is acquired from the second apparatus and substitutional video-recording reservation information is registered in a substitutional video-recording reservation management area of the storage unit when a registration notification of a video-recording reservation of the second apparatus is received from the network, and a substitutional video-recording reservation is executed by using the video-recording function of the video-recording dedicated device when an execution notification of the video-recording reservation of the second apparatus corresponding to the substitutional video-recording reservation information is not received when video-recording cannot be performed due to power outage or failure.

11. A video-recording reservation management system in which a plurality of mutually-communicatable apparatuses having video-recording functions are connected via a network, and can receive the same channels, the video-recording reservation management system characterized in that each of the apparatuses includes:

a video-recording reservation processing unit which registers video-recording reservation information of the apparatus per se in a video-recording reservation management area of a storage unit and notifies the other apparatus of the video-recording reservation registration of the apparatus per se via the network when a video-recording reservation is made with respect to the video-recording function of the apparatus per se; and a substitutional video-recording reservation processing unit which acquires registered video-recording reservation information from the other apparatus and registers substitutional video-recording reservation information in a substitutional video-recording reservation management area of the storage unit when a registration notification of a video-recording reservation of the other apparatus is received from the network, and executes a substitutional video-recording reservation by using the video-recording function of the apparatus per se when an execution notification of the video-recording reservation of the other apparatus corresponding to the substitutional video-recording reservation information is not received when video-recording cannot be performed due to power outage or failure.

12. The video-recording reservation management system according to claim 11, characterized in that, furthermore, a video-recording management dedicated device which can be communicated with another apparatus having a video-recording function, and can receive the same channels, does not have a video-recording function, and uses a particular video-recording dedicated device as a management object so as to manage a video-recording reservation is connected to the network, wherein:

the video-recording management dedicated device includes:

a video-recording reservation processing unit which, when the video-recording dedicated device serving as the management object reserves video-recording, notifies the other apparatus of video-recording reservation registration of the video-recording dedicated device via the network; and a substitutional video-recording reservation processing unit which acquires registered video-recording reservation information from the other apparatus and registers substitutional video-recording reservation information in a substitutional video-recording reservation management area of the storage unit when a registration notification of a video-recording reservation of the other apparatus is received from the network, and executes the substitutional video-recording reservation by using the video-recording function of the video-recording dedicated device when an execution notification of the video-recording reservation of the other apparatus corresponding to the substitutional video-recording reservation information is not received when video-recording cannot be performed due to power outage or failure.

* * * * *